United States Patent [19]
Jaeckel

[11] Patent Number: 5,113,507
[45] Date of Patent: May 12, 1992

[54] METHOD AND APPARATUS FOR A SPARSE DISTRIBUTED MEMORY SYSTEM

[75] Inventor: Louis A. Jaeckel, Ukiah, Calif.

[73] Assignee: Universities Space Research Association, Columbia, Md.

[21] Appl. No.: 353,179

[22] Filed: May 3, 1989

Related U.S. Application Data

[63] Continuation-in-part of Ser. No. 260,256, Oct. 20, 1988, abandoned.

[51] Int. Cl.⁵ ............................................. G06F 12/00
[52] U.S. Cl. .................... 395/425; 364/244; 364/254.2; 364/247.1; 364/DIG. 1
[58] Field of Search ... 364/200 MS File, 900 MS File

[56] References Cited

U.S. PATENT DOCUMENTS

| | | | |
|---|---|---|---|
| 4,371,951 | 2/1983 | Kort et al. | 364/900 |
| 4,442,503 | 4/1984 | Schutt et al. | 364/900 |
| 4,575,814 | 3/1986 | Brooks, Jr. et al. | 364/900 |
| 4,750,108 | 6/1988 | Slavenburg | 364/200 |
| 4,816,999 | 3/1989 | Berman et al. | 364/489 |
| 4,963,810 | 10/1990 | Rojas et al. | 318/778 |

OTHER PUBLICATIONS

Sparse, Distributed Memory Prototype: Principles of Operation, M. J. Flynn, P. Kanerva, B. Ahanin, N. Bhadkamkar, P. Flaherty, P. Hickey, Technical Report CSL-TR-87-338 Feb. 1988.

Sparse Distributed Memory Prototype: Address Module Hardware Guide—M. J. Flynn, R. Zeidman, E. Lochner Technical Report CSL-TR-88-373, Dec. 1988.

(List continued on next page.)

*Primary Examiner*—Allen R. MacDonald
*Assistant Examiner*—Gopal C. Ray
*Attorney, Agent, or Firm*—Joseph H. Smith

[57] ABSTRACT

A computer memory includes K hard memory locations, hereinafter HMLs, each HML having M counters. A reference address element stores a reference address sequence of N bits. A data register stores data as a sequence of M integers. The memory has a processor system for determining a subset of HMLs to access for each reference address during read and write operations. For each HML, the processor system receives a subset of the reference address bits equal in number to q. The subset of reference address bits is chosen by selecting, for each HML, q integers between 1 and N as selected coordinates, hereinafter SCs, each SC corresponding to a bit position within the reference address, and for each SC for each HML, assigning a 0 or 1 as an assigned value for that SC. The processor system then stores the SCs and the assigned values and, for each of the SCs for each of the HMLs, compares the assigned value for the SC with the value of the corresponding bit in the reference address bits. The processor system then accesses those HMLs for which the assigned values for all SCs are identical with the corresponding bits in the subset of the reference address bits. During a write, the processor system combines data in the data register with any data already located in the M counters in each of the accessed HMLs, the M counters in each of the accessed HMLs being used for storing the combined data. The memoryy also has an accumulator system made up of a set of M accumulators with the $i^{th}$ accumulator coupled to receive data from the $i^{th}$ counter, for each accessed HML, so that each of the accumulators accumulates integers from the counters, receiving one integer from the corresponding counter for each accessed HML, thereby obtaining a value $V_i$ in the $i^{th}$ accumulator. The accumulator system can then be used for outputting data corresponding to the values in the accumulators.

58 Claims, 23 Drawing Sheets

OTHER PUBLICATIONS

View of Kanerva's Sparse Distributed Memory—Denning, P. J., National Aeronautics and Space Administration, Moffett Field, Calif. Ames Research Center, Jun. 4, 1986 (Abstract only).

Kanerva's Sparse Distributed Memory: An Associative Memory Algorithm Well-Suited to the Connection Machine—Rogers, D., National Aeronautics and Space Administration, Moffett Field, Calif. Ames Research Center, Nov. 1988 (Abstract only).

Notes on Implementation of Sparsely Distributed Memory, Keeler, J. D.; Denning, P. J., National Aeronautics and Space Administration, Moffett Field, Calif. Ames Research Center, Aug. 7, 1986 (Abstract only).

Application of a Sparse, Distributed Memory to the Detection, Identification and Manipulation of Physical Objects, Semiannual Status Report Oct. 1985-Mar. 1986, Kanerva, P., National Aeronautics and Space Administration, 1986 (Abstract only).

Two Demonstrators and a Simulator for a Sparse Distributed Memory—Brown, R. L., National Aeronautics and Space Administration, Jun. 1987 (Abstract only).

Two Alternate Proofs of Wang's Lune formula for Sparse Distributed Memory and an Integral Approximation—Jaeckel, L. A., National Aeronautics and Space Administration, Feb. 3, 1988 (Abstract only).

Using Data Tagging to Improve the Performance of Kanerva's Sparse Distributed Memory—Rogers, D., National Aeronautics and Space Administration, Jan. 1, 1988 (Abstract only).

Fig. 3 (Address Module 109) First Alternative Embodiment

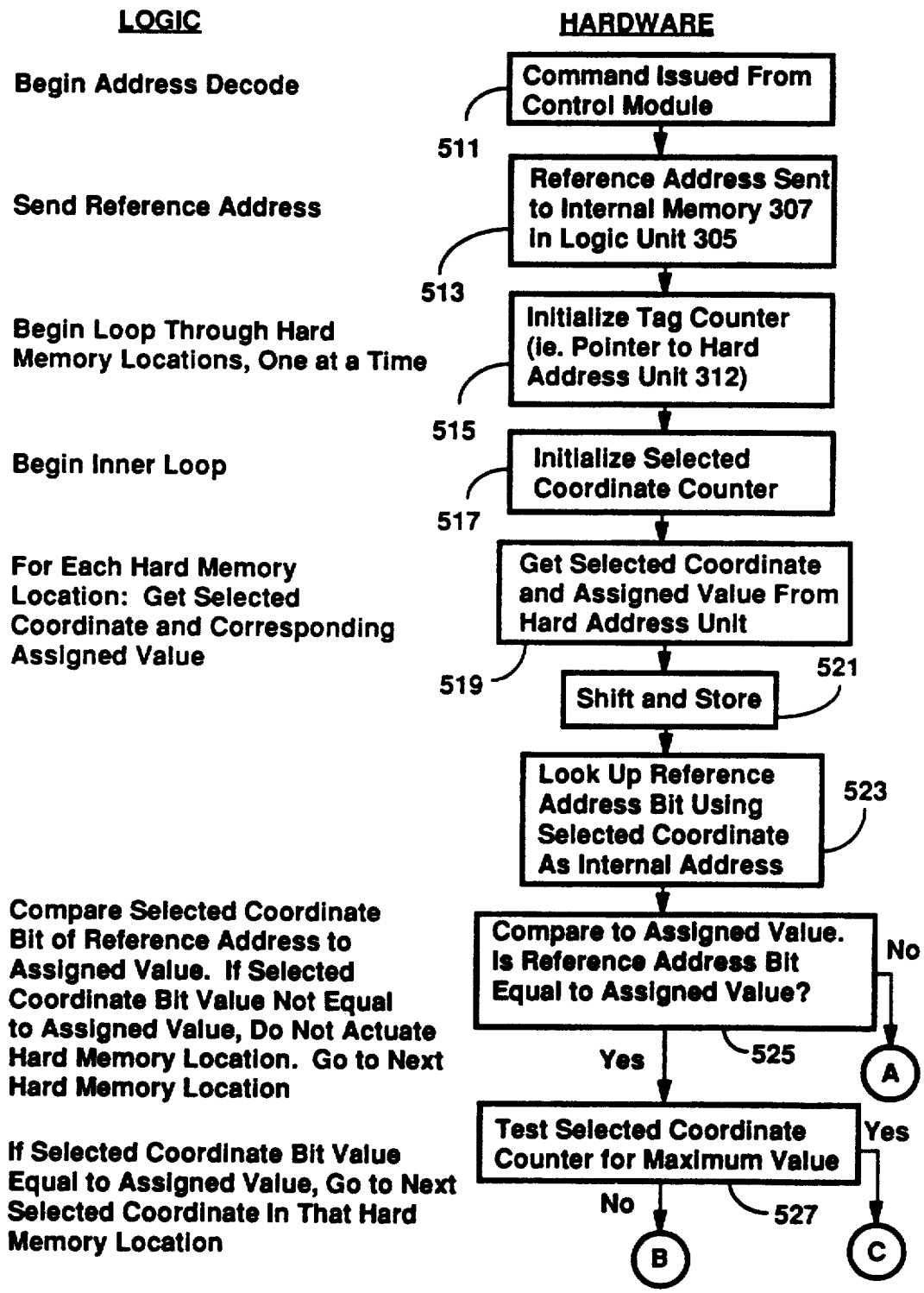

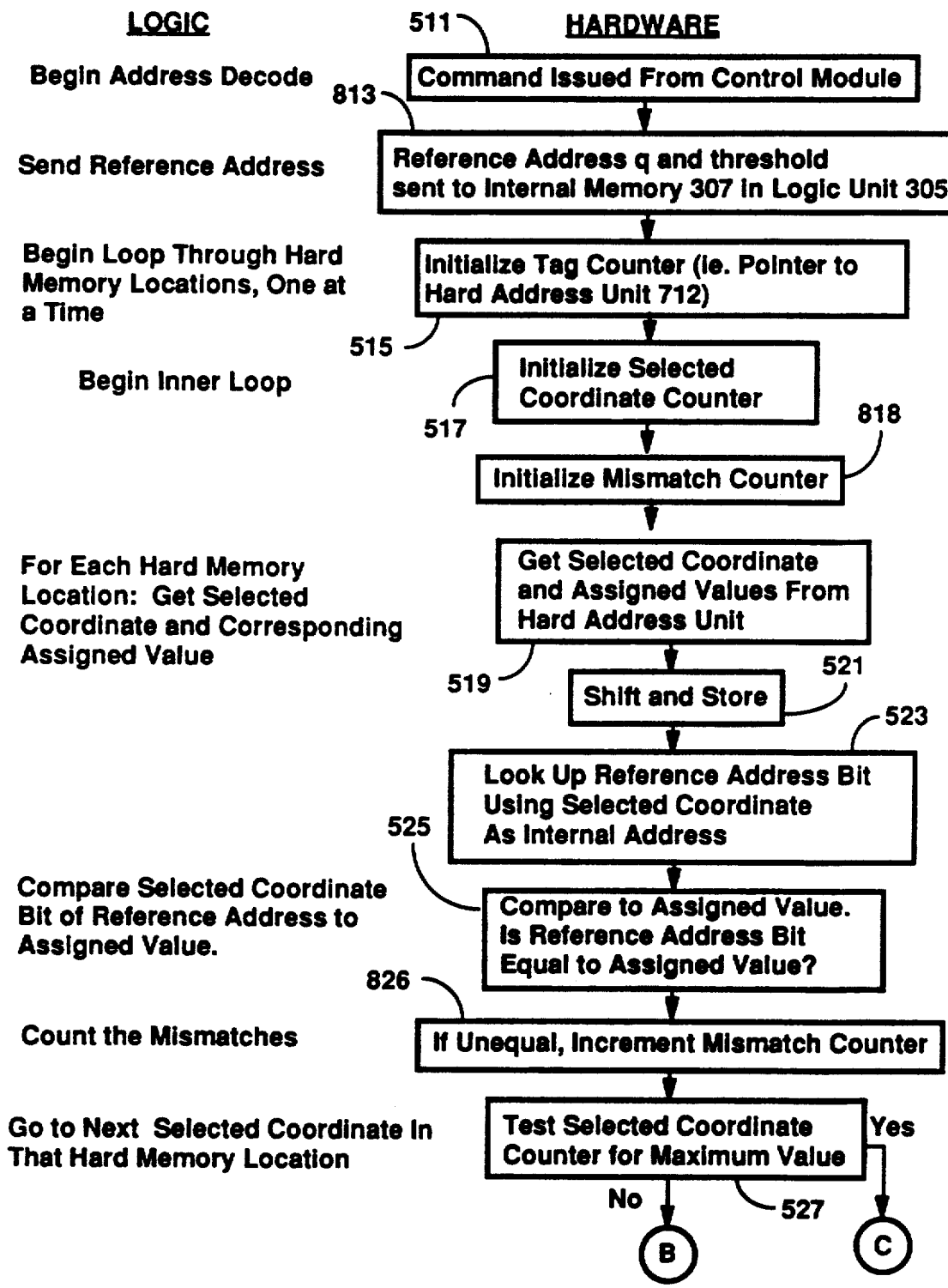

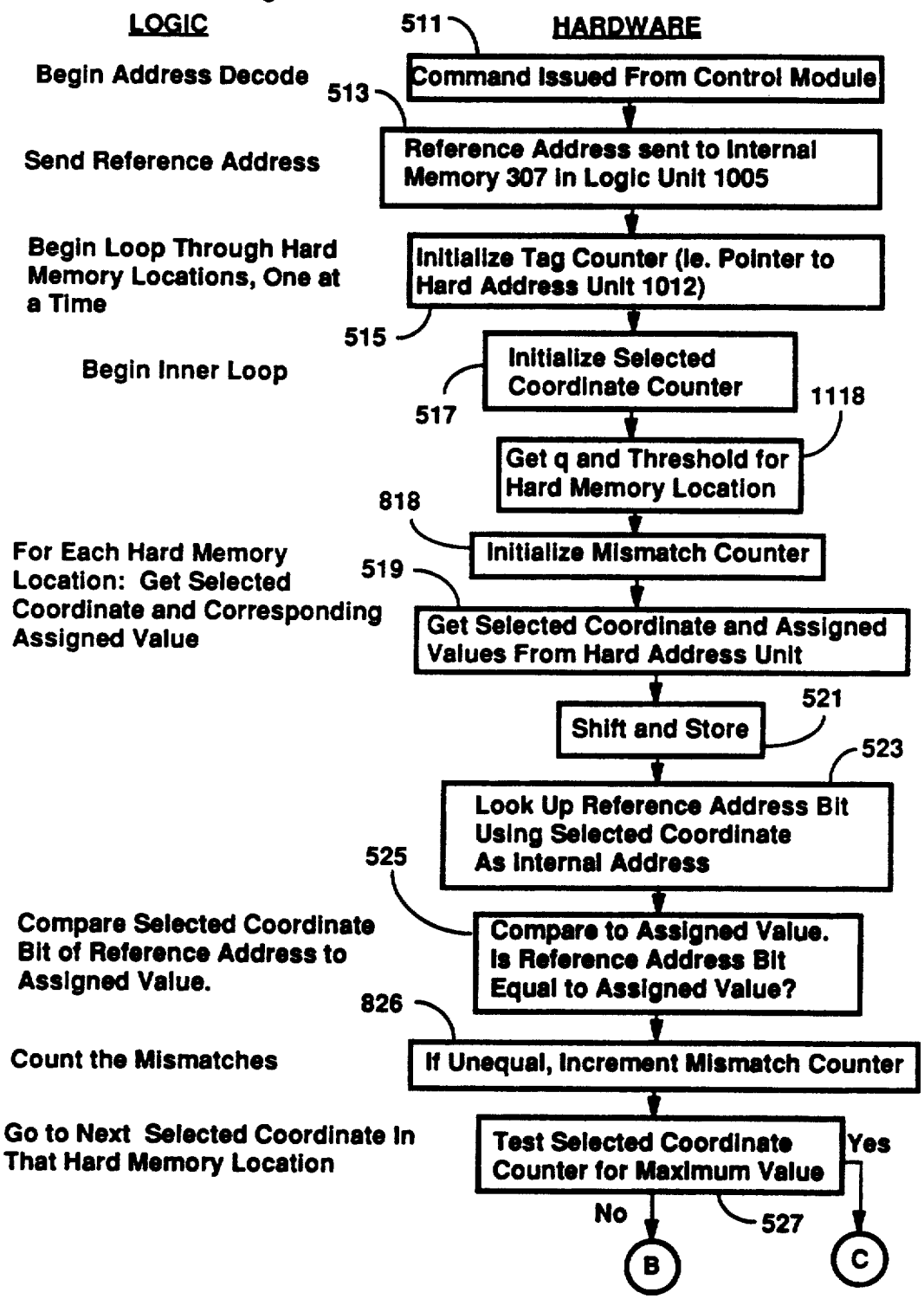

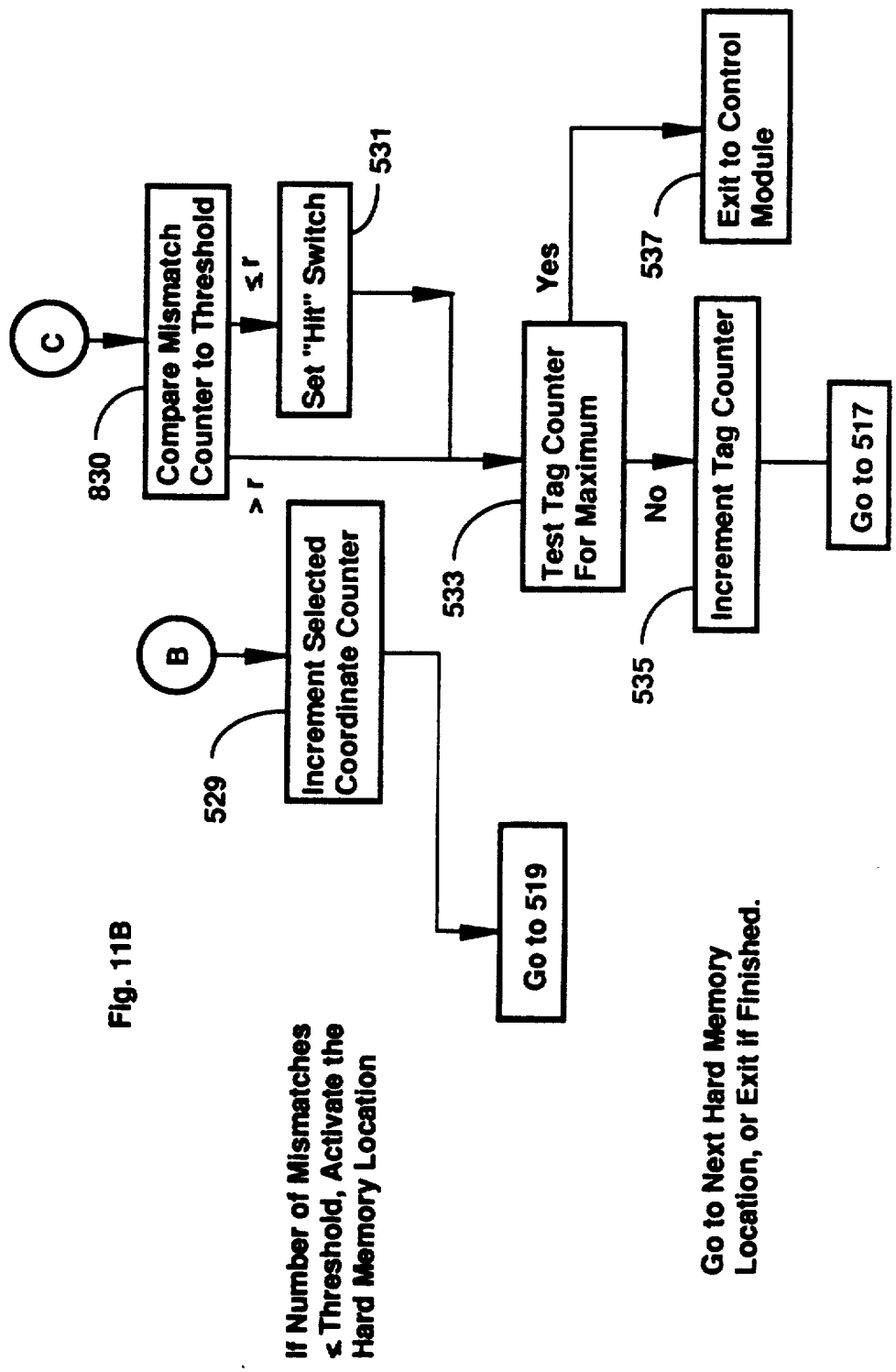

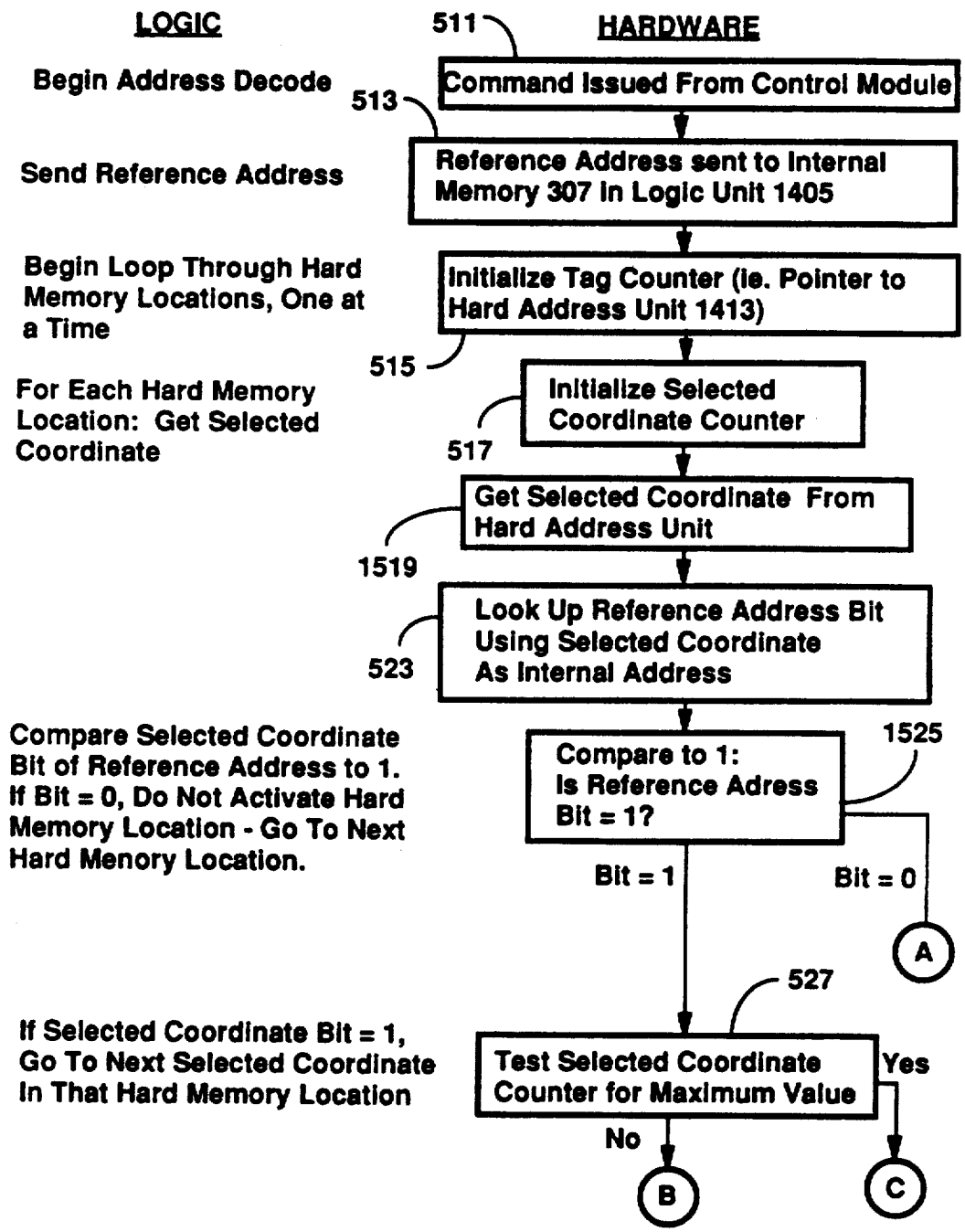

METHOD AND APPARATUS FOR A SPARSE DISTRIBUTED MEMORY SYSTEM

This is a continuation-in-part of application Ser. No. 260,256, filed Oct. 20, 1988, now abandoned.

FIELD OF THE INVENTION

This invention relates to methods and computer architecture for storing and retrieving large amounts of binary data so that stored data may be retrieved quickly and efficiently even if the retrieval information is known only approximately.

BACKGROUND OF THE INVENTION

A conventional computer memory system can retrieve stored data only if the retrieval information, such as the read address, is known exactly. The reason for this is that in a conventional computer, a string of binary digits (a word) is stored at a specific location in the computer's memory, and nothing else is stored at that location at the same time.

P. Kanerva, in "Self-propagating Search: A Unified Theory of Memory", Report No. CSLI-84-7, published by Stanford University in 1984, hereinafter Kanerva (1984), has proposed a memory system called a Sparse Distributed Memory. The memory is "distributed" in the sense that each binary word is stored at many of the memory locations simultaneously and each memory location contains a linear combination of a subset of the stored data words rather than a single word. A brief description of his system follows.

Let the address space S be the set of all possible N-bit binary words. In other words, S is the set of all N-dimensional binary vectors, that is, vectors in which each component is either 0 or 1. In some applications members of this set will be considered both as addresses and as data words. If N is large, say between 100 and 10,000, then the number of possible addresses, $2^N$, is so large that a memory cannot be built with that many locations. Therefore, instead of implementing a memory location for each possible address, a large random sample of the addresses is chosen, say one million of them, and a memory location is implemented for each of these addresses. This is why the memory system is called "sparse".

One way to construct such a memory system is as follows. For each implemented memory location, which will be called a "hard memory location", there is an address decoder that determines whether or not to activate that location during a read or a write operation, and M counters which accumulate a linear combination of the M-dimensional binary data words stored at that location. There is one counter at each hard memory location for each of the M bit positions, or coordinates, of the data vectors to be stored in the memory. In some applications, the data words will be N-dimensional vectors like the address vectors, so that a data word may be thought of as an address, or a pointer to the memory.

For two binary vectors $x = (x_1, \ldots, x_n)$ and $y = (y_1, \ldots, y_n)$, let $$d(x,y) = \sum_{i=1}^{N} |x_i - y_i|.$$

This is known as the Hamming distance between x and y. It is the number of coordinates for which $x_i \neq y_i$.

When a read or a write operation is performed at an address x, all of the hard memory locations within a fixed Hamming distance r of x are activated. This region of activation, which is a subset of S, may be viewed geometrically as a sphere with center at x and radius r. For example, Kanerva (1984) showed that if N = 1000 and r = 451, then the sphere contains about 1/1000 of the points in S. Therefore, since the hard memory locations are randomly distributed throughout S, the number of hard memory locations in this sphere is approximately 1/1000 of the total number of hard memory locations. The function of the address decoder at each hard memory location is to compute the Hamming distance between the given read or write address and the address of the hard memory location, and to activate the location if the distance is less than or equal to r.

When a data word (a binary vector) is written to the memory at address x, the word is added to the counters at each of the activated hard memory locations (those within distance r of x) according to the following rule: If the value of the $i^{th}$ bit of the data word is 1, the $i^{th}$ counter is incremented; if the value of the bit is 0, the counter is decremented. Since each counter has finite capacity, it must have an upper and a lower limit. If a counter's limit has been reached, and the system then tries to add another bit that would take the counter beyond its limit, the counter simply remains at its current value. However, if adding the new bit will keep the counter within its range, the counter will be updated. Eight-bit counters, each one having a range of ±127, should be sufficient for many applications.

When a read operation is done at an address x, the, separately for each coordinate i, the values stored in the $i^{th}$ counters of all of the activated hard memory locations are sent to an accumulator and added. Each of these sums is then compared to a threshold value, and if a sum is greater than the threshold, a 1 is recorded for that coordinate. Otherwise, a 0 is recorded. These 1's and 0's form a M-dimensional binary vector which is the result of the read operation.

Kanerva (1984) showed that if a word is written at address x, and if a read operation is later done at address y near to x in Hamming distance, then many of the hard memory locations which had been activated by the write operation at x will also be activated by the read at y. Conversely, for a data word stored at an address more distant from y, few or none of the hard memory locations to which it was written will be activated by the read at y. As a result, the sums computed during the read operation (at address y near x) will contain many copies of the data word written at x, one copy for each of the hard memory locations activated by both x and y, along with "random noise" due to small numbers of copies of other data words written at more distant addresses. Consequently, if x is the only write address near y, then the vector obtained from the read operation at y will be close to the data word originally stored at x. Because of the random noise, some of the bits may not be recovered correctly; however, since the memory system is designed to work with approximate information, its goal in many applications will be achieved if it can recover most of the bits in the stored data.

Kanerva (1984) computed the expected number of hard memory locations activated by both a write at x and a read at y, as a function of N, r, and d(x,y). Since the region of activation for x is a sphere of radius r centered at x, and the region for y is a similar sphere about y, the hard memory locations activated by both x and y are those whose addresses fall in the intersection of the two spheres. This region will be called the "access overlap". Kanerva derived a formula for the volume of the intersection of two such spheres, that is, the number of points of S in the intersection. Since the hard memory locations are randomly distributed, the expected number of hard memory locations in the intersection is proportional to the volume of the intersection. Some representative values of this expected number are given in Table 1 below.

The performance of the Sparse Distributed Memory, assuming a given number of hard memory locations, may be judged by its ability to recover a stored word with some degree of accuracy when we read from the memory at an address near to the address at which the word was written, assuming a certain number of other words have been written to the memory at other addresses. Thus it is clear that for the system to perform well, the access overlap must be large if $d(x,y)$ is small, and small if $d(x,y)$ is large.

A limitation on the performance of Kanerva's design is imposed by the fact that if the read address is a moderately small distance from the write address of the stored date word that is to be recovered, there is a substantial decrease in the size of the access overlap. Consequently, it may be difficult to recover the data word if the address is not accurately known. It would be better to have an even greater access overlap for small d and a smaller access overlap for large d, thereby increasing the signal to noise ratio.

Another disadvantage of Kanerva's system is that computing the Hamming distance for each hard memory location involves summing a large number of bits, an operation that requires specially designed hardware if it is not to be very time-consuming.

The Computer Systems Laboratory at Stanford University has constructed a small-scale prototype of Kanerva's Sparse Distributed Memory, referred to below as the "Stanford prototype". It is described fully by Flynn et al. in "Sparse Distributed Memory Prototype: Principles of Operation", Technical Report CSL-TR-87-338, published February 1988 and in "Sparse Distributed Memory Prototype: Address Module Hardware Guide", Technical Report CSL-TR-88-373, published in December 1988. A brief description of its design is as follows.

The Stanford prototype uses 256-bit addresses and 256-bit data words. It has room for 8192 hard memory locations, with 256 eight-bit counters for each hard memory location. The addresses of the hard memory locations may be set by the user. The address decoding is done by a custom-designed address module. During a read or a write operation, it computes the 256-bit Hamming distance between the "reference address"—the read or write address—and the address of each hard memory location, one at a time and compares that distance to a given radius. There is a specially designed set of adders to compute the Hamming distance sum quickly. If the Hamming distance is less than or equal to the radius, which means that the hard memory location is to be activated, a 13-bit "tag" identifying the hard memory location is sent to the "tag cache", a buffer that holds the tags of the activated hard memory locations until the data in their counters can be processed.

The process of updating the counters for the activated hard memory locations during a write, or accumulating the data in those counters during a read, is done by the "stack module", which consists of 256 bytes of memory for each hard memory location, and a processor to do the additions. Since the stack module receives tags from the tag cache, it can begin working while the address module is continuing to determine which locations should be activated. If the tag cache becomes full (an unlikely event), the address module must pause until the stack module can catch up.

There is a control module that sends commands and data to the other modules, and there is also an executive module, which functions as a user interface.

The Stanford prototype is designed to perform a read or a write operation in about 1/50 of a second.

SUMMARY OF THE INVENTION

In accordance with preferred embodiments of the invention, a new and different design is provided for a Sparse Distributed Memory system. Compared to Kanerva's design described above, the invention uses simpler address decoders that operate faster and require fewer connections with other parts of the system. In addition, the invention has better performance than the previous design, in the sense that when the address x is near to the address y, the number of hard memory locations activated by both x and y is greater than in the previous design, while for x and y farther apart the number of activated locations is about the same. Thus it is better able to recover a stored word by reading at an address near to where the word was written to the memory.

A computer memory system according to the invention includes a plurality of hard memory locations in number equal to K, where K is an integer greater than one, each hard memory location comprising M counters, C1 through CM, where M is an integer greater than zero. The system also has a reference address element for storing a reference address received from a source external to said memory system, for example an executive module, the reference address being a sequence of N bits, where n is an integer greater than zero. A data register element is used for storing data as a sequence of M integers. In addition, the memory system has a processor system that is coupled to the reference address element, to the hard memory locations, and to the data register element. The processor system is used for determining a subset of hard memory locations to activate for each reference address and for activating those hard memory locations during read operations and during write operations. The processor system is coupled to the reference address element such that for each hard memory location, the processor system receives a subset of the reference address bits equal in number to q, where q is an integer related to the proportion of the number of hard memory locations in the memory system that are to be activated relative to the total number of hard memory locations in the memory system. The subset of reference address bits is chosen by selecting, for each hard memory location, q integers between 1 and N at random as selected coordinates, each selected coordinate corresponding to a bit position within the reference address, and for each selected coordinate for each hard memory location, assigning a zero or one, at random, as an assigned value for that selected coordinate. The processor system then is used for storing the selected coordinates and the assigned values and in response to receiving the subset of reference address bits, for each of the selected coordinates for each of the hard memory locations, comparing the assigned value for the selected coordinate with the value of the corresponding bit in the subset of the reference address bits. The processor system then provides an activation signal for those hard memory locations for which the assigned values for all selected coordinates are identical with the corresponding bits in the subset of the reference address bits. During a write operation, the processor system combines data in the data register element with any data already located in the M counters in each of the activated hard memory locations, the M counters in each of the activated hard memory locations being used for storing the combined data. The memory system also has an accumulator system made up of a set of M accumulators, A1 through AM, with the $i^{th}$ accumulator, Ai, coupled to receive data from the $i^{th}$ counter, Ci, for each activated hard memory location, where i = 1 through M so that during a read operation each of the accumulators accumulates integers from the counters, receiving one integer from the corresponding counter for each activated hard memory location, thereby obtaining a value Vi in the $i^{th}$ accumulator, Ai. The accumulator system can then be used for outputting data corresponding to the values in the accumulators.

In a first alternative embodiment of the invention, another computer memory system is provided that can retrieve stored binary vectors of data, based again on only approximate addressing information. The memory system includes a control module element, a data module element, an address module element, and an activating element. The control module element provides a reference address during read and write operations and a data vector corresponding to the reference address during write operations. The data module element has a plurality of data fields (i.e. hard memory locations) equal in number to K, where K is a positive integer, each data field having a plurality of counters equal in number to M, where M is a positive integer. The data module element also has a processor element for summing the contents of the counters with incoming vectors of data from the control module element during a write operation, each counter for storing a linear combination of corresponding components of vectors of data transmitted from the control module element.

The address module element includes a reference address element for storing a reference address received from the control module element, a selected coordinate element for storing a set of bit positions for each data field in the data module, the bit positions hereinafter called the selected coordinates for the corresponding data field, and an assigned value element for storing a vector of assigned values associated with the selected coordinates for each data field. The address module element also has an exclusive-OR functionality for performing a logical exclusive OR between vectors output from the reference address element and vectors output from said assigned value element. Also included is an AND-Gate element which performs a logical AND of the vector output from the exclusive-OR functionality and the vector output from said selected coordinate element. Also included is a zero test system for testing the vectors output from the AND-Gate element, and for providing an identification signal for each vector from the AND-Gate element when all bits in a vector from the AND-Gate element are zeros.

The activating element receives the identification signals and provides a set of signals to the control module element indicating which data fields in the data module element are to be activated based on the reference address.

The data module element also includes a processor element that is used for summing data from the counters associated with the data fields when reading data from the memory system, such that when a set of data fields is activated the processor element sums the values in the counters of the activated data fields to form a vector of M sums, as in the first embodiment, and transmits a signal to the control module element corresponding to the vector of M sums.

In general, the control module element controls the address module element, the data module element, and the activating element, receives read information and write information from a user interface, transmits vectors of data to the data module element, and transmits data from the processor element to the user interface.

In a second alternative embodiment of the invention, yet another computer memory system is provided that can retrieve stored binary vectors of data, based again on only partial, or approximate, addressing information. As in the first alternative embodiment, the memory system includes a control module element, a data module element, and an address module element. The control module element, as for the first alternative embodiment, provides a reference address during read and write operations and a data vector corresponding to the reference address during write operations. The data module element, as for the first alternative embodiment, has a plurality of data fields equal in number to K, where K is a positive integer, each data field having associated therewith a plurality of counters equal in number to M, where M is a positive integer, the data module element again having a processor element for summing the contents of said counters with incoming vectors of data from the control module element, each counter for storing a linear combination of corresponding components of vectors of data transmitted from the control module element.

The address module element is coupled to the control module element and includes a tag counter system for providing a sequence of output signals corresponding to the address of each data field in the data module element in response to signals from the control module element. In the address module element is a hard address element coupled to receive the output signals from the tag counter system for storing a set of bit positions for the address of each data field in the data module element, the bit positions hereinafter called the selected coordinates for the corresponding data field. The hard address element is also used for storing a vector of assigned value bits associated with the selected coordinates for each data field. A logic element is also provided in the address module element for receiving the reference address from the control module element, for storing the reference address as a sequence of bits, for comparing bits of the vector of assigned value bits with bits from the reference address for the corresponding selected coordinates, and for providing an output logic signal when all of the compared bits for a data field match. The logic element thereby identifies which data fields are to be activated for storing or retrieving information in response to the reference address provided by the control module element.

The address module element also includes an activating element that is used for receiving the output signals from the logic element and for providing a set of signals to the control module element indicating which data fields in the data module element are to be activated based on the reference address.

The data module element also includes an accumulator element which sums data from the counters in the data fields when reading data from the memory system, such that when a set of data fields is activated the accumulator element sums corresponding components in the counters of the activated data fields to form a vector of M sums, and transmits a signal to the control module element corresponding to the vector of M sums.

The control module element, as for the first alternative embodiment, controls the address module element and the data module element, and receives read information and write information from a user interface, transmits vectors of data to the data module element, and transmits data from the accumulator element to the user interface.

In each of these alternative embodiments a particular method according to the invention has been used in setting up and activating the data fields and in entering data into those data fields. The method of choosing data fields which are to be activated when storing or retrieving data is made up of several steps. A number q is chosen, where q is related to the proportion of the number of data fields to be activated in the memory system during a single read or write operation. For each data field, q integers are chosen between 1 and N, at random, as selected coordinates to represent bit positions within an address vector. For each selected coordinate of each data field, a zero or one is assigned, at random, as the assigned value for the selected coordinate. The selected coordinates and the assigned values are then stored. In response to a reference address provided during a read or write operation, for each selected coordinate for each data field, the value of the corresponding coordinate of the reference address is compared with the assigned value for that selected coordinate. Those data fields for which the assigned value for all selected coordinates are identical with the corresponding bits of the reference address are then activated.

Following the activation of particular data fields, the data to be written during a write operation is combined with any data already located in the counters of each of those data fields that have been activated.

As will be shown in a broader context, there are a number of similarities between the Kanerva design and the present invention. These similarities lead to several designs according to the present invention that are intermediate between those already described and those of the Kanerva design. Also, a number of so-called hyperplane designs can be implemented which are special cases of the above described embodiments wherein the assigned values are all 0's or all 1's. In this broader context, the present invention can be viewed as a way of selecting those hard memory locations that are to be activated and as various hardware implementations for an address module to accomplish that selection.

In this broader context the method of activating hard memory locations in a Sparse Distributed Memory includes the steps of choosing a number N, where N is a positive integer, and providing a reference address vector which is N bits in length. For each hard memory location, an integer q and a threshold T are chosen, which may be different for each hard memory location, the integer $q \leq N$ except that if all $q = N$, not all T have the same value. Then, for each hard memory location, q distinct integers are chosen between 1 and N, as selected coordinates to represent positions within the reference address vector. For each selected coordinate for each hard memory location, a zero or one is assigned, as the assigned value for that selected coordinate. In response to a reference address vector provided during a read or a write operation, for each hard memory location, a function of the values of the reference address is evaluated based upon the values of the reference address corresponding to the selected coordinates for that hard memory location and the assigned values for the selected coordinates for that hard memory location. Those hard memory locations are then activated for which the function is greater than or equal to the threshold T.

The address module in this broader context is again for a computer memory system having a set of data fields, the address module for receiving a reference address that is a sequence of numerical values. It includes a hard address element for storing information identifying a set of positions in the sequence for each data field in said memory, the positions again called selected coordinates for the corresponding data field. The address module also has a logic element for receiving the reference address, for comparing a function of the values of the reference address corresponding to the selected coordinates for each data field with the set of assigned values for the selected coordinates for that data field, and for providing in response to that comparison a set of output logic signals identifying which data fields are to be activated for storing or retrieving data in response to the reference address.

BRIEF DESCRIPTION OF THE DRAWINGS

FIGS. 5A and 5B show a flowchart for address decoding according to the second alternative embodiment of the invention.

FIGS. 8A and 8B show a flowchart describing the function of the embodiment of FIG. 7.

FIGS. 11A and 11B show a flowchart describing the function of the embodiment of FIG. 10.

FIGS. 15A and 15B show a flowchart describing the function of the embodiment of FIG. 14.

DETAILED DESCRIPTION OF THE PREFERRED EMBODIMENTS

Figure 1:
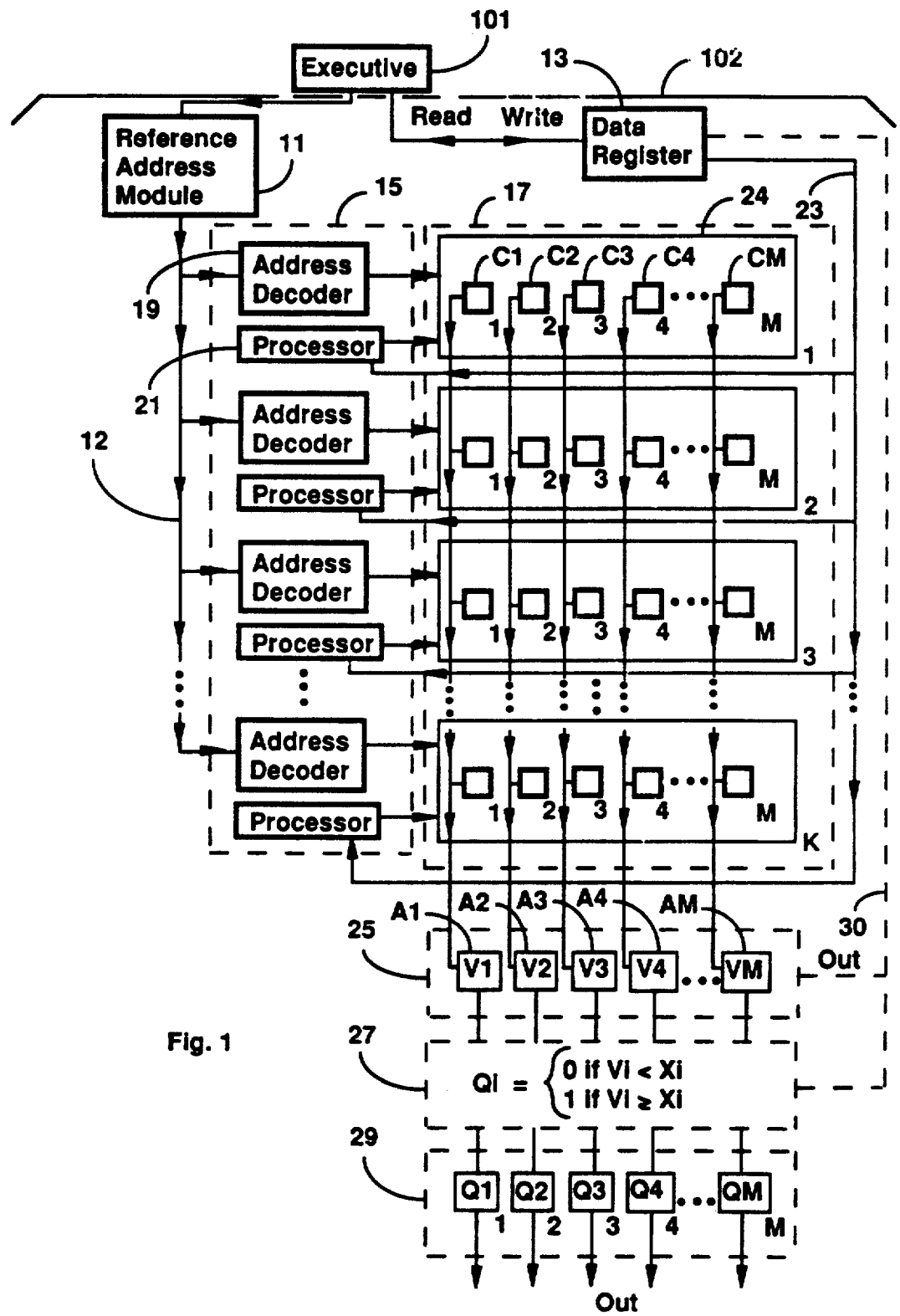
FIG. 1 shows an apparatus according to a first preferred embodiment of the invention.

In general, for a Sparse Distributed Memory, a memory location may be activated by any of a number of different addresses (i.e. points in address space S, the set of all possible N-bit binary words). Hence, any memory location may be described, or represented, by specifying the subset of S consisting of those addresses that activate the location. In Kanerva's design, described above, those subsets are spheres centered at points in S. According to the invention described below, however, the subsets are not centered at particular points in S.

To describe this new design for a Sparse Distributed Memory, one designates a large collection of subsets of the space S, each containing a certain proportion of the points in S, say about 1/1000 of them. Each of those subsets will represent a potential memory location, in the sense that the subset is the set of all addresses in S which would activate that location. One then chooses, say, one million of these potential memory locations at random and implements them as "hard memory locations". For purposes of illustration, it will also be assumed that N, the dimension of S, is 1000, so the number of points in S is $2^{1000}$. Each of the above numbers could of course be varied; they are given here as illustrative examples. Since Kanerva (1984) used these numbers in some of his examples, their use here will facilitate comparison of the two designs.

A principal difference between the present invention and Kanerva's design is in the way that the subsets of S representing potential memory locations are chosen. Other features of the invention, such as the particular counters at the hard memory locations and the way in which they are written to and read from, can remain the same, although other hardware implementations with the present invention become more convenient.

To more specifically characterize the invention, define a subset of S as follows: select any ten of the N=1000 coordinates, for example, the $37^{th}$, the $152^{nd}$, and so on. Assign a value of 0 or 1 to each of the ten selected coordinates, say 1 for Bit 37, 0 for Bit 152, and so on. The subset defined is then the set of all points in S whose components agree with the assigned values for all ten of the selected coordinates; the values of the bits for the other 990 coordinates are free to be either 0 or 1. In the example above, the subset is the set of all binary vectors in S whose $37^{th}$ bit is 1 and whose $152^{nd}$ bit is 0, etc. This subset represents a potential memory location, in the sense that such a memory location would be activated by any address in the subset.

Each such subset contains $2^{990}$ points, which is 1/1024 of the entire space S. If one wanted each subset to contain some other proportion of S, such as $\frac{1}{2^q}$ of S, one would select q coordinates to be given assigned values, instead of ten. (Hereinafter this particular approach of using a number of selected coordinates will be referred to as the selected-coordinate design.)

Thus a subset of this type is defined by giving its ten "selected coordinates" and the ten corresponding "assigned values". The number of such subsets is $$\binom{1000}{10} \times 2^{10}$$

(approximately $3 \times 10^{26}$), where the first term is the number of ways of selecting ten coordinates out of 1000, and the second term is the number of ways of assigning values of 0 or 1 to the ten selected coordinates. These subsets are isomorphic to one another in the sense that they can be mapped onto one another by permuting the order of the coordinates and interchanging the values 0 and 1 on the individual coordinates. Each of these subsets represents a potential memory location in the present invention. A certain number of them, say, one million, are chosen at random to be implemented as hard memory locations. (Each of these randomly chosen subsets will most likely be based on a different set of ten selected coordinates.)

For a given address, that is, a point in S, the class of potential memory locations activated by it (when reading or writing at that address) is represented by the class of subsets of S of the kind defined above that contain the point. A subset of this kind contains the given point if and only if the coordinates of the point agree with the assigned values for all ten of the selected coordinates which define the subset. In other words, a memory location is activated by this address if all ten of its assigned values for its ten selected coordinates match the corresponding coordinates of the given address.

The number of potential memory locations activated by a given address is therefore $$\binom{1000}{10}.$$

since this is the number of ways of selecting ten coordinates with which to define a subset. Once the ten coordinates have been selected, there is only one way to assign values to them so that they all agree with the given address. This number is 1/1024 of the total number of potential memory locations. If there are one million hard memory locations selected at random, the expected or average number of hard memory locations activated by an address will be 1,000,000/1024=976.56. The actual number will vary, but will be between 945 and 1008 for the majority of the possible addresses.

Given two addresses x and y with Hamming distance d(x,y) between them, one needs to know the number of potential memory locations activated by both addresses. The expected number of hard memory locations activated by both addresses is proportional to that number. If x is a write address and y is a read address, the number of copies of the word written at x which will be contained in the sums computed by a read at y is the number of hard memory locations activated by both x and y.

A memory location will be activated by both x and y is and only if both x and y agree with the assigned values for all ten of the selected coordinates which define that memory location. But this can happen only if x and y agree with each other on each of those ten coordinates. For example, with the numbers used above, if a memory locations is defined by: Bit $37=1$, Bit $152=0$, etc., then both x and y would activate this location if $x_{37}=y_{37}=1$, $x_{152}=y_{152}=0$, etc. The number of potential memory locations activated by both x and y may be found as follows: If $d(x,y)=d$, then x and y differ on d coordinates and agree on 1000-d coordinates. If a potential memory location is activated by both x and y, all ten of the coordinates defining it must be among the 1000-d coordinates on which x and y agree. The number of ways in which ten coordinates can be selected so that x and y agree on all of them is therefore:

$$\binom{1000-d}{10}.$$

the number of subsets of size ten which can be chosen from a set of size $1000-d$. If a memory location is to be activated by both x and y, the values assigned to its selected coordinates must agree with the corresponding coordinates of x and y. Therefore, one and only one potential memory location defined by a given set of ten coordinates on which x and y agree can be activated by both x and y, so the number above is the number of potential memory locations activated by both x and y.

The expected number of hard memory locations in the access overlap, that is, the expected number activated by both x and y, may be found by multiplying the number above by the ratio of the number of hard memory locations to the total number of potential memory locations. If there are one million hard memory locations, for example, that expected number is:

$$\frac{1,000,000}{2^{10}\binom{1000}{10}} \times \binom{1000-d}{10} = \qquad (1)$$

$$976.56 \times \frac{(1000-d)\ldots(991-d)}{1000\ldots991}$$

Three hardware embodiments of the present invention will be described below. For two of these embodiments, certain parts of their architecture, such as the data module (or stack module) and the tag cache, are similar to the Stanford prototype, described above, which has been built to implement Kanerva's design.

One way to implement the present invention relating to a Sparse Distributed Memory is to implement the system by having an address decoder for each hard memory location. During a read or a write operation, these address decoders would function simultaneously, each determining whether its location is to be activated, by comparing the values of the selected coordinates of the input (reference) address with the assigned values for the selected coordinates for that hard memory location. The address decoding can thus be done very quickly. That embodiment is illustrated in FIG. 1. An executive module 101 is the user interface to a Sparse Distributed Memory system, hereinafter SDM 102. The executive module 101 typically includes a computer workstation, for example a Sun 3/60, in order to allow the user to define the selected coordinates and assigned values of the hard memory locations, to write to and read from the SDM 102, and to perform various debugging operations.

SDM 102 itself is made up of a number of subsystems, and includes a reference address module 11 for temporarily storing reference addresses received from the executive module during read and write operations. For this specific embodiment, the reference address will be assumed to be N bits long, say $N=1000$, so that the reference address module 11 is in this example a 1000-bit register. The reference address module is coupled to a processor element 15, via a bus 12. This is a significant improvement over the Kanerva design which would require 1000 lines. The processor element 15 is coupled to a stack module 17 having K hard memory locations, such as hard memory location 24. In general, K is a large number, in order for the memory system to be very useful. However, for the general case, no minimum or maximum size for the memory system has yet been determined for optimum utility. A data register 13 is coupled to the processor element 15 via a data bus 23. The data register 13 stores data received from the executive module during write operations and can also be used to provide data to the executive module during read operations. In the general case, data register 13 stores M elements of information, typically either as M integers or M bits, where M is a positive integer. For each of the hard memory locations, there is a set of M counters, one for each element of the data register, such as C1 through CM which are associated with hard memory location 24. In operation, the processor element 15 makes comparisons of those bits in the reference address corresponding to the selected coordinates defining each hard memory location, and then activates each of the hard memory locations for which the assigned values for all of the selected coordinates match those bits in the reference address. In this specific example, it will be assumed that there are ten selected coordinates, so that if all ten match, then that hard memory location is activated. Then, when performing a write operation, for those hard memory locations that are activated, the processor element 15 combines the data from the data register 13 with whatever data is already stored in the counters for those activated hard memory locations, the data from the first element of the data register being combined with the data in the first counter C1, the data from the second element of the data register being combined with the data in the second counter C2, etc. In the case where the data is in the form of integers, the processor element 15 merely adds the data from the data register 13 to the counters, counter by counter. In the case where the data is in the form of bits, the processor element 15 increments or decrements each of the counters, according to the value of the corresponding bit in the data from the data register 13.

The stack module 17 is coupled to an accumulator module 25 having M accumulator elements, A1 through AM. Each accumulator element is coupled to accumulate the data from the corresponding counters in the stack module 17 for each activated hard memory location. For example, during a read operation, A1 accumulates the data stored in counter C1 of each activated hard memory location, A2 accumulates the data stored in counter C2 of each activated hard memory location, etc. In some applications, the values V1 through VM of the data in the accumulator elements can be read out immediately, either to an external device or via a bus 30 to the data register 13 for communication to the executive module 101. In some applications, it is preferable to compare the values in the accumulator elements to threshold values to obtain binary data. In that case, a thresholding processor 27 is used to compare each value V1 through VM with a corresponding threshold value, X1 through XM, where these threshold values are an arbitrary processor then creates a binary set, $\{Qi\}$, $i=1$ to M, for example such as $Qi=0$ if $Vi<Xi$ and $Qi=1$ if $Vi \geq Xi$, or, $Qi=0$ if $Vi \leq Xi$ and $Qi=1$ if $Vi>Xi$, or other equivalents thereof. The output of the thresholding processor 27 can then be stored in a separate register 29 for output to an external apparatus or, in the more typical case, is output via bus 30 to data register 13 for communication with the executive module 101.

In the preferred mode, processor element 15 is made up of a plurality of separate processors. In the simplest conceptual implementation, there are two processors for each hard memory location, one for decoding addresses, such as address decoder 19, in order to determine whether to activate that hard memory location on a read or write operation, and one for combining the data from data register 13 with the data in the counters of the activated hard memory locations, such as combining processor 21. Under that assumption, the address decoder for each hard memory location has ten inputs from the reference address module where the current reference address (read or write) is stored, one for each of the selected coordinates defining that location. The decoder compares the value of each of the ten inputs with the respective assigned value for that selected coordinate; if all ten match, the location is activated. Thus the address decoder can be simply a bit comparer and an AND-Gate with ten inputs, a standard type of electronic circuit. This is a significant improvement over the address decoders of the Kanerva design, each of which would require 1000 input lines, and would have to compute a sum of 1000 bits.

Those skilled in the art will realize however, that such massively parallel processing is at the present time very expensive, and considerable money could be saved by combining some of these processing functions into fewer processors, albeit while sacrificing some speed. In particular, the address decoder and processor at each hard memory location could be combined into a single processor for each hard memory location to perform both functions. Alternatively, only two processors could be used for the entire memory system, one for decoding all addresses and activating the appropriate hard memory locations, and one for combining data from the data register 13 with the data already stored in the counters for the activated hard memory locations. Similarly, it may be desirable to use a plurality of address decoding processors, one decoding processor for several hard memory locations, and a plurality of combining processors, one combining processor for several hard memory locations, to decrease the total number of processors while still maintaining a very high level of parallel operation. At the present time, most practical implementations of the above embodiment would be either very expensive or slow, or both. Another approach is illustrated in the following two alternative embodiments which are based on the fact that for many applications adequate speed can be attained by having one or several specially constructed units to perform the address decoding for the hard memory locations one at a time.

Each of these alternative embodiments has one such unit, called the "address module", for this purpose. However, it is clear that either of these embodiments could include several identical address modules, each working in parallel on a different subclass of the hard memory locations. In this way, the address decoding could be done faster, or more hard memory locations could be handled in the same amount of time.

An important point that should be kept in mind before proceeding is that the method of the present invention cannot be run on the Stanford prototype because in the present invention the set of reference addresses that activate a hard memory location is defined differently than in Kanerva's design, and therefore the present invention uses a different method for determining which hard memory locations are to be activated. In the present invention, a hard memory location is indifferent to the values of most of the bits in the reference address. Moreover, each hard memory location is indifferent to a different set of reference address bits. The Stanford prototype does not provide for computing the Hamming distance based on a different subset of the address bits for each hard memory location. (The Stanford prototype does allow for a "global" mask, so that a given subset of the 256 reference address bits can be used in a read or a write operation, but that subset must remain the same throughout the operation. The present invention uses a different subset of address bits for each hard memory location.)

Figure 2:
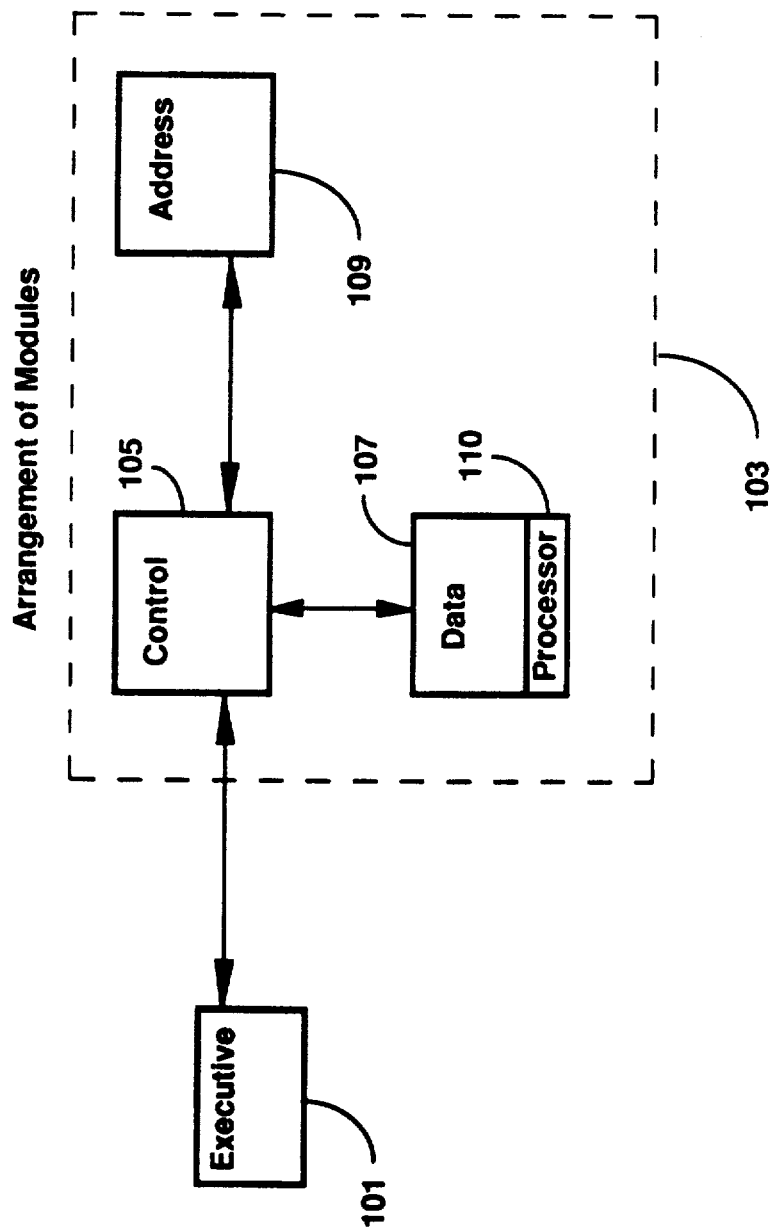
FIG. 2 shows a general block diagram of a computing apparatus having a Sparse Distributed Memory.

The overall arrangement of the modules in these two alternative embodiments is, however, similar to that in the Stanford prototype, and is shown in FIG. 2.

As in the previous embodiment, executive module 101 is the user interface to a Sparse Distributed Memory system, hereinafter SDM 103. SDM 103 itself contains three modules. An address module 109, the key element in each of the two following alternative embodiments, is designed differently in each embodiment, and will be described in detail below. Each embodiment includes a data module 107, which, in the preferred mode, includes a processor 1101 and a large amount of memory, and is essentially the same as "stack module" in the Stanford prototype.

The data module contains the counters for the hard memory locations, and the processor for summing incoming data with that already in the counters during a write operation, and for accumulating data from the counters during a read operation. A control module 105 receives commands and data from the executive module, sends data to it, passes tags from a tag cache 252 (See FIG. 3 and FIG. 4) to the data module, and generally controls the functioning of the address and data modules.

Figure 3:
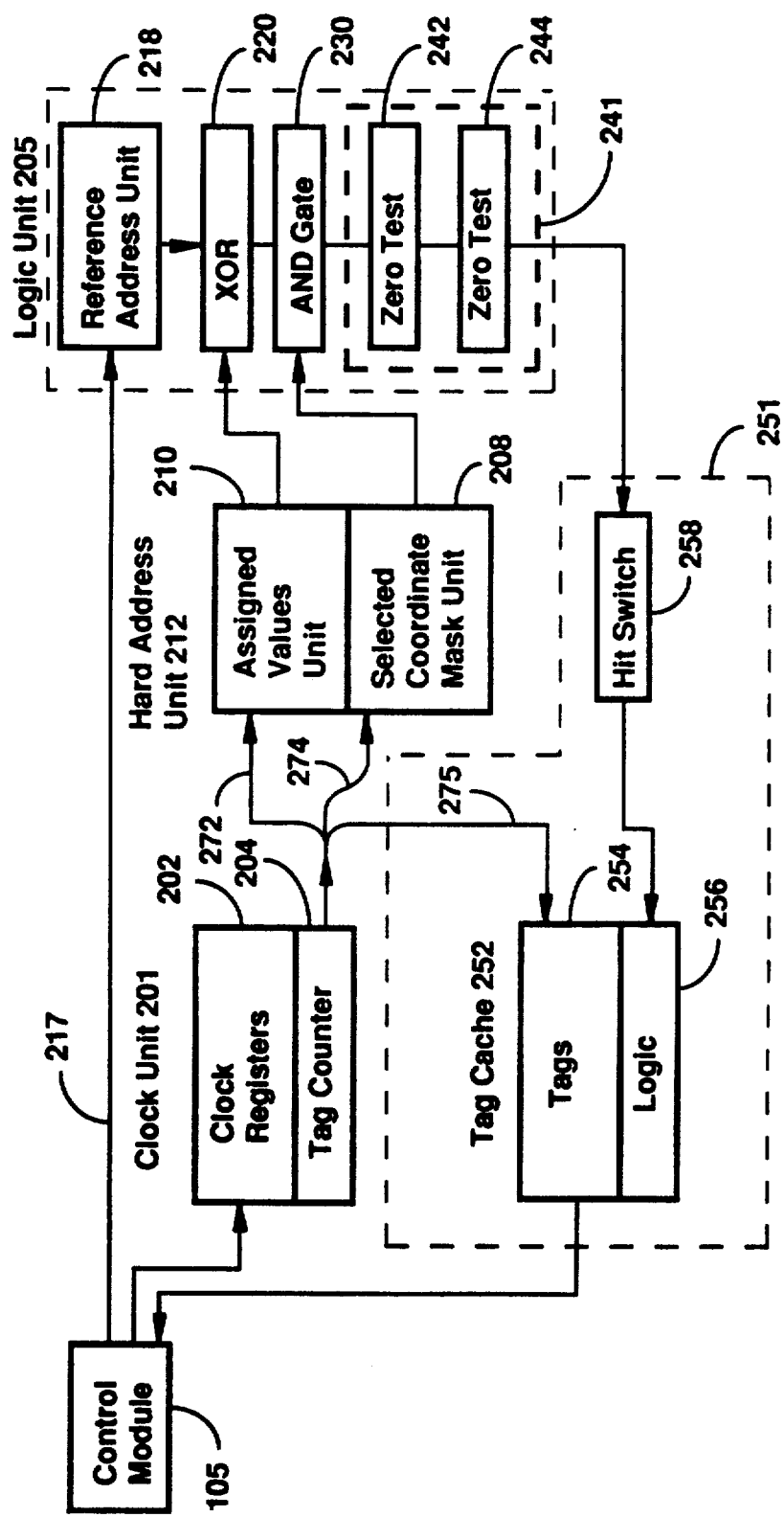
FIG. 3 shows an Address Module according to a first alternative embodiment of the invention.

Address module 109 in this first alternative embodiment is shown in detail in FIG. 3. It includes a clock unit 201 that contains a clock generator and registers 202, various status flags, and a tag counter 204, which points to a hard memory location in a hard address unit 212. During a read or a write operation, the tag counter is successively incremented so that it points to each of the hard memory locations in turn. Hard address unit 212 stores the addressing information, i.e. the selected coordinates and their assigned values, which define each of the hard memory locations. A logic unit 205 compares the reference address (i.e. the read or write address provided by control module 105 in response to a read or write command from the executive module 101) to the information defining each hard memory location, one at a time, and determines whether that hard memory location is to be activated. As explained earlier, a hard memory location is activated if the assigned values for all of its selected coordinates agree with the corresponding bits in the reference address. If a location is to be activated, a hit switch 258 is set and the value in tag counter 204 is stored in tag cache 252, which is essentially the same as the "tag cache" in the Stanford prototype. These tags are then sent to date module 107, where the data in the counters is processed. FIG. 3 and later figures include a hit system 251, made up of hit switch 258 and tag cache 252. Tag cache 252 is made up of a tag storage element 254 and a logic element 256, and tag cache 252 communicates with the tag counter 204 via signal line 275. The tag cache is a buffer that holds the tags for the activated hard memory locations until they can be sent to the data module, where the data in the counters is processed. Those skilled in the art will understand that this hit system is not a necessary function of the invention, since the activation signals could be sent directly to the data module. It is preferred however to use the hit system, since that measurably increases the speed of operation.

For purposes of description, this first alternative embodiment will be assumed to have 256-bit addresses and 8192 hard memory locations, like the Stanford prototype, although these numbers can be varied.

The information defining each hard memory location is stored in hard address unit 212 as two 256-bit words, one in each half of the hard address unit, i.e. one word in an assigned values unit 210 and one word in a selected coordinate mask unit 208. The first word for each hard memory location contains the assigned values for the selected coordinates, in the positions corresponding to those selected coordinates; the other bits in this word may have any values. The second words for each hard memory location acts as a mask. It has a 1 in the position corresponding to each selected coordinate, and all of the other bits are 0. Hence, for this first alternative embodiment, 64 bytes of memory (512 bits) are required for each hard memory location, for a total of 8192×64 bytes of RAM (twice the amount used in the Stanford prototype). Although this may appear to be a somewhat inefficient use of memory space, it allows one to use relatively simple logic in implementing the embodiment. In this preferred embodiment, the tag counter 204 is coupled via lines 272 and 274 to each half of the hard address unit (210 and 208, respectively), so that the tag counter can point simultaneously to both part of the information defining a hard memory location.

Logic unit 205 performs as follows: At the beginning of a read or write operation, a 256-bit reference address unit 218 (typically consisting of 32 eight-bit latches) receives a reference (read or write) address from the control module 105 via signal line 217. Then, for each hard memory location, the following steps are performed: an array of logic elements, XOR 220, performs a 256-bit exclusive-OR of the reference address and the assigned value word from the first half of the hard address unit, the assigned values unit 210, containing the assigned values for the selected coordinates of the hard memory location pointed to by the tag counter 204. Then another logic array, AND-Gate 230, performs a 256-bit logical AND of the result of the XOR 220 and the word from the second half of the hard address unit, the selected coordinate mask unit 208, which contains 1's at the positions of the selected coordinates for that hard memory location and 0's at the other positions.

The resulting 256 bits have the following values. If a bit position is not a selected coordinate, the bit is a 0 (due to the AND). If a bit position is a selected coordinate, then the bit is a 0 if the corresponding bit in the reference address agrees with the assigned value, and the bit is a 1 they disagree (due to the XOR). It follows that the hard memory location is to be activated if and only if all 256 of the resulting bits are 0. One example of a way to test the 256 bits for all zeroes is to send them to a two-stage array of logic elements 241, which is made up of zero test 242 and zero test 244. The first stage 242 consists of 16 elements, each having 16 inputs. Each element sends a 0 to the second stage 244 if and only if all of its inputs are 0's. The second stage 244 consists of one element just like the elements in the first stage: it outputs a 0 if and only if all 16 of its inputs form zero test 242 are 0's. If the output of the second stage 244 is a 0, indicating that the hard memory location is to be activated, a hit switch 258 is set and the contents of the tag counter 204 is stored in tag cache 252. Then, whether or not the hard memory location is activated, the tag counter 204 is incremented and logic unit 205 proceeds with the next hard memory location. If necessary, the hit switch 258 is reset.

For comparison purposes, it should be apparent that this address module of the first alternative embodiment can run somewhat faster than the one in the Stanford prototype, because the latter must compute the sum of the 256 bits resulting from the XOR of the reference address and each hard memory location address, whereas the module above simply performs a logical AND, and tests the 256 bits for all zeroes. (Note that if hardware elements for performing a fast 256-bit addition, as found in the Stanford prototype, are added to this embodiment, then it could execute either Kanerva's design or the present invention, or a hybrid of the two.)

Figure 4:
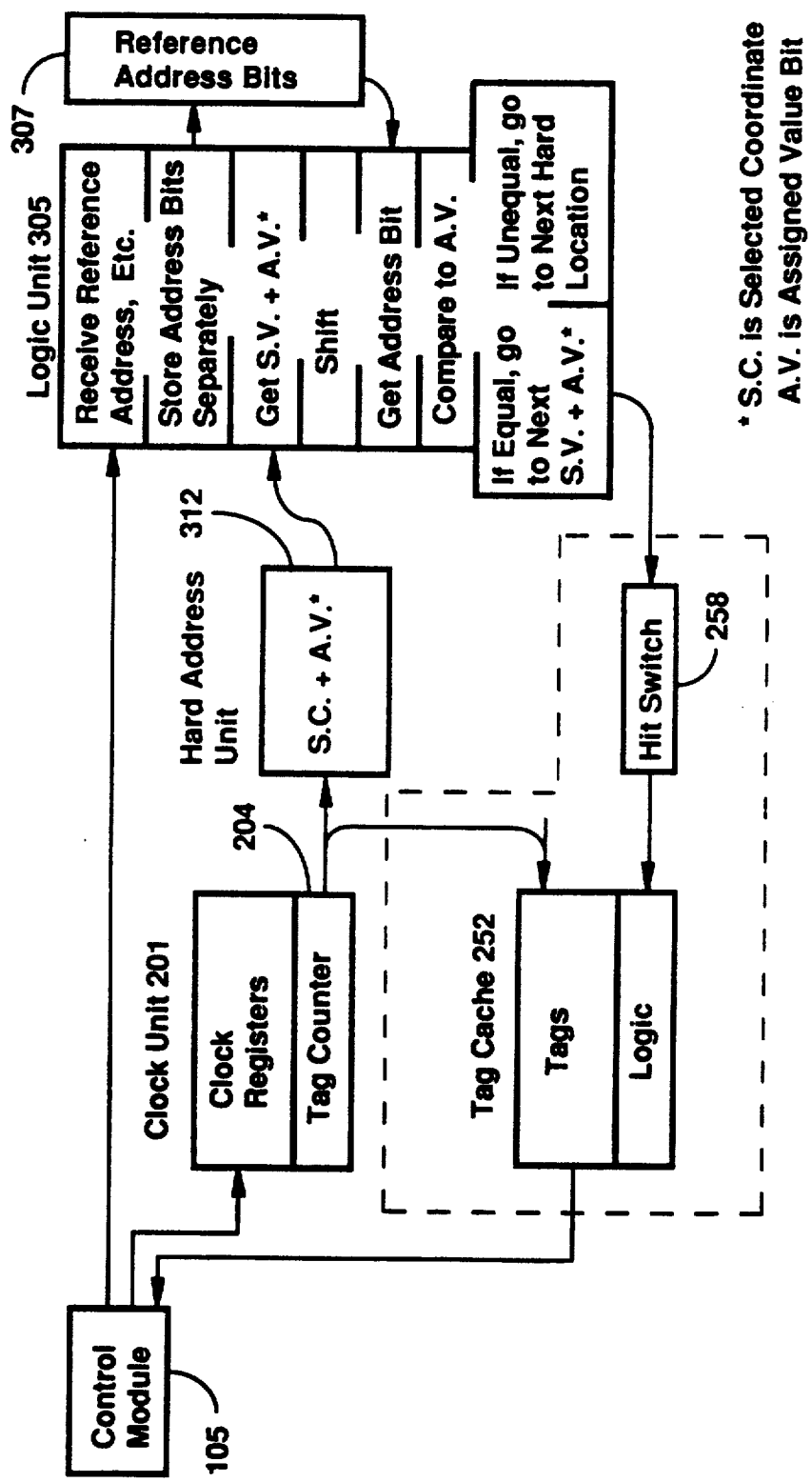
FIG. 4 shows an Address Module according to a second alternative embodiment of the invention.

For clarity, a few counters, logic elements, and data lines are not shown in FIGS. 3 or 4. For example, there must be a line from the control module 105 to the hard address unit 212 so that the information defining the hard memory locations can be sent to that unit; a line to reset the hit switch 258; counters and logic elements to control the tag cache 252; and a line to signal that the tag cache 252 is full.

Many applications may require addresses that are longer than 256 bits. The basic architecture of the first alternative embodiment described above can be modified so that longer addresses can be used, but the hard address unit and the logic unit would require proportionately more hardware. For example, to allow for 512-bit addresses, about twice as many components would be needed for these units.

The second alternative embodiment of the invention, whose address module is shown in FIG. 4, differs from the embodiment above only in its address module, and can be used in applications where the addresses are very long binary words. Addresses consisting of many thousands of bits might be required, for example, in cases where the addresses represent complex visual or auditory information. In the description of this embodiment, it is assumed that the addresses can consist of as many as $2^{15}=32,768$ bits, although this number could of course be varied. As in the first alternative embodiment, this embodiment includes in its address module a clock unit 201, a tag counter 204, a tag cache 252, and a hit switch 258, which have substantially the same functions as in the first alternative embodiment. In this embodiment, a hard address unit 312 is somewhat simpler than the hard address unit of the first alternative embodiment in that hard address unit 312 requires 20 bytes per hard memory location, compared to 64 in the first alternative embodiment. The logic unit of this second alternative embodiment, logic unit 305, however, is more complex and somewhat slower.

An underlying principle of the second alternative embodiment is the way in which the information defining the hard memory locations is stored in the hard address unit 312. A hard memory location is defined by giving its selected coordinates and their assigned values. If the addresses are 32,768-bit words, a coordinate (a bit position) may be indicated by a number between 0 and 32,767, which may itself be represented by a 15-bit binary number. A selected coordinate, together with one bit for its assigned value, may therefore be represented by a 16-bit word, which can be stored in two bytes of memory. Thus, assuming ten selected coordinates per hard memory location, each hard memory location requires 20 bytes in the hard address unit 312. Those skilled in the art will understand, of course, that the number of selected coordinates could be varied. Also, it should be apparent that packing the assigned value bit with the number of the selected coordinate as one 16-bit word in this way is not necessary, but it is quite convenient.

As in the first alternative embodiment, tag counter 204 steps through the hard memory locations, and when logic unit 305 finds a hard memory location that should be activated, its tag is sent to tag cache 252. (Recall that the number of counters per hard memory location in the data module 107 need not be the same as the number of bits in the addresses; to implement 32,768 counters per hard memory location would require a huge amount of memory, although in principle one can have as many as one wants.)

Figure 5B:
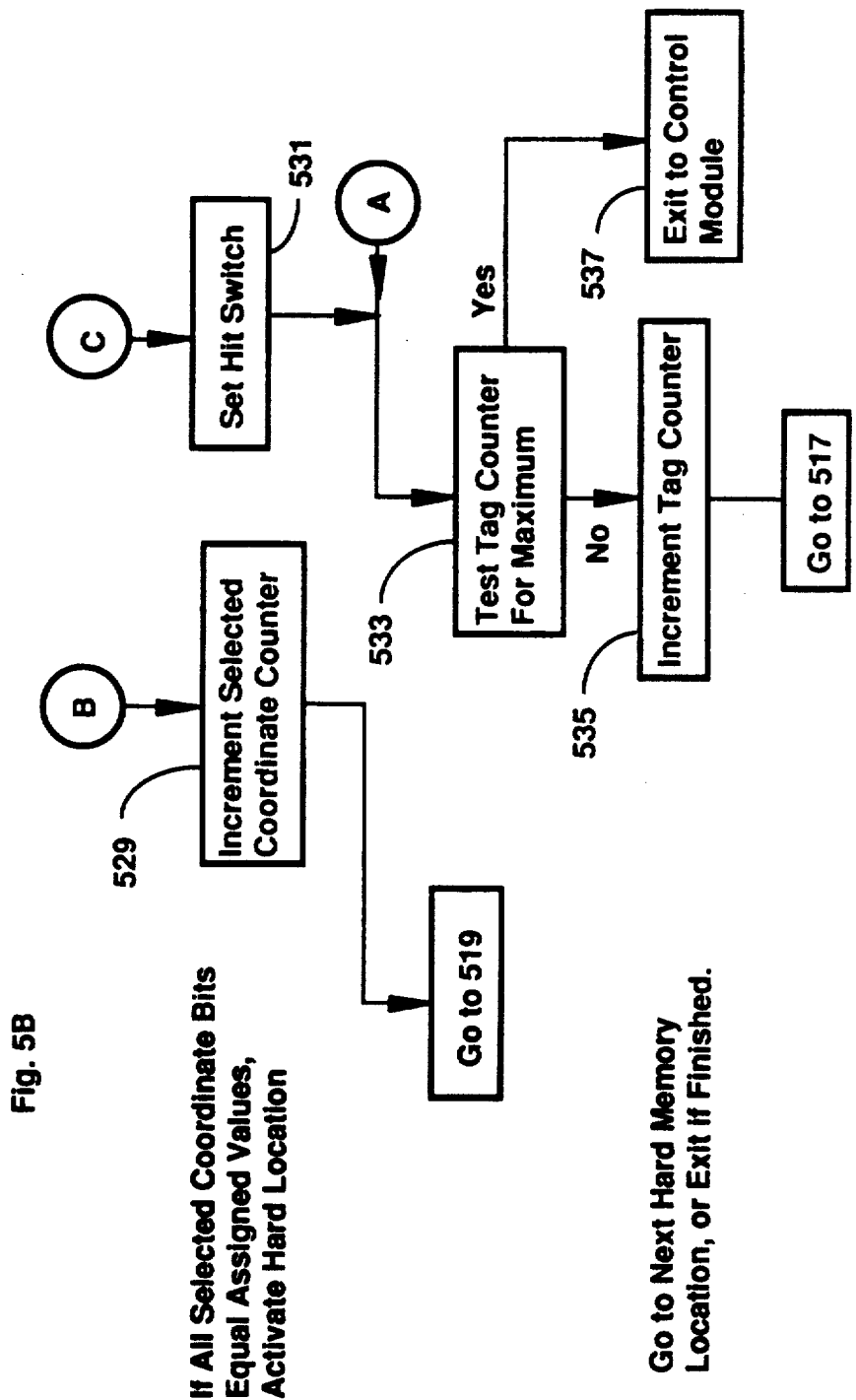

The logic unit 305 is a processor that performs the following functions illustrated in the flowchart of FIGS. 5A and 5B: At the beginning of a read or a write operation, a command is issued from the control module 105 according to program element 511, and the logic unit 305 receives from control module 105 the number of bits in the reference address (in this particular embodiment up to 32,768), the number of selected coordinates per hard memory location (up to ten), and the reference address as signified by program element 513. The logic unit 305 stores the reference address in a set of internal memory locations 307, one bit per location, so that it will have direct access to each bit. (These internal locations could be wired directly to the control module 105.)

The logic unit 305 then performs the following steps for each hard memory location: For each selected coordinate, it receives the two bytes from the hard address unit 312 giving the number of that selected coordinate and its assigned value, and it compares the assigned value bit to the corresponding bit in the reference address. This is accomplished by first initializing the tag counter 204, the contents of which acts as a pointer to hard address unit 312 as per program element 515; then the selected coordinate counter is initialized as per program element 517; and then the two-byte word containing the selected coordinate and assigned value information is obtained from hard address unit 312 as per program element 519. (Program element 517, shown in FIG. 5A is the beginning of an inner program loop through each of the selected coordinates for one hard memory location.) The logic unit 305 shifts this two-byte word by one bit, to separate the bit for the assigned value from the number of the selected coordinate as per program element 521. The number of the selected coordinate is used as an internal address to retrieve the corresponding bit in the reference address as per program element 523. This reference address bit is then compared to the assigned value bit at program element 525. It these bits are equal, the logic unit 305 repeats the above steps with the next selected coordinate for the hard memory location, and then the next, and so on, as long as the appropriate bit from the reference address is equal to the corresponding assigned value bit. If the bits match for all of the selected coordinates, then the hard memory location is to be activated; in that case the hit switch 258 is set and the contents of the tag counter 204 is stored in the tag cache 252. However, if for any selected coordinate the bits are unequal, that hard memory location will not be activated, so the logic unit 305 immediately proceeds to the next hard memory location. This portion of the inner loop of this nested loop process is illustrated in more detail in program elements 525 through 535. At program element 525, the reference address bit is tested to see if it is equal to the assigned value bit. If the reference address bit is not equal to the assigned value, the logic unit proceeds to test whether the tag counter has reached its maximum at program element 533. If the tag counter is at its maximum, then the logic unit exits to the control module at program element 537. If the tag counter is not at its maximum, the tag counter is incremented at program element 535 so as to proceed to the next hard memory location, and the logic unit begins the inner loop again at program element 517. If at program element 525, the reference address bit is equal to the assigned value, then at program element 527 the logic unit tests the selected coordinate counter to see if all selected coordinates have been stepped through. If they have not, then the selected coordinate counter is incremented at program element 529, and the logic uit proceeds to test the next selected coordinate by looping back to program element 519. If the selected coordinate counter is at its maximum at program element 527, then the reference address bits match the respective assigned values for all of the selected coordinates, so the hit switch 258 is activated at program element 531, and the contents of the tag counter 204 is stored in the tag cache 252. The logic unit then proceeds as described earlier with regard to program elements 533 through 537.

With the above process, an estimate of the relative speed of the first and the second alternative embodiments of the present invention can be made. Assuming that the selected coordinates and their assigned values are chosen at random, one can see that the logic unit 305 will eliminate most of the hard memory locations after checking only two or three of the selected coordinates: half of the hard memory locations will be eliminated on the first selected coordinate, half of the remaining ones on the second, and so on. Only a very small proportion of the hard memory locations must have all ten of their selected coordinates checked. The average number of selected coordinates that must be checked per hard memory location is two.

In the first alternative embodiment the logic unit 205 performs approximately seven basic steps for each hard memory location, while in the second alternative embodiment the logic unit 305 must perform about the same number of steps for each selected coordinate for each hard memory location. Since the logic unit 305 in the second alternative embodiment checks two selected coordinates per hard memory location, on the average, the second alternative embodiment will take about twice as long as the first alternative embodiment to perform a read or a write operation. (If greater speed is desired in either embodiment, it could have two or more logic units, operating in parallel on different subclasses of the hard memory locations.)

On the other hand, the second alternative embodiment can handle much longer addresses than can the first, and it requires less memory space in its hard address unit 312.

COMPARISON OF THE INVENTION TO KANERVA'S DESIGN

The hardware needed for the address decoders is simpler in the present invention. One way to implement either design is to have an address decoder at each hard memory location, so that they can simultaneously determined whether each location is to be activated, such as is described with respect to FIG. 1. As indicated earlier under that embodiment, the address decoder for each hard memory location has ten inputs from the reference address module where the current read or write address is stored, one for each of the selected coordinates defining that location. The decoder compares the value of each of the ten inputs with the respective assigned value for that selected coordinate; if all ten match, the location is activated. The address decoder is simply a bit comparer and an AND-Gate with ten inputs regardless of the value of N. In Kanerva's design, however, assuming N=1000 bits in the addresses, each address decoder has 1000 inputs, from which it computes a Hamming distance, an operation that involves comparing and adding 1000 bits. The address decoders in the present invention, therefore, are far simpler, work faster, and have fewer input connections.

As stated earlier, the performance of a Sparse Distributed Memory depends on the size of the access overlap for given addresses x and y. The following table compares the size of the access overlap for the present invention to that for Kanerva's design, for selected values of $d(x,y)$. Assume N=1000 and one million hard memory locations in each design; in Kanerva's design spheres will be used with radius 451, since the volume of a sphere with this radius is approximately 1/1000 of S. The numbers in the middle column are from *SPARSE DISTRIBUTED MEMORY*, 1988, by Pentti Kanerva, MIT Press, Cambridge, Mass., (hereinafter Kanerva, 1988), Table 7.1, page 63. The numbers in the third column are computed from formula (1) above regarding the expected number of hard memory locations in the access overlap.

TABLE 1

| | Expected number of hard memory locations activated by both x and y | |
|---|---|---|
| d(x,y) | Kanerva's design | Present invention |
| 0 | 1000 | 977 |
| 1 | 894 | 967 |
| 10 | 743 | 883 |
| 50 | 445 | 583 |
| 100 | 267 | 339 |
| 150 | 162 | 191 |
| 200 | 97 | 104 |
| 300 | 30 | 27 |
| 400 | 7 | 6 |
| 500 | 1 | 0.91 |

To compare the performance of the two designs, some assumptions will be made so that approximate memory capacities and signal-to-noise ratios for the two designs can be computed. Although these assumptions may be simplistic, a comparison of the numbers obtained for the two designs under the same conditions will give an idea of their relative performance. Assume that both designs are constructed using the parameter values on which Table 1 is based.

Assume that the data in a "training set" have been written to the memory. The training set consist of T write addresses $x_1, x_2, \ldots, x_T$ and an M-bit data word for each address. The number of words written to the memory might be in the thousands or tens of thousands. These data words are written to the memory by the method described above: The counters in the activated hard memory locations are incremented or decremented according to whether the corresponding data bit 1 or 0. No "retraining" of the memory to improve its response is done.

Suppose that one is reading at address y, and that there is one and only one address, say $x_1$, near y, at which a data word was written. The goal is to recover the data word written at $x_1$. Also assume that al of the other write addresses are "randomly" scattered about S, and that the data words written are "random". These assumptions will be made more precise below. If a point in S is chosen at random, its expected distance from y is $N/2=500$, and with very high probability its distance from y will be in the range 450 to 550. Thus it will be assumed that for all of the write addresses except $x_1$, their distance from y is in that range.

One can see from Table 1 that when one reads at y, each of the write addresses, other than $x_1$, has a very small access overlap with y; thus, when the contents of the counters of the activated hard memory locations are summed, the contributions to the sums of the counters due to the data words written at the other addresses will be only a few copies, if any at all, of each of the words written at those addresses. The word written at $x_1$ will of course be included in these sums many times, once for each hard memory location in the access overlap of $x_1$ and y. Thus, when one computes these sums and compares them with appropriate threshold values, one should recover most of the individual bits of the word written at $x_1$. One may not recover all of the bits correctly, because it may happen that for a small proportion of the coordinates, the "random noise" will overwhelm the multiple copies of the correct value, and those bits will be lost. But, in many applications, it is sufficient to recover most of the bits correctly, when given only approximate retrieval information, that is, the address y.

If y is very close to $x_1$, that is, if $d(x_1, y)$ is considerably less than 50, then in either design the access overlap is so large that one should be able to recover the stored word accurately, even in the presence of a large amount of noise. On the other hand, if $d(x_1,y)>200$, the access overlap is small, and about the same, in both designs, so if T is large it will be difficult to recover the stored word accurately. Kanerva (1988) showed that under some assumptions similar to those made herein, a distance of 200 between $x_1$ and y is nearly the outer limit for recovering the word stored at $x_1$ by reading at y. Since his argument is based on the size of the access overlap as function of distance, Table 1 shows that a similar argument holds for the selected-coordinate design of the present invention. So one can compare the designs for $d(x_1,y) \leq 200$.

To compare the designs, it will simplify matters if one assumes that the write addresses $x_1$ and the read address y are given, with y near $x_1$ and approximately 500 away from the other $x_1$. There are two remaining sources of random fluctuation: the bits in the data words, which will be assumed to be random, and the random sample of potential memory locations to be implemented as hard memory locations.

Consider one of the M bit positions in the data words. Since the data in each of these bit positions is processed separately, the same analysis would apply to each bit position. For each data word, define a random variable $B_i$ corresponding to the bit under consideration in the $i^{th}$ data word as follows: If the data bit is 1, let $B_i = 1$, and if the bit is 0, let $B_i = -1$. These values are used because they correspond to incrementing or decrementing the counters when the word is written to the memory. Assume that $P(B_i = 1) = P(B_i = -1) = 0.5$, so that $E(-B_i) = 0$. Also assume that each $B_i$ is independent of the other $B_j$ ($j \neq i$), that the values of the $B_1$ are unrelated to the write addresses or the read address, and that the $B_1$ are independent of the random choice of hard memory locations. Since the goal in reading at y is to recover the bit $B_1$, one can assume that $B_1$ is fixed.

For each write address $x_1$, let the random variable $L_1$ be the number of hard memory locations in the access overlap of $x_1$ and y. The expected value $\lambda_1$ of $L_1$ is a function of $D(x_1, y)$, depending on the design; the formulas derived below apply to both designs, except that the values of the $\lambda_1$ are different for the two designs. (Table 1 gives values of $\lambda_1$ for each design.) Since the hard memory locations are chosen at random, and $\lambda_1$ is small compared to the total number of hard memory locations, the distribution of $L_1$ is very close to a Poisson distribution. Therefore the variance of $L_1$ can be approximated by $Var(L_i) = E(L_i) = \lambda_1$, from which it follows that $$E(L_i^2) = Var(L_i) + [E(L_1)]^2 = \lambda_i + \lambda_i^2.$$

Since the read and write addresses are taken to be fixed, it also follows from these assumptions that each of the $B_1$ is independent of all of the $L_1$.

When one reads at y, the contents of the counters at the hard memory locations activated by y are summed. Let $\Sigma$ be the sum of the counters at the activated locations for the bit position under consideration. Since the counter at each of those locations contains the sum of the $B_1$ corresponding to the $x_1$ that activated that location, it follows that for each i, the value $B_1$ occurs in the sum $\Sigma$ once for each hard memory location activated by both $x_1$ and y. Therefore, $$\Sigma = \sum_{i=1}^{T} L_i B_i.$$

See Kanerva (1988), p. 67.

Since one wants to recover $B_1$, which is assumed to be fixed, the sum can be rewritten as $$\Sigma = L_1 B_1 + \sum_{i=2}^{T} L_i B_i$$
$$= \lambda_1 B_1 + (L_1 - \lambda_1) B_1 + \sum_{i=2}^{T} L_i B_i.$$

In the last expression above, $\lambda_1 B_1$ is regarded as the "signal" ($\lambda_1$ is the expected number of copies of $B_1$ in $\Sigma$), and the other terms, which contain the random variables, as the "noise". The first noise term is due to the uncertainty in the number of copies of $B_1$ in $\Sigma$, and the other noise terms are due to the other data words.

The expected value and the variance of the noise can now be calculated. Since $E(L_1) = \lambda_1$, and $B_1$ is fixed, one has $E[(L_1 - \lambda_1)B_1] = 0$; since for $i > 1$, $E(B_i) = 0$, and $B_i$ is independent of $L_i$, one has $E(L_i B_i) = E(L_i) * E(B_i) = 0$. So the expected value of the noise is 0.

The variance of a sum is the sum of the variances and the covariances of the summands. It can be shown that under the above assumptions all of the covariances are 0; i.e. since $B_1$ is fixed and the other $B_i$ are independent of each other and of all of the $L_i$, it can be shown that, for $2 \leq i \leq T$, $$Cov[(L_1 - \lambda_1)B_1, L_i B_i] = 0,$$

and, for $2 \leq i \leq j \leq T$, $$Cov(L_i B_i, L_j B_j) = 0.$$

So the variance of the sum is the sum of the variances. First, since $B_1 = \pm 1$, $$Var[(L_1 - \lambda_1)B_1] = \lambda_1. \text{ And for } 2 \leq i \leq T,$$

$$\begin{aligned} Var(L_i B_i) &= E(L_i^2 B_i^2) - [E(L_i B_i)]^2 \\ &= E(L_i^2 * 1) - 0 \\ &= \lambda_i + \lambda_i^2, \end{aligned}$$

since $B_i^2$ is always 1. Therefore, the variance of the noise is $$\lambda_1 + \sum_{i=2}^{T} (\lambda_i + \lambda_i^2).$$

If $d(x_i, y)$ is 500, then, using the values in Table 1, one sees that for Kanerva's design, $\lambda_i + \lambda_i^2$, and for the selected-coordinate design it is 1.74. Since it is assumed that for $2 \leq i \leq T$, $d(x_i, y)$ is near 500, and since for both designs $\alpha_i$ in this range is a gradually decreasing function of the distance, one can approximate $\lambda_i + \lambda_i^2$ for the two designs by 2 and 1.74, respectively. This will result in a slight underestimate of the variance of the noise for both designs. The approximate variance of the noise for Kanerva's design is then $$\lambda_{1,k} + 2(T-1),$$

and for the design of the present invention it is $$\lambda_{1,s} + 1.74(T-1).$$

The subscripts k for Kanerva's design and s for the selected-coordinate design indicate that the value of $\lambda_1$ is different for the two designs.

Since $\Sigma$ is a constant, $\lambda_1 B_1$, plus a sum of uncorrelated noise terms, the distribution of $\Sigma$ is approximately normal with mean $\lambda_1 B_1$ and variance as given above. If one uses 0 as a threshold value, that is, if one decides that the bit recovered by the read operation is a 1 if $\Sigma > 0$, then the normal distribution can be used to find the approximate probability of recovering $B_1$ correctly. For example, if $d(x_1, y) = 100$ and if one assumes that $B_1 = 1$, then, for Kanerva's design, $\Sigma$ is approximately normally distributed with mean 267 and variance $267+2(T-1)$. Therefore, $$Z = \frac{\Sigma - 267}{\sqrt{267 + 2(T-1)}}$$

is approximately a standard normal random variable (mean 0 and variance 1), and $\Sigma > 0$ is equivalent to $$Z > \frac{-267}{\sqrt{267 + 2(T-1)}}.$$

Thus, for a given value of T, the number of stored data words, the probability of correctly recovering $B_1$ under the conditions above is probability that Z satisfies this inequality.

Conversely, if one wants the probability of recovering $B_1 = 1$ to be, say, 99% when $d(x_1, y) = 100$, one can compute the maximum value of T for which, under the conditions above, this probability will be at least 99%. Since Z is approximately normal, it follows that $P(Z > -2.33) \approx 99\%$. Therefore one must find the value of T for which the right side of the inequality above is $-2.33$. Solving the following equation $$\frac{-267}{\sqrt{267 + 2(T-1)}} = -2.33$$

for T, one finds $T_k \approx 6,433$ data words.

If one does the same computations for the selected-coordinate design, one has $$Z = \frac{\Sigma - 339}{\sqrt{339 + 1.74(T-1)}}.$$

and if one solves for T in the equation $$\frac{-339}{\sqrt{339 + 1.74(T-1)}} = -2.33$$

one finds $T_s \approx 11,972$ data words. This is 86% more than the value found above. In other words, under these conditions, if the selected-coordinate design has 86% more stored data words than Kanerva's design, the two designs will have the same probability of recovering a data bit.

One can define a signal-to-noise ratio as the size of the signal, $\lambda_1$, divided by the standard deviation of the noise. If T is large, one can simplify the formulas by omitting the first term in the variance expressions above; although this will somewhat underestimate the noise for both designs, one will still have a fair comparison of the two designs. The approximate signal-to-noise ratio for Kanerva's design is then $\lambda_{1,k}/\sqrt{2T}$, and for the selected-coordinate design it is $\lambda_{1,s}/\sqrt{1.74T}$.

As stated earlier, the point of this exercise is to compare the designs when $d(x_1,y) \leq 200$. For example, if $d(x_1,y) = 50$, the approximate signal-to-noise ratio is $445/\sqrt{2T} = 315/\sqrt{T}$ for Kanerva's design and $583/\sqrt{1.74T} = 442/\sqrt{T}$ for the selected-coordinate design, an improvement of 40% for a given T. Another way to express this comparison is to compute the relative number of data words that can be stored in the memory so that the signal-to-noise ratio is the same for both designs. If one stores $T_k$ words in Kanerva's design and $T_s$ words in the selected-coordinate design, and sets their signal-to-noise ratios equal to each other, one has $$\frac{315}{\sqrt{T_k}} = \frac{442}{\sqrt{T_s}}.$$

and one finds that $T_s = 1.97 T_k$. That is, the selected-coordinate design can store 97% more data words than can Kanerva's design, with the same signal-to-noise ratio when $d(x_1, y) = 50$.

Repeating the above computations for $d(x_1,y) = 100$, the signal-to-noise ratios are found to be $189/\sqrt{T}$ and $257/\sqrt{T}$ for the two designs, an improvement of 36% for a given T. Setting these ratios equal to each other, one finds that $T_s = 1.85 T_k$, so the selected-coordinate design can store 85% more data words than can Kanerva's design and achieve the same signal-to-noise ratio. (This is very close to the 86% figure obtained above, which is a more accurate figure for the particular assumptions under which it was computed).

For $d(x_1,y) = 150$, the signal-to-noise ratios are $115/\sqrt{T}$ and $145/\sqrt{T}$, an improvement of 26%, from which one finds that $T_s = 1.59 T_k$, so the selected-coordinate design can store 59% more data words with the same signal-to-noise ratio.

Finally, for $d(x_1,y) = 200$, the signal-to-noise ratios are $69/\sqrt{T}$ and $79/\sqrt{T}$, an improvement of 14%, from which one finds that $T_s = 1.31 T_k$, so the selected-coordinate design can store 31% more data words with the same signal-to-noise ratio. For distances beyond 200 and for large T, it will be difficult for either design to recover stored data words accurately.

UNIFYING PRINCIPLES

An important aspect of the invention may not be readily apparent is the manner in which the selected-coordinate design and the original Kanerva design are related. This relationship in fact leads to a number of designs that are intermediate between the two. In each of these intermediate designs, the set of addresses that activate a memory location is a sphere in S, the address space. However, the center of the sphere is not a point in S, as in the Kanerva design. Instead, it is a point in the N-dimensional vector space in which S is embedded. For every $q < N$, there is an intermediate design for a given q is defined by specifying a set of q selected coordinates and corresponding assigned value bits, as in the selected-coordinate design; these determine the center of the sphere of addresses that would activate the location. A common radius is chosen for the spheres so that each memory location is activated by a given proportion of the addresses in S. If $q = N$, the design is the same as the Kanerva design, and if q is small, e.g. 10, and a memory location is activated only if the address bits match the assigned value bits for all of the selected coordinates, the design is the selected-coordinate design described above. Other alternative designs, hereinafter called hybrid designs, can also be constructed based on the concept of using memory locations with different values of q and different radii.

Although the rule for activating memory locations in the selected-coordinate design is very different from the activation rule in Kanerva's design, when these designs are viewed geometrically, it can be seen that they are related. In the Kanerva design the set of read or write addresses that would activate a memory location is a sphere centered at the "address" of the memory location. In the selected-coordinate design (assuming $N=1000$ and ten selected coordinates for each memory location), the subset of S representing a memory location, i.e. the set of addresses that would activate it, is actually a sphere, whose center is a point in the 1000-dimensional vector space in which S, the address space of binary vectors, is embedded.

The center of this sphere is a vector whose components agree with the assigned values for each of the ten selected coordinates defining the subset, and whose components have the value $\frac{1}{2}$ for each of the other 990 coordinates. The radius of the sphere is 495, where distances are measured using L1 distance. (The L1 distance between any two points in S is the same as the Hamming distance. The sphere could also be defined using L2 distance, but L1 distance is more convenient.) Any point in S (a vector of 0's and 1's) is at least $990*\frac{1}{2}=495$ away from this center point; those points in S that agree with the center point on all ten selected coordinates are exactly 495 away, and all other points in S are more than 495 from the center. Thus the subsets representing memory locations may be thought of as spheres.

Viewing the two designs in this way, one can see that there is a series of possible intermediate designs with Kanerva's at one end the selected-coordinate design at the other. For any fixed integer q less than or equal to N, one can define the center of a sphere by selecting q coordinates, assigning values of 0 or 1 to each selected coordinate, and letting all of the other coordinates have the value $\frac{1}{2}$ (to represent indifference to whether the value of a bit in an address vector is 0 or 1). One can then choose the radius of the sphere so that the sphere contains about 1/1000 of S. The radius of the sphere, using L1 distance, is $(1000-q)*\frac{1}{2}+r$, where the first term is to account for the $1000-q$ coordinates for which the center has the value $\frac{1}{2}$, and r, the second term, is chosen so that in the q-dimensional subspace of S generated by the q selected coordinates, about 1/000 of the points are within r of the point defined by the q assigned values for the selected coordinates. The sphere in S with the above center and radius consists of those points in S for which the q-dimensional Hamming distance between the q assigned values and the corresponding components of the point is less than or equal to r; the values of the bits for the other coordinates can be either 0 or 1. This sphere contains about 1/1000 of the points in S.

For example, if $q=100$, the radius of the sphere would be $900*\frac{1}{2}+34=484$, since in a 100-dimensional binary vector space, a sphere of radius 34 contains about 1/1000 of that space. See Kanerva (1984). (For many small values of q, there may not be a value of r corresponding to 1/1000 of the subspace, due to the discreteness of the space; however, a different proportional of the subspace could be used.) The numbers used above are examples; the address space could have any dimension N, and the volumes of the spheres could be any desired proportion of the space.

The intermediate design for a given q is defined by considering all of the spheres of the kind described above for that value of q. Each such sphere represents a potential memory location, in that the points in such a sphere constitute the set of addresses that would activate the location. The hard memory locations would then be chosen at random from the set of all potential memory locations. The number of such spheres, that is, the number of potential memory locations, is:

$$\binom{1000}{q} \cdot 2^q.$$

where the first term is the number of ways of choosing q selected coordinates and the second term is the number of ways of choosing q assigned values. If $q=N$ (here 1000), one has the Kanerva design, and if $q=10$ or other small value and $r=0$, one has the selected-coordinate design.

Given an address, that is, a point in S, the class of potential memory locations activated by it is the class of spheres containing it, consisting of about 1/1000 of the total number. This is because for each possible choice of q selected coordinates, about 1/1000 of the points in the q-dimensional subspace generated by those coordinates, each point of which represents a possible vector of assigned values for the selected coordinates, are within r of the point defined by projecting the given address into the q-dimensional subspace. Therefore, since the hard memory locations are chosen at random, a point in S, acting as an address, will activate about 1/1000 of the hard memory locations.

One embodiment of the intermediate design for a given q could be constructed by having an address decoder for each hard memory location, similar to the embodiment shown in FIG. 1. The address decoder for a hard memory location would have q inputs for the q selected coordinates defining that hard memory location. The assigned values and the radius r would be stored in the address decoder. For a given address, it would compute the q-dimensional Hamming distance between the assigned for those q coordinates and the corresponding components of the address vector. If that distance is less than or equal to r, the radius of a q-dimensional sphere containing 1/1000 of the q-dimensional subspace, the location would be activated. For example, if $q=100$, the location would be activated if the q-dimensional distance is less than or equal to 34. The components of the address vector for the other coordinates are not used in determining whether to activate the location.

Given two addresses x and y in S, with Hamming distance $d(x,y)=d$ between them, one needs to know the size of the access overlap, i.e. the number of potential memory locations that are activated by both points. The expected number of hard memory locations in the access overlap will be proportional to this number. As noted earlier, the performance of the memory system may be judged by this quantity. Select a set of q coordinates. This may be done in $$\binom{1000}{q}$$

ways. Let k be the number of the q selected coordinates which are among the coordinates on which x and y differ. Since the components of x and y differ on d coordinates and agree on $1000-d$ coordinates, the number of ways of selecting q coordinates so that k has a given value is $$\binom{d}{k} \cdot \binom{1000-d}{q-k}.$$

The first term is the number of ways of choosing k coordinates from among d, and the second is the number of ways of choosing the others. If one thinks of the q coordinates as being selected at random, then k is a random variable with a hypergeometric distribution, and the expected value of k is qd/1000.

For a given set of q selected coordinates, consider the components of x and y for those coordinates. In other words, project x and y into the q-dimensional subspace generated by the selected-coordinates. Call these projections x' and y'. The q-dimensional Hamming distance between x' and y' is k, the quantity defined above.

The vector of assigned values for the q selected-coordinates may be any point in the q-dimensional subspace. The number of potential memory locations defined by the given set of q selected coordinates which are activated by both x and y is the number of points in the subspace that are within r of both x' and y'. This number is the volume of (the number of points in) the intersection of the two q-dimensional spheres of radius r whose centers are x' and y'. Let V(q,r,k) be the volume of this intersection, where k=d(x',y'). A formula for this volume is derived in Kanerva (1984).

The total number of potential memory locations activated by both x and y, for all sets of q selected coordinates, is therefore $$\sum_{k} \binom{d}{k} \binom{1000-d}{q-k} V(q,r,k).$$

If q and d are moderately large, then if k is viewed as a random variable, it will be near its expected value with high probability, and a rough approximation to the sum above is $$\binom{1000}{q} \cdot V\left(q, r, \frac{qd}{1000}\right).$$

If this number is expressed as a fraction of the number of locations activated by x, which is 1/1000 of the total number of potential memory locations, one obtains $$\frac{1000 \cdot V\left(q, r, \frac{qd}{1000}\right)}{2^q}.$$

(Approximate values of this fraction for various values of d may be found in Kanerva (1984), p. 35, in the middle column of the table, which corresponds to spheres whose volume is 1/1000 of the space.) For large q the performance of the intermediate design can be shown to be close to that of Kanerva's design, in the sense that if two points are a distance d apart, then the relative number of locations activated by both points is similar in the two designs.

These intermediate designs can be constructed by modifying the various hardware embodiments described earlier for the selected-coordinate design. As mentioned above, in one possible embodiment similar to FIG. 1, each hard memory location would have an address decoder (e.g. 19 in FIG. 1) with q inputs, which would compute a Hamming distance, that is the number of selected coordinates for which the assigned value disagrees with the corresponding component of the address vector, and activate the location is this number is less than or equal to r. Alternatively, the address decoder could count the number of matches between the assigned values and the corresponding components of the address vector, and activate the location if that number is greater than or equal to q−r. Note that since the complexity of these address decoders depends only on q, they can be fairly simple devices even if N, the dimension of the address space, is very large.

Figure 6:
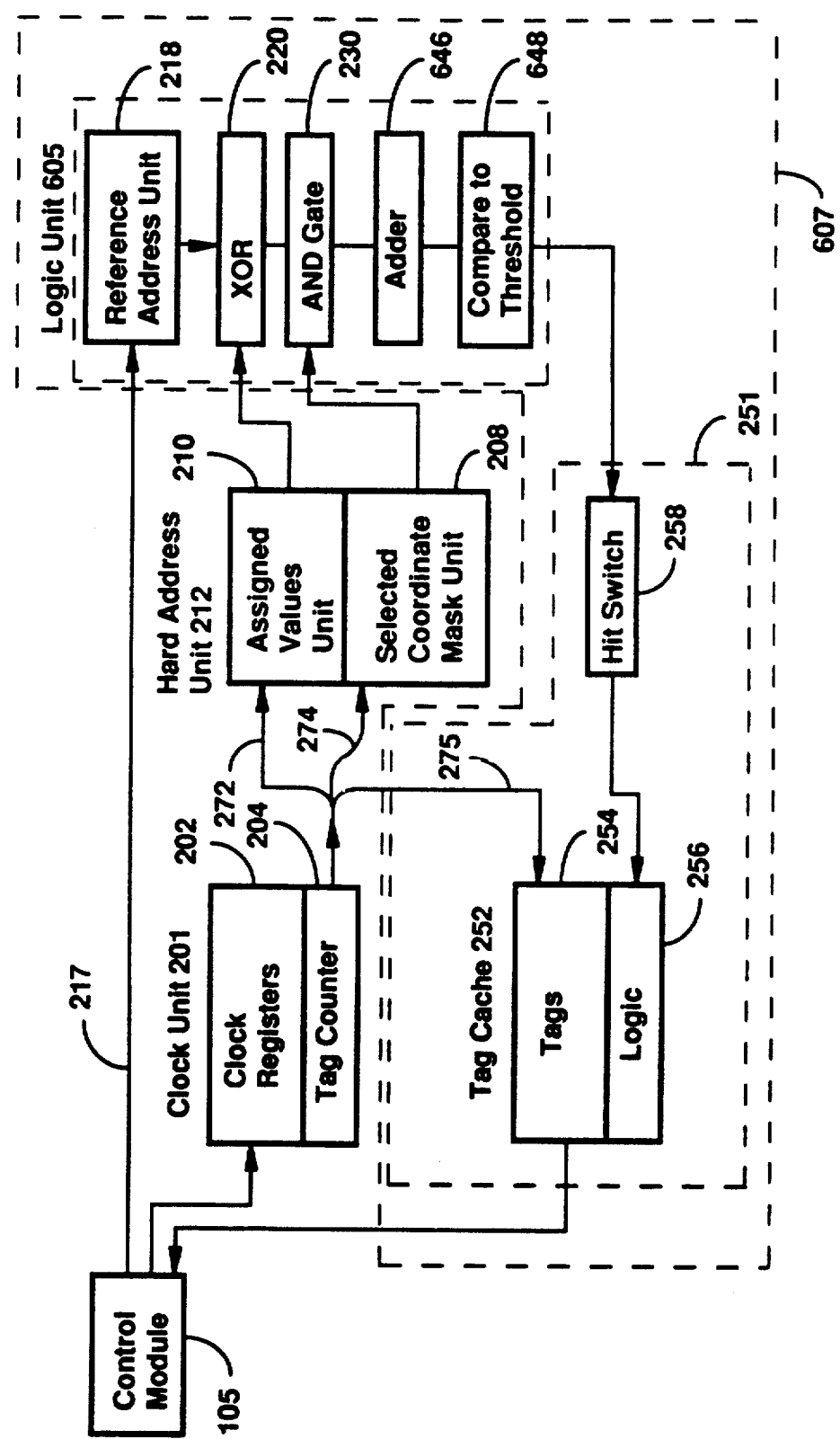
FIG. 6 shows an address module for an intermediate design according to the invention based upon the first alternative embodiment of FIG. 3.

Other embodiments of the intermediate design can be built by modifying the alternative embodiments of the selected-coordinate design. For example for the first alternative embodiment of the selected-coordinate design, illustrated in FIG. 3, the address module can be modified as illustrated in FIG. 6. In this description and in the various other embodiments herein that are similar to FIG. 6, it is assumed that the reference addresses have 256 bits, although this number could be varied. The two parts of the hard address unit 212 remain the same; two 256-bit data words for each hard memory location, containing the assigned value and selected coordinate information in the same format as before, are stored there. A function element 607 compares the components of the reference address corresponding to the selected coordinates to the assigned values for each hard memory location. The function element, in response to that comparison, provides a set of identification signals indicating which hard memory locations in the memory system are to be activated based on the reference address. In this embodiment, the function element includes a logic unit 605 and a hit system 251. The logic unit 205 of FIG. 3 is replaced with the logic unit 605 of FIG. 6, which is somewhat more complex than the logic unit 205 of FIG. 3. As before, it performs an exclusive-OR (XOR) of the reference address and the word containing the assigned values, and then performs a logical AND of the result of the XOR and the word containing the selected coordinates. Among the resulting 256 bits, there would be 1's for those selected coordinates for which the assigned value bit disagrees with the corresponding reference address bit. But instead of testing these bits for 0's, an adder 646 of the logic unit 605 adds these 256 bits and a comparison element 648 compares the sum to a threshold value r; if the sum is less than or equal to the threshold, the hard memory location is activated. The logic unit is thus more complicated than before since it requires a means to add the bits. (The Stanford prototype has such a means to add the bits.) As an equivalent alternative, the logic unit could count the number of matches between corresponding bits and activate the location is that number is greater than or equal to q−r. In this case, the bits to be added by adder 646 would have to be such that there is a 1 for each selected coordinate for which the corresponding bits match. To do this, either the 256-bit words stored in the assigned values unit could contain the complements of the assigned values, or the exclusive-OR circuitry could compute the complement of the XOR. The hit system 251 of FIG. 6 is made up of a high switch 258 and a tag cache 252 just as in the embodiment illustrated in FIG. 3.

Figure 7:
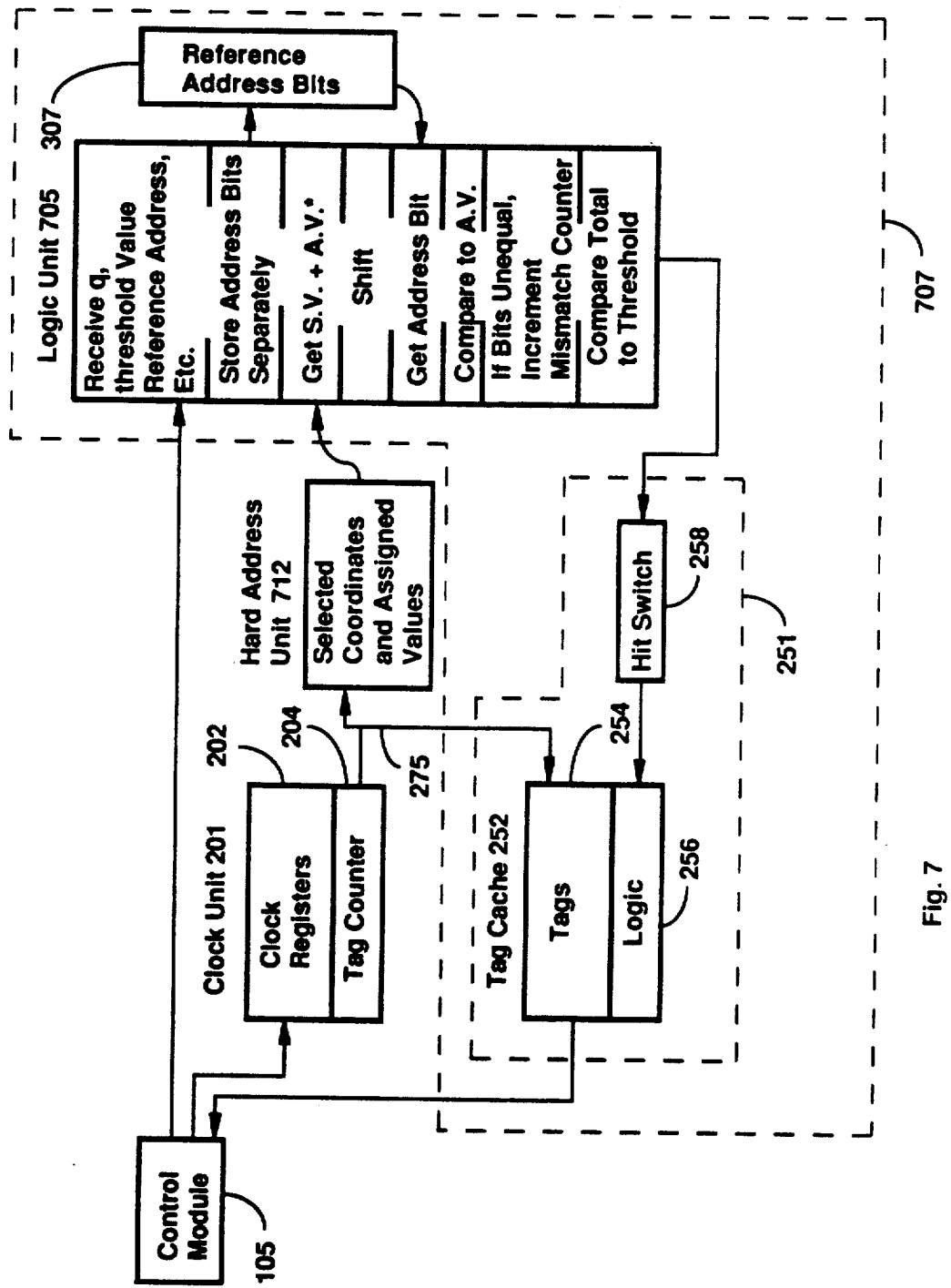
FIG. 7 shows an address module for an intermediate design according to the invention based upon the second alternative embodiment of FIG. 4.

Another embodiment of an intermediate design is illustrated by the address module shown in FIG. 7, which corresponds to the second alternative embodiment shown in FIG. 4. A hard address unit 712 stores the selected coordinate and assigned value information as before, using two bytes for each selected coordinate for each hard memory location. It, however, requires 2q bytes of memory for each hard memory location instead of 20. A function unit 707 includes a logic unit 705 and a hit system 251 which is the same as in the previous embodiment. The logic unit 705 is similar to logic unit 305 of FIG. 4 in that it compares each assigned value bit to the corresponding bit of the reference address, as before; but instead of moving to the next hard memory location when it finds a mismatch, it would, for each hard memory location, count the number of selected coordinates for which the assigned value bit disagrees with the corresponding reference address bit. This number is then compared to a threshold value r. If it is less than or equal to r, the hard memory location is activated. This process is illustrated in the flowchart shown in FIGS. 8A and 8B. Or, as before, the logic unit could count the number of matches between corresponding bits and activate the hard memory location if this number is greater than or equal to q−r.

Figure 8B:
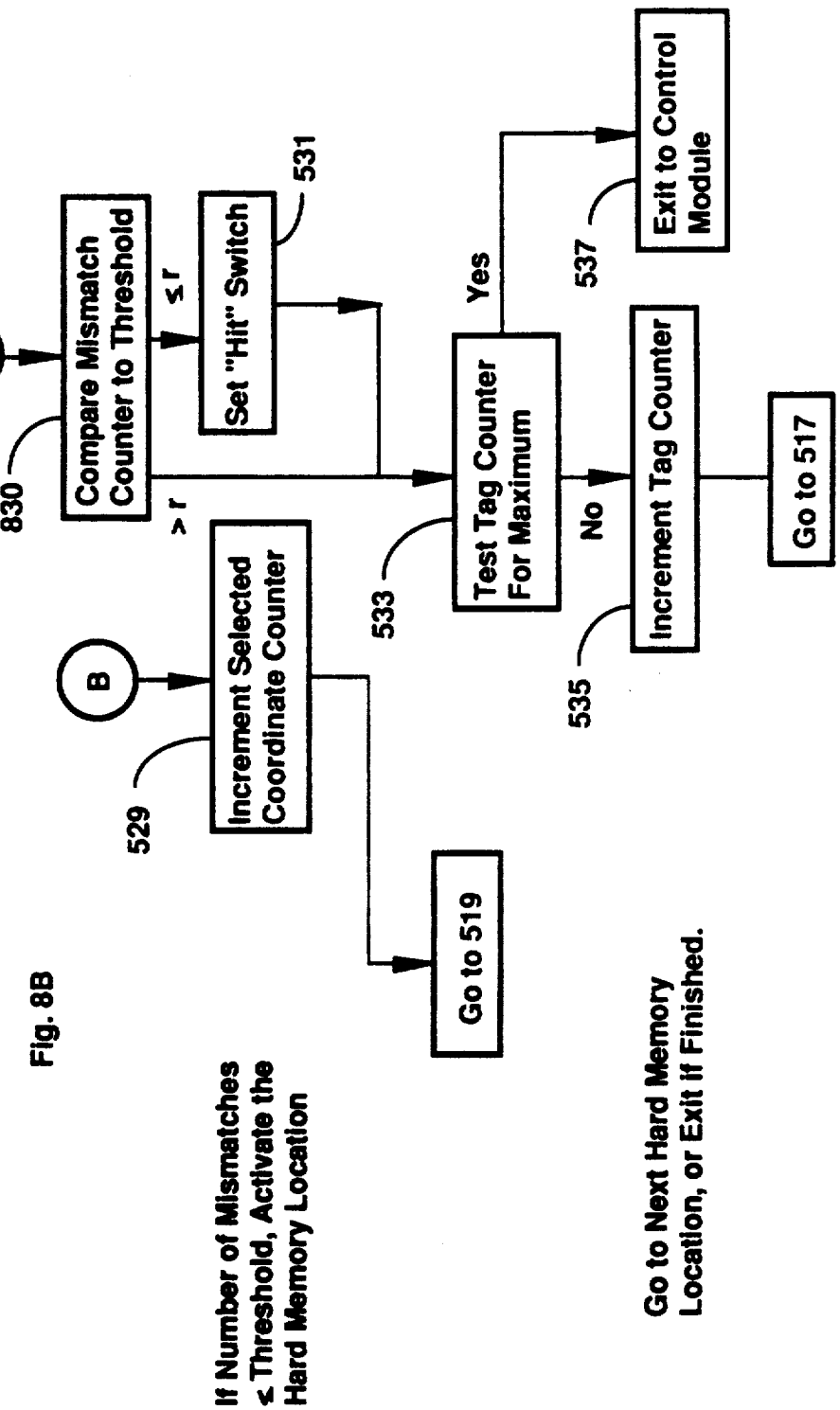

In FIGS. 8A and 8B, the program elements which are essentially the same as in FIGS. 5A and 5B have been left with the same element numbers, and new or different program elements have been renumbered. In this design, program element 813 is somewhat different from previous program element 513 in that the value of q and the threshold value r must be sent to the logic unit. A new step is also added at program element 818 to initiate the mismatch counter of logic unit 705. At program element 525, the bit of the reference address corresponding to the selected coordinate is compared to the assigned value, and if they are not equal, the mismatch counter is incremented at program element 826, so that the number of mismatches is counted. At program element 527, the selected-coordinate counter is tested to see if it has reached q. If it has not, then the selected coordinate counter is incremented at program element 529 and the logic unit moves to the next selected coordinate in that hard memory location by going back to program element 519. If all q selected coordinates have been tested, the program element 830 compares the number of mismatches to the threshold value r, and if the number of mismatches is less than or equal to the threshold, the hard memory location is activated. Whether or not the hard memory location is activated, the logic unit then tests the tag counter for its maximum value at program element 533 as before. If it is not at its maximum, the logic unit increments the tag counter, and moves on to the next hard memory location; if it is at its maximum, the logic unit exits to the control module at program element 537. Alternatively, the number of matches could be counted at program element 826 and compared to a threshold q-r at program element 830.

Yet another approach to designing a Sparse Distributed Memory, called a hybrid design, can be used where the principle is to allow different hard memory locations to have different values of q and r. In this approach, the threshold value, or Hamming radius r, for each hard memory location depends on the value of q for that location, and also on the desired number of the addresses in S that would activate the location. This number of addresses need not be the same for all hard memory locations; one may want some hard memory locations to be activated by more addresses and others by fewer addresses. This concept combines characteristics of the various intermediate designs described above. The value of q for some of the hard memory locations could be equal to N; if q=N for all of the hard memory locations and all have the same value of r, the design would be the same as Kanerva's design. In this hybrid design approach, to compute the expected number of hard memory locations in the access overlap for two addresses, one can use the formulas above to find the expected number for each combination of values of q and r used in the design, and then take the sum over all of these combinations.

Figure 9:
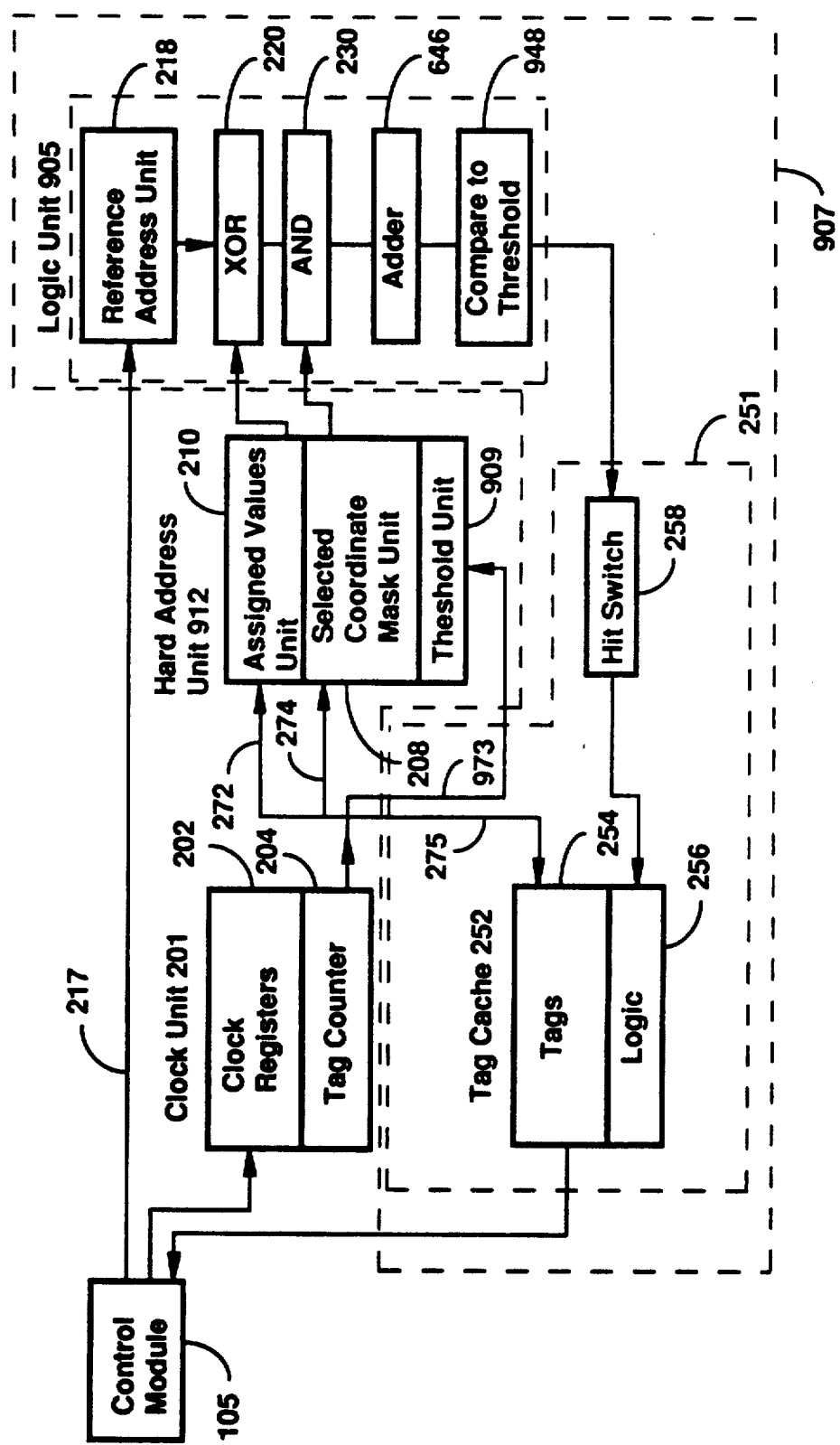
FIG. 9 shows an address module for a hybrid design based upon the first alternative embodiment of FIG. 3.

The various hardware embodiments described above can be further modified to accommodate this possibility of using different values of q and r for different hard memory locations. For example, in the above embodiment of the intermediate design, which is similar to FIG. 1, in which each hard memory location has an address decoder, each address decoder could have its own values for q and r. In another example, as illustrated in FIG. 9, the embodiment of FIG. 6 has been altered to include a hard address unit 912 which, in addition to the assigned values unit 210 and the selected coordinate mask unit 208, also has a threshold unit 909 for storing the threshold value r (or q-r) for each hard memory location. (If for all q, all of the hard memory locations with a given value of q are to have the same value of r, another approach would be to store the value of q for each hard memory location and then use a lookup table to store the various threshold values r (or q-r) for each q.) The system has a function element 907 which is very similar to the function element 607. The function element includes a logic unit 905 which is the same as logic unit 605 except that a comparison element 948 uses the stored threshold values from threshold unit 909 to compare with the values from adder 646 for each hard memory location, rather than using a fixed threshold for all of them. Again, if the sum of the number of mismatches is less than or equal to the threshold r, the hard memory location is activated. Threshold unit 909 communicates with the tag counter 204 via a signal line 973. As an equivalent alternative, the logic unit could be modified as described above with regard to FIG. 6, so that it would count the number of matches between corresponding bits and compare that number to the value of q-r for each hard memory location.

Figure 10:
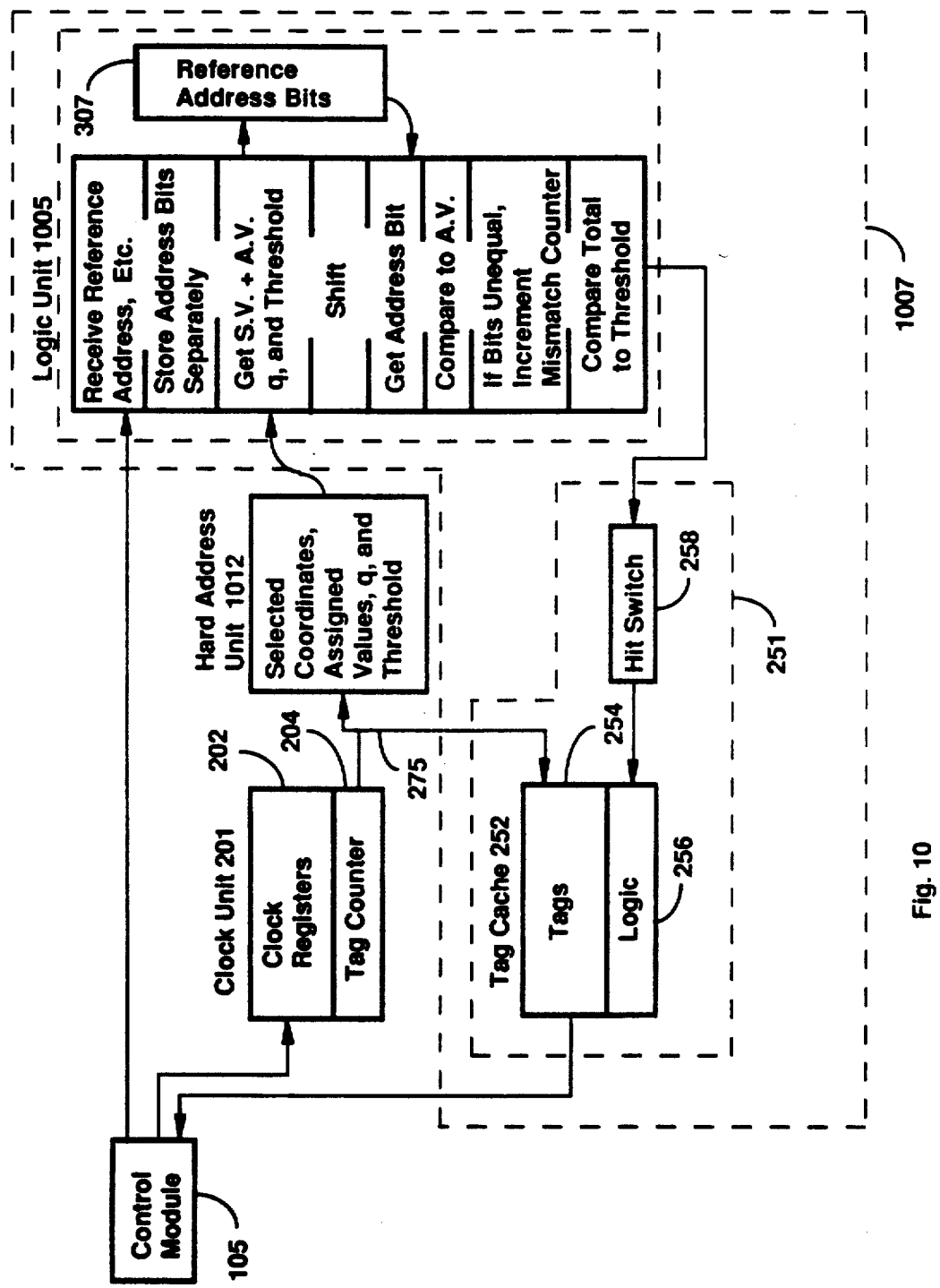
FIG. 10 shows an address module for a hybrid design based upon the second alternative embodiment of FIG. 4.

Another hybrid embodiment, illustrated in FIG. 10, is based on the second alternative embodiment illustrated in FIG. 7. In this design, a hard address unit 1012 is used which stores a value for q and a threshold value for each hard memory location in addition to the selected coordinates and assigned values for each hard memory location. A function element 1007 includes a logic unit 1005 and hit system 251. The logic unit 1005 replaces the logic unit 705 of FIG. 7, and is different from logic unit 705 only in that it receives as its input from the hard address unit 1012 information regarding the value of q and the threshold value for each hard memory location, rather than receiving one value of q and one threshold value for all of the hard memory locations. The logic illustrated in FIGS. 11A and 11B that is used in conjunction with the system of FIG. 10 is also quite similar to that used in conjunction with the embodiment of FIG. 7. The only addition is program element 1118, by which one obtains the value of q and the threshold value for each hard memory location. Alternatively, the logic unit could count the number of matches, instead of mismatches, as before.

THE HYPERPLANE DESIGN

Suppose that in a particular application, all of the binary vectors actually used as read or write addresses are such that only a small proportion of their bits, say approximately 10%, are 1's and the rest 0's. This situation is somewhat analogous to a model of a neural network in which there are, say, 1000 input neurons, about 10% of which are firing at any one time. Thus, an input vector would be a point in S, with a value of 1 for a coordinate meaning that the corresponding excitatory input neuron is firing, and a value of 0 meaning that it is not firing. The proportion of input neurons firing at any one time might be held to about 10% by the action of inhibitory neurons. Two input vectors would be considered similar to each other if many of the neurons represented as firing by one vector were also shown as firing by the other, that is, if their logical AND contained many 1's. This concept of the input to a neural network, and the hyperplane design described below, bear some resemblance to Marr's model of the cerebellum (see David Marr, 1969, "A Theory of Cerebellar Cortex", in Journal of Physiology, 202, pp. 437-470).

The set of binary vectors in S that contain a fixed number of 1's among their components (e.g., 100 out of 1000) forms a hyperplane in S. Thus, the addresses one excepts to encounter in this situation lie on or near a hyperplane in S, rather than being distributed throughout S. The "hyperplane design" is a design for a Sparse Distributed Memory that is adapted to this situation. To describe the design, designate a collection of subsets of S to represent potential memory locations. That is, each of these subsets is the set of read or write addresses that would activate a particular memory location. Assume in this example that N=1000, that about 10% of the bits in each address that 1's, and that it is desired that each memory location be activated by about 1/1000 of the addresses. (These numbers could of course be varied.)

Define a subset by selecting three of the 1000 coordinates. The subset consists of all points in S that have value 1 for all three of the selected coordinates, and any values for the other coordinates. The memory location represented by such a subset is activated by any address vector whose components for all three of the location's selected coordinates are 1. This is somewhat analogous to an associative memory in which all of the stored patterns containing a given three items are recalled whenever the stimulus contains those three items. The number of subsets of this type is $$\binom{1000}{3} = 166,167,000.$$

A random sample of the potential memory locations would be implemented as hard memory locations. These subsets are like the spherical subsets in the selected-coordinate design, except that there are only three selected coordinates for each subset, and the assigned values for the selected coordinates are always 1. Three selected coordinates are used here because it is assumed that about 10% of the bits in the address vectors are 1's and that a location is to be activated by about 1/1000 of the addresses. It can be shown that each of these memory locations would be activated by 0.00973 of the 1000-bit address vectors that contain 100 1's. If these numbers are changed, a different number of selected coordinates would be used to define a memory location.

As will be seen in this hyperplane design, the expected size of the access overlap for two address vectors depends on the number of 1's in the logical AND of the two vectors, so that number will be used as a measure of their similarity, rather than using the Hamming distance. The relationship between the two can be seen from the following analysis.

Let h(x) be the number of 1's in a 1000-dimensional binary vector x (a point in S). For any two points x and y in S, let A(x,y) be the number of 1's in the logical AND of x and y, that is, the number of coordinates for which both x and y are 1. Since the Hamming distance d(x,y) is the sum of the number of coordinates for which x is 1 and y is 0, of which there are h(x)−A(x,y), plus the number of which y is 1 and x is 0, of which they are h(y)−A(x,y) it is clear that:

$$\begin{aligned} d(x,y) &= [h(x) - A(x,y)] + [h(y) - A(x,y)] \\ &= h(x) + h(y) - 2*A(x,y). \end{aligned}$$

Therefore, $$A(x,y) = \tfrac{1}{2}[h(x) + h(y) - d(x,y)].$$

If h(x) and h(y) are both approximately 100, then $$A(x,y) \approx 100 - \frac{d(x,y)}{2},$$

or $$d(x,y) \approx 200 - 2*A(x,y).$$

If h(x) and h(y) equal 100, these equalities are exact. Thus, for the points in S with which one is concerned, A and are closely related, and A can be used as a measure of similarity instead of d.

The number of potential memory locations activated by a point x, that is, the number of subsets it belongs to, is $$\binom{h(x)}{3}.$$

since this is the number of ways of choosing three coordinates for which the components of x are all 1. If h(x)=100, this number is approximately 1/1000 of the total number of potential memory locations. However, if h(x)>100, the proportion of memory locations activated by x is greater than that, and if h(x)>100, the proportion is less. This hyperplane design differs from the other designs in that the number of potential memory locations activated by an address is not the same for all addresses—unless one insists that h(x) be the same for all allowable x.

It will now be shown that for two given points x and y in S, such as a write address and a read address, the number of potential memory locations activated by both of them is a function of A(x,y). A memory location is activated by both x and y if the components of both vectors are 1 for all three of the selected coordinates defining that memory location. Since A(x,y) is the number of coordinates for which both x and y are 1, the number of ways of choosing three coordinates for which both are 1 is $$\binom{A(x,y)}{3}.$$

Hence this is the number of potential memory locations activated by both x and y, i.e., the size of the access overlap.

To compare this design to other designs, suppose that there are one million hard memory locations. Then, if x is a point with h(x)=100, the expected number of hard memory locations activated by x is $$\frac{1,000,000}{\binom{1000}{3}} \cdot \binom{100}{3} = 973.$$

If x and y are any two points in S (i.e., h(x) and h(y) are not necessarily equal to 100), the expected number of hard memory locations activated by both points is $$\frac{1,000,000}{\binom{1000}{3}} \cdot \binom{A(x,y)}{3}.$$

The third column of the following table gives the expected number of hard memory locations activated by both x and y for several values of A(x,y). The second column of the table gives the Hamming distance d(x,y) corresponding to each value of A(x,y), assuming that h(x)=h(y)=1000. One can also compare the design to an adaptation of Kanerva's design to this situation, which will be described below; the fourth column of the table gives the corresponding figures for this adapted Kanerva design. (Note that in the third column it is not assumed that h(x) and h(y) equal 100; however, in the fourth column that will be assumed.)

TABLE 2

| A(x,y) | d(x,y) | Expected number of hard memory locations activated by both x and y | |
|---|---|---|---|
| | | Hyperplane Design | Adapted Kanerva |
| 100 | 0 | 973 | 1070 |
| 90 | 20 | 707 | 486 |
| 80 | 40 | 494 | 284 |
| 60 | 80 | 206 | 95 |
| 40 | 120 | 59 | 25 |
| 20 | 160 | 6.9 | 3.9 |
| 10 | 180 | 0.72 | 1.06 |
| 0 | 200 | 0 | 0.17 |

In the situation where h(x) is approximately 100 for all possible addresses, neither Kanerva's design nor the selected-coordinate design, as they are described in the previous sections, would perform well. That is because A(x,y) for two such addresses chosen at random would be about 10, which corresponds to a Hamming distance of about 180. (The maximum Hamming distance between two such addresses is about 200.) For Kanerva's design, using the parameters described earlier, the expected number of hard memory locations in the access overlap if d(x,y)=180 is 119 (Kanerva (1988), p. 63), and for the selected-coordinate design it is 133 (by formula (1) above). In either case, this number is more than one tenth of the number of hard memory locations activated by a single address. The result is a poor signal-to-noise ratio: If one tries to recover a data word written at address x by reading from the memory at that same address, the vector of sums computed during the read operation will contain about 1000 copies of the data word to be recovered, along with over 100 copies of each of many other stored words, whose write addresses are assumed to be a distance of about 180 from the read address. On the other hand, if the addresses are distributed uniformly throughout S, then it can be seen from Table 1 above that these sums would contain only one copy, on the average, of each of the other stored data words. Consequently, in the situation here, the "noise" produced by even a modest number of stored data words could overwhelm the data word to be recovered. If one reads at an address near, but different from, the write address, the problem is even worse, because the sums would contain fewer copies of the data word to be recovered.

It is assumed here that each data word is written to the memory once, as in Kanerva's original design; that is, that no "retraining" is done to reduce the noise caused by interference among the stored data words. It should be possible to improve the response of the memory, after data has been stored in it, by testing the memory and then altering the stored data so that when the memory is read at certain addresses, the response is closer to the desired response. If that is done, however, the assumptions of randomness that underlie the memory capacity and signal-to-noise ratio computations described above would not apply.

In principle, the signal-to-noise ratio in Kanerva's design could be improved by decreasing the activation radius of the hard memory locations. (The equivalent to this in the selected-coordinate design or the hyperplane design would be to increase the number of selected coordinates for each hard memory location.) But since the hard memory locations are chosen at random, the effect of that—unless one makes a corresponding increase in the total number of hard memory locations—is to greatly reduce the expected number of lard memory locations activated by a single address. If a data word is written to only a small number of memory locations, an undesirable amount of random variability is introduced into the memory system, causing a substantial decrease in its reliability.

The hyperplane design may be thought of as an adaptation of the selected-coordinate design to the situation here. In order to have a design like Kanerva's to compare to the hyperplane design, an adaptation of the Kanerva design to this situation will now be described. One way to modify Kanerva's design to adapt it to this situation is to restrict the addresses of the hard memory locations to the part of the address space that contains the read and write addresses that will actually be encountered, as has been suggested by Keeler, "Comparison Between Kanerva's SDM and Hopfield-type Neural Networks", COGNITIVE SCIENCE 12, 299–329 (1988); pp. 321–324, hereinafter referred to as Keeler (1988). Since more of the hard memory locations will then be relatively close to the addresses actually used, the memory should be better able to discriminate between those addresses. The computation of the activation radius and the size of the access overlap will of course depend on the nature of the part of the space containing the addresses.

The adapted Kanerva design is define as follows. Let C be the set of all points in S with h(x)=100. C is thus a hyperplane in S, made up of all 1000-dimensional binary vectors containing 100 1's and 900 0's. The total number of points in C is $$\binom{1000}{100}.$$

Assume for simplicity that all of the read and write addresses to be used lien in C, and that they are distributed uniformly in C.

The set C is also used as the set of addresses of potential memory locations. A random sample of these points is chosen to be the addresses of the hard memory locations. A memory location at z in C is activated by any read or write address within a given Hamming distance D of z; that is, the subset of addresses in C that represents the memory location is a sphere with radius D centered at z. Conversely, the set of potential memory locations activated by a read or write address x in C is a sphere with radius D centered at x. D is chosen so that these spheres will contain a desired number of points. The volumes of spheres and intersections of spheres in this case will now be computed, so that the size of the access overlap can be computed for this design. One can then compare the performance of this adapted Kanerva design to that of the hyperplane design.

Chosen a point x in C to be the center of a sphere in C. A sphere centered at x is the set of points within a given distance of x that is, the set of all y in C such that $d(x,y) \leq D$. (Since the Hamming distance between any two points in C is even, one may assume that D is even.) Since $A(x,y) = 100 - d(x,y)/2$, one can describe the sphere as the set of all y such that $A(x,y) \leq A$, where $A = 100 - D/2$. For any $\alpha \geq A$, the number of points y in C for which $A(x,y) = \alpha$, and hence $d(x,y) = 200 - 2\alpha$, is $$\binom{100}{\alpha} \cdot \binom{900}{100 - \alpha}.$$

where the first term is the number of ways of placing $\alpha$ 1's among the 100 coordinates of which the component of x is a 1, and the second term is the number of ways of placing $100 - \alpha$ 1's among the 900 coordinates for which the component of x is a 0. The number of points in the sphere is therefore $$\sum_{\alpha \geq A} \binom{100}{\alpha} \binom{900}{100 - \alpha}.$$

IF $A = 20$ (or $D = 160$), the volume of the sphere is 0.001070 of C; that is, the sphere contains about 1/1000 of the points in C. If one assumes a system with one million hard memory locations with addresses chosen at random in C, and if a read or write address x in C activates all hard memory locations whose address z is such that $A(x,y) \geq 20$, then, on the average, an address in C will activate about 1070 hard memory locations. To compare the designs, it will be assumed that the value $A = 20$ is used to define the activation threshold (i.e., the size of the spheres) in the adapted Kanerva design.

Given two read or write addresses x and y in C, with $A(x,y) = U$, one can compute the number of potential memory locations activated by both addresses. That is, one can find the number of points z in C such that both $A(x,y) \geq 20$ and $A(y,z) \geq 20$. For convenience, one can rearrange the order of the coordinates so that for the first U coordinates, the components of both x and y are 1's; for the next 100-U coordinates, x is 1 but y is 0; for the 100−U coordinates following those, x is 0 and y is 1; and for the remaining 800+U coordinates, both x and y are 0. The vectors would then look like this:

|    | U      | 100−U  | 100−U  | 800−U  |
|----|--------|--------|--------|--------|
| x: | 11...11 | 11...11 | 00...00 | 00...00 |
| y: | 11...11 | 00...00 | 11...11 | 00...00 |
|    | α       | β       | τ       | σ       |

The number of ways of choosing a point z in C with $\alpha$ 1's in the first block of coordinates, $\beta$ in the second, $\tau$ in the third, and $\sigma$ in the fourth, where $\beta + \beta + \tau + \sigma = 100$, is $$\binom{U}{\alpha}\binom{100-U}{\beta}\binom{100-U}{\tau}\binom{800+U}{\sigma}.$$

where the first term is the number of ways of placing $\alpha$ 1's among U coordinates, and so on. The number of points in the access overlap, that is, in the intersection of the spheres about x and y, is found by summing this expression over all permissible combinations of values for $\alpha$, $\beta$, $\tau$, and $\sigma$ for which:

$$A(x,z) = \alpha + \beta \geq 20$$

and $$A(y,z) = \alpha + \tau \geq 20.$$

Thus the size of the access overlap is a function of $A(x,y)$. If there are one million hard memory locations, then the expected number of hard memory locations in the access overlap is found by multiplying the number of points in the intersection by $$\frac{1,000,000}{\binom{1000}{100}}.$$

Some representative values are given in the fourth column of Table 2 above.

In an earlier section, some estimates of comparative memory capacities and signal-to-noise ratios were computed. If the same assumptions are made here, with respect to the hyperplane design and the adapted Kanerva design, then the formulas derived earlier can be applied to these two designs. For example, for a given value of $d(x_1,y)$, one can compute the maximum number of data words that can be stored in the memory, for which there is at least a 99% chance of correctly recovering a given stored data bit. Thus it can be shown that if $d(x_1, y) = 40$, the maximum number for the hyperplane design is about 35,854 stored words, while for the adapted Kanerva design it is about 6,686. That is, under these conditions, more than five times as may data words can be stored in the hyperplane design, compared to the adapted Kanerva design, with the same probability of recovering a stored data bit.

The various hardware embodiments described above for the selected-coordinate design can easily be adapted to the hyperplane design. Since the hyperplane design is like the selected-coordinate design, except that each memory location is defined by three, or some other number of, selected coordinates and the assigned values are always 1, any embodiment for the selected-coordinate design can be used for the hyperplane design without modification, as long as it can function with hard memory locations defined by the required number of selected coordinates, e.g. three in the specific example above. Moreover, if one is interested only in the hyperplane design, those embodiments can be simplified, because they would not have to store assigned values or perform an Exclusive-OR. For example, if one has an address decoder for each hard memory location, as in the embodiment shown in FIG. 1, each address decoder would have one input for each selected coordinate, to receive the corresponding bit in the reference address; it would perform a logical AND of those bits, and activate the location if all of them are 1's.

Figure 12:
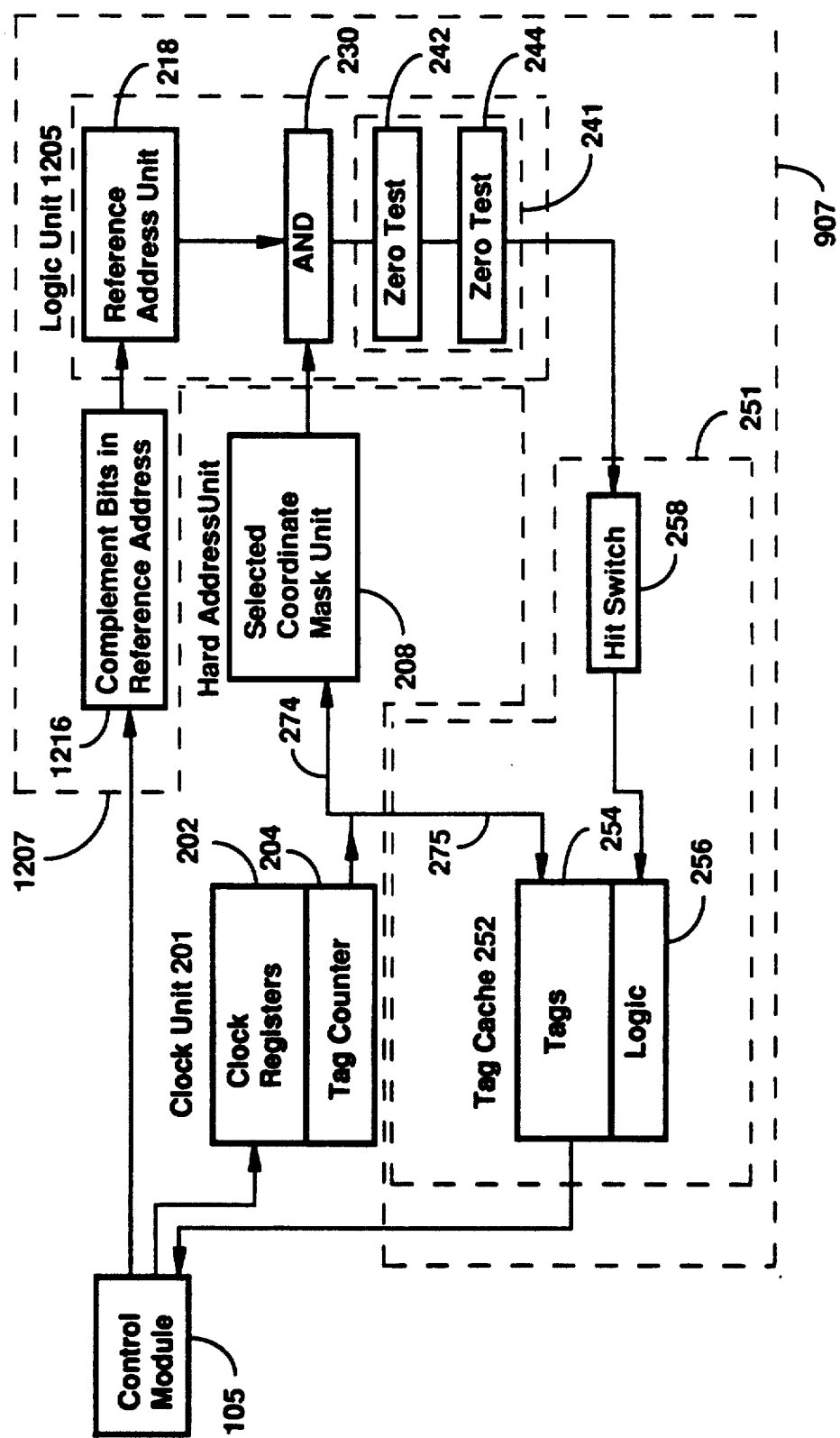
FIG. 12 shows an address module for a hyperplane design based upon the first alternative embodiment of FIG. 3.

In the first alternative embodiment described for the selected-coordinate design (FIG. 3), one can omit the assigned values part of the hard address unit and the XOR part of the logic unit. Such an implementation is shown in FIG. 12. In this embodiment, a function element 1207 includes a complement element 1216, a logic unit 1205 and the hit system 251. Since one can think of the hyperplane design as having all assigned values equal to 1, they do not have to be stored, and since the Exclusive-OR of the reference address with a vector of 1's is the complement of the reference address, one way to implement the design is to take the complement of the reference address at the beginning of a read or a write operation and hold that vector in the reference address unit 218. Then one proceeds as in the embodiment for the selected-coordinate design: For each hard memory location, perform the logical AND of the complemented reference address with the 256-bit mask from the hard address unit containing 1's at the positions of the selected coordinates and 0's for the other coordinates, and then test for all zeros. If all 256 of the resulting bits are 0's, that hard memory location is to be activated. In this embodiment of the hyperplane design, the new element 1216 has been added in FIG. 12 to complement the bits in the reference address, and assigned values unit 210 and XOR 220 have been eliminated.

Figure 13:
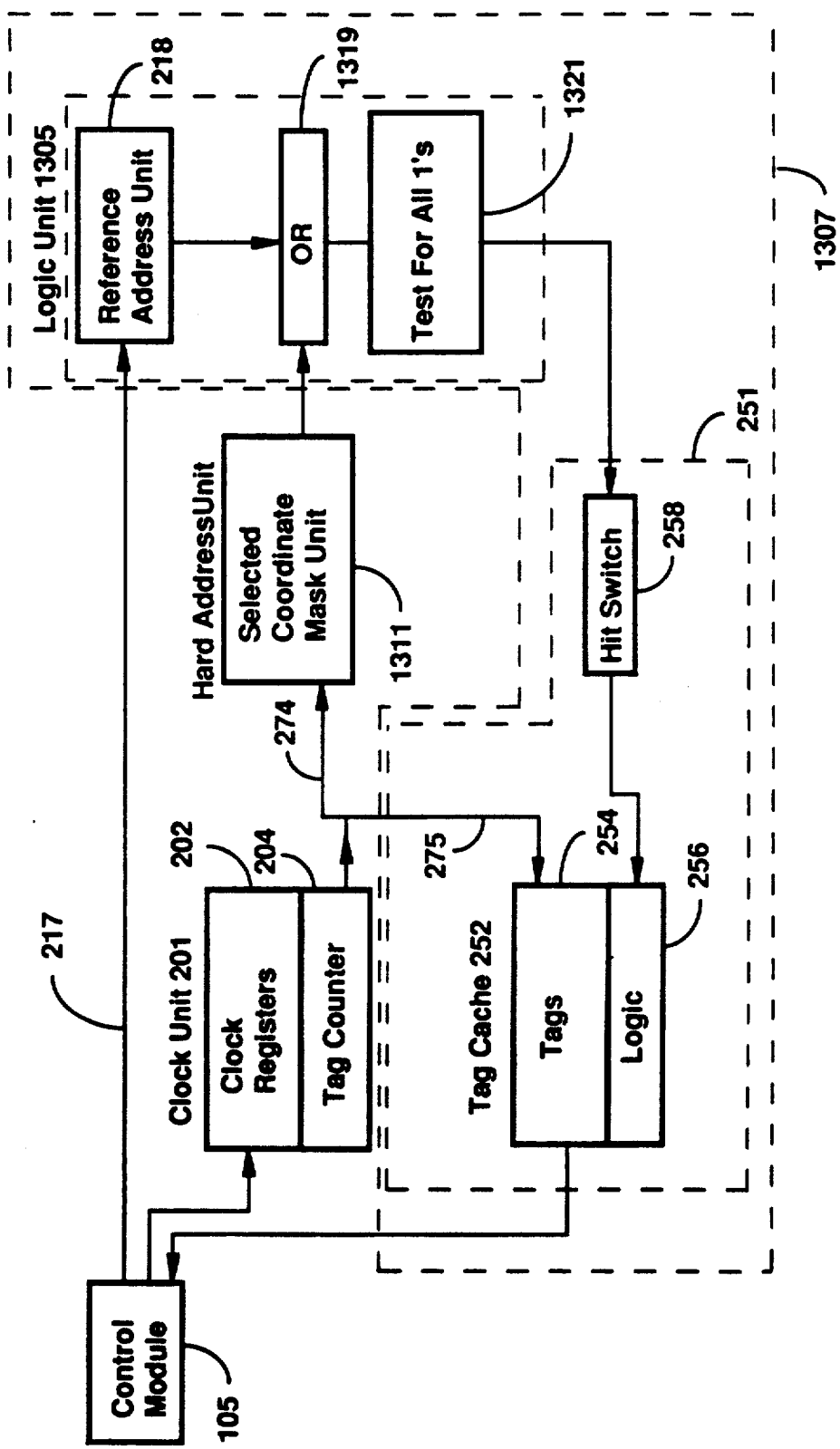
FIG. 13 shows an alternative address module for a hyperplane design based upon the first alternative embodiment of FIG. 3.

An alternative implementation can also be constructed as follows: Instead of complementing the reference address, the complements of the selected coordinate masks (that is, 0's for the selected coordinates and 1's for the other) can be stored in the hard address unit. Then, for each hard memory location, one can perform a logical OR of the reference address with the complemented mask; if all of the 256 resulting bits are 1's, the location is to be activated. That implementation is shown in FIG. 13, where the hard address unit 1311 stores the complements of the selected coordinate masks. A function element 1307 includes a logic unit 1305 and hit system 251, which operate to carry out this logic. The logical OR is performed by element 1319 and an element 1321 tests for all 1's. The rest of the implementation is as in the preceding implementation shown in FIG. 12.

Figure 14:
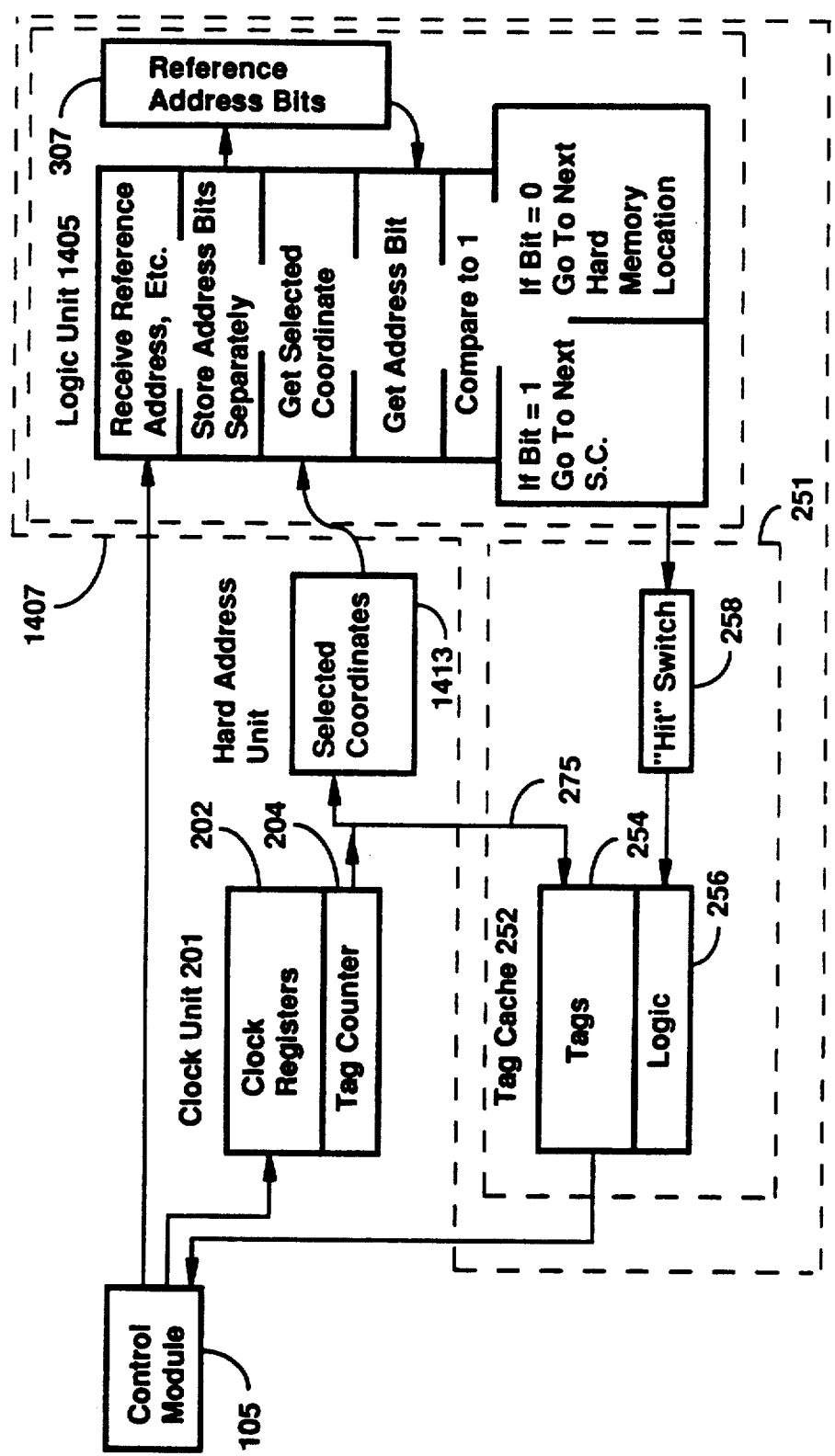
FIG. 14 shows an address module for a hyperplane design based upon the second alternative embodiment of FIG. 4.
Figure 15B:
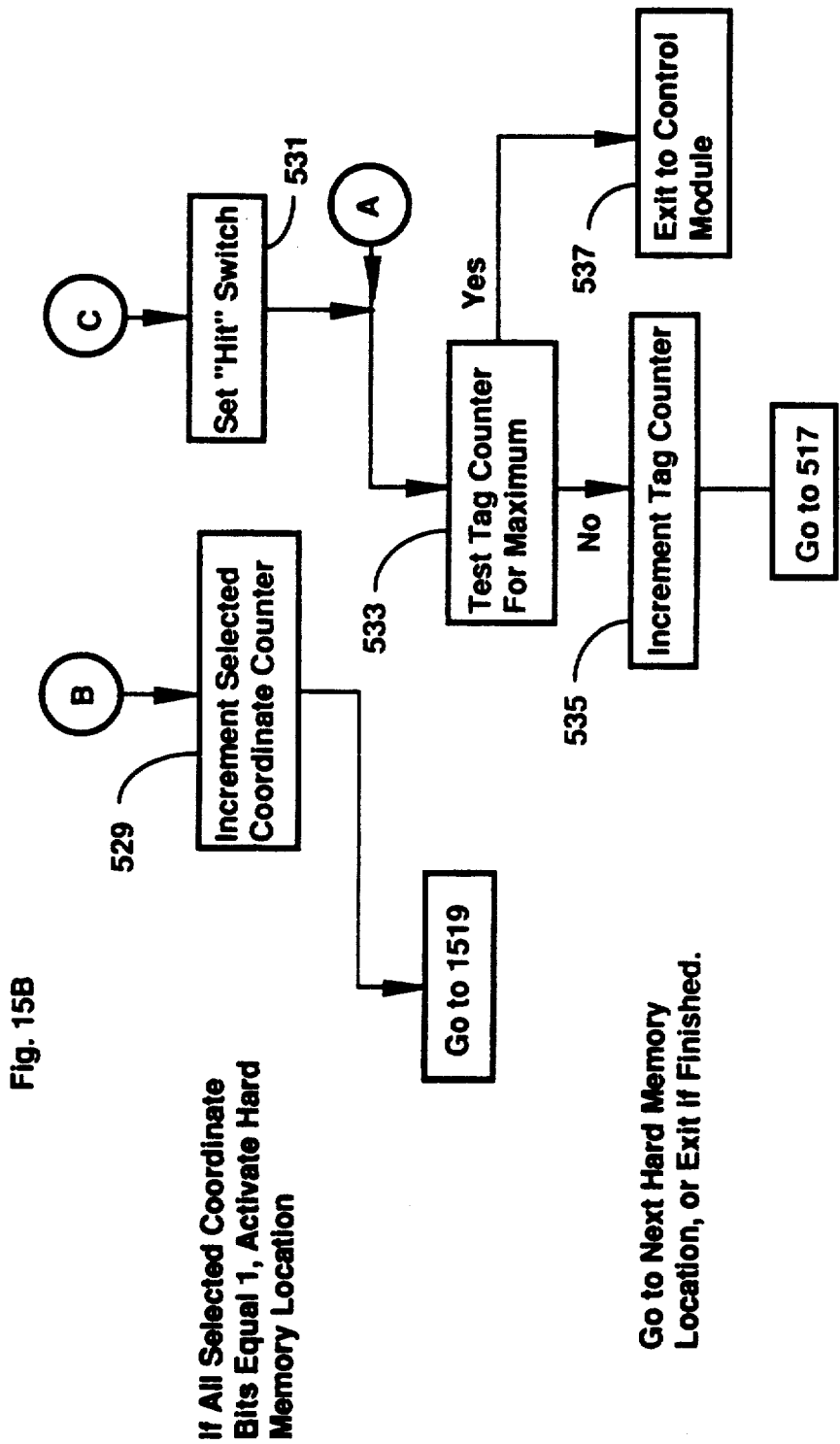

The second alternative embodiment of the selected-coordinate design, shown in FIG. 4, can be simplified using the hyperplane design concept as follows: If one uses two bytes to store the number of each selected coordinate, the selected coordinate information for each hard memory location can be stored in six bytes in the hard address unit (assuming three selected coordinates for each hard memory location). Since it is not necessary to store assigned value bits, one can use addresses consisting of as many as $2^{16} = 65,536$ bits. The operation of the logic unit would be like that for the selected-coordinate design, except that it would not have to separate the assigned value bit from the number of the selected coordinate, and it would compare bits in the reference address to 1, rather than to an assigned value bit. An implementation of this concept is illustrate in FIG. 14, which has a function element 1407 made up of a logic unit 1405 and hit system 251. Since it is not necessary to store assigned value bits, the hard address unit 1413 stores only the selected coordinate information, and the logic unit 1405 has been modified from the logic unit 305. A flowchart of the function of the logic unit is shown in FIGS. 15A and 15B. The process is similar to that described with reference to FIGS. 5A and 5B, except that now (after program element 517), at program element 1519, the logic unit gets only the selected coordinate. The step 521 has been eliminated, and at program element 1525 the logic unit compares the bit of the reference address corresponding to the selected coordinate to 1. If the bit is 0, the hard memory location is not activated, and the logic unit moves on to the next hard memory location. If the bit is 1, the logic unit proceeds to test if the selected coordinate counter is at its maximum value at program element 527, and if it is not, the logic unit goes to the next selected coordinate for that hard memory location. If the address bits corresponding to all of the selected coordinates equal 1, the hard memory location is activated.

In the discussion of the hyperplane design and its embodiments so far, it has been assumed that all of the assigned values are 1's. However, the invention described above applies equally well to the situation in which it would desirable for all of the assigned values to be 0's. For example, if the read or write addresses that will actually be used consist of a small proportion of 0's instead of 1's, one could have a design in which each hard memory location is activated when the bits in the address vector corresponding to all of the location's selected coordinates are 0's instead of 1'. Since one can simply interchange the roles of 0 and 1, it is clear that theory for this case would be identical to that given above, i.e. the two cases are completely equivalent. Further, one skilled in the art can see that each of the above embodiments for the hyperplane design can easily be modified so that it tests for 0's in the appropriate places in the address vector, instead of testing for 1's. These considerations apply also to the intermediate and hybrid hyperplane designs and their embodiments to be described below.

As indicated earlier, there is a series of intermediate designs between Kanerva's design and the selected-coordinate design. In the present situation also, where it is assumed that the addresses are restricted to the set C, one can described a series of intermediate designs between the hyperplane design and the adapted Kanerva design. For any fixed q and threshold value A, one can define a collection of subsets of C to represents the potential memory locations for an intermediate design as follows: Define a subset by choosing q selected coordinates; the subset consists of all points in C that have the value 1 for at least A of the selected coordinates, and any values for the other coordinates. The number A is chosen so that the subset will contain a desired proportion of the points in C. (As in the other designs, not all proportions are possible, due to the discreteness of the address space, so one may have to approximate the desired proportion.) The memory location represented by such a subset is activated by any address in the subset. i.e., whenever the components of the address vector for at least A of the selected coordinates are 1. If one thinks of the selected coordinates as having assigned values of 1, these subsets are like the spherical subsets in the earlier designs. The number of potential memory locations is $$\binom{1000}{q}.$$

A random sample of them are implemented as hard memory locations.

If $q=3$ and $A=3$, one has the above example of a hyperplane design. Furthermore, if one views the adapted Kanerva design above somewhat differently, it can be seen that the subsets representing its potential memory locations also fit the description given above, with $q=100$ and $A=20$. That is, the adapted Kanerva design is the same as the intermediate design for these values of q and A. Any z in C is the address of a potential memory location in the adapted Kanerva design; the location is activated by any address x in C for which $A(x,z) \geq 20$. If, for a given z, one chooses the 100 coordinates for which the value of z is 1 to be the 100 selected coordinates defining a subset of the kind described above, and if $A=20$, that subset is the same as the set of points that activate the location in the adapted Kanerva design whose address is z. Conversely, any such subset with $q=100$ and $A=20$ corresponds to a potential memory location in the adapted Kanerva design; the address of that location is the vector whose components are 1's for the selected coordinates and 0's for the others. Therefore, the collection of subsets representing potential memory locations in the adapted Kanerva design is the same as the collection of subsets above for $q=100$ and $A=20$.

One can therefore analyze the intermediate design corresponding to a given q and A just as was done above for the adapted Kanerva design. The number of points in the subsets defined above, and the size of the access overlap for two given addresses, can be found by methods similar to those used above for the adapted Kanerva design.

Note that q could be greater than 100, but in view of the relatively poor performance of the adapted Kanerva design, as shown in Table 2, it is unlikely that large values of q would be useful, at least in this context.

One could also construct hybrid designs, as before, in which different hard memory locations could have different values of q, and corresponding values for A. As before, the value of A for a hard memory location depends on q and on the desired number of addresses that would activate the location; this number of addresses need not be the same for all hard memory locations. Computation of the access overlap for such a design would be done as before, by combining the results for the various values of q and A.

Earlier it was shown how the various hardware embodiments for the selected-coordinate design could be modified for the intermediate and hybrid designs related to that design. The corresponding embodiments for the hyperplane design, which have been described above, can be modified in an analogous way for the intermediate and hybrid designs in this section. The embodiments for these designs would determine whether to activate a hard memory location by counting the number of 1's in the bit positions in the reference address corresponding to the selected coordinates; if that number is greater than or equal to A, the location would be activated. For example, if one has an address decoder for each hard memory location as in FIG. 1, each address decoder would receive q of the bits in the reference address (corresponding to the selected coordinates), count the number of 1's, i.e. add the bits, and compare the number to A. For the hybrid design, each address decoder could have its own values for q and A.

Figure 16:
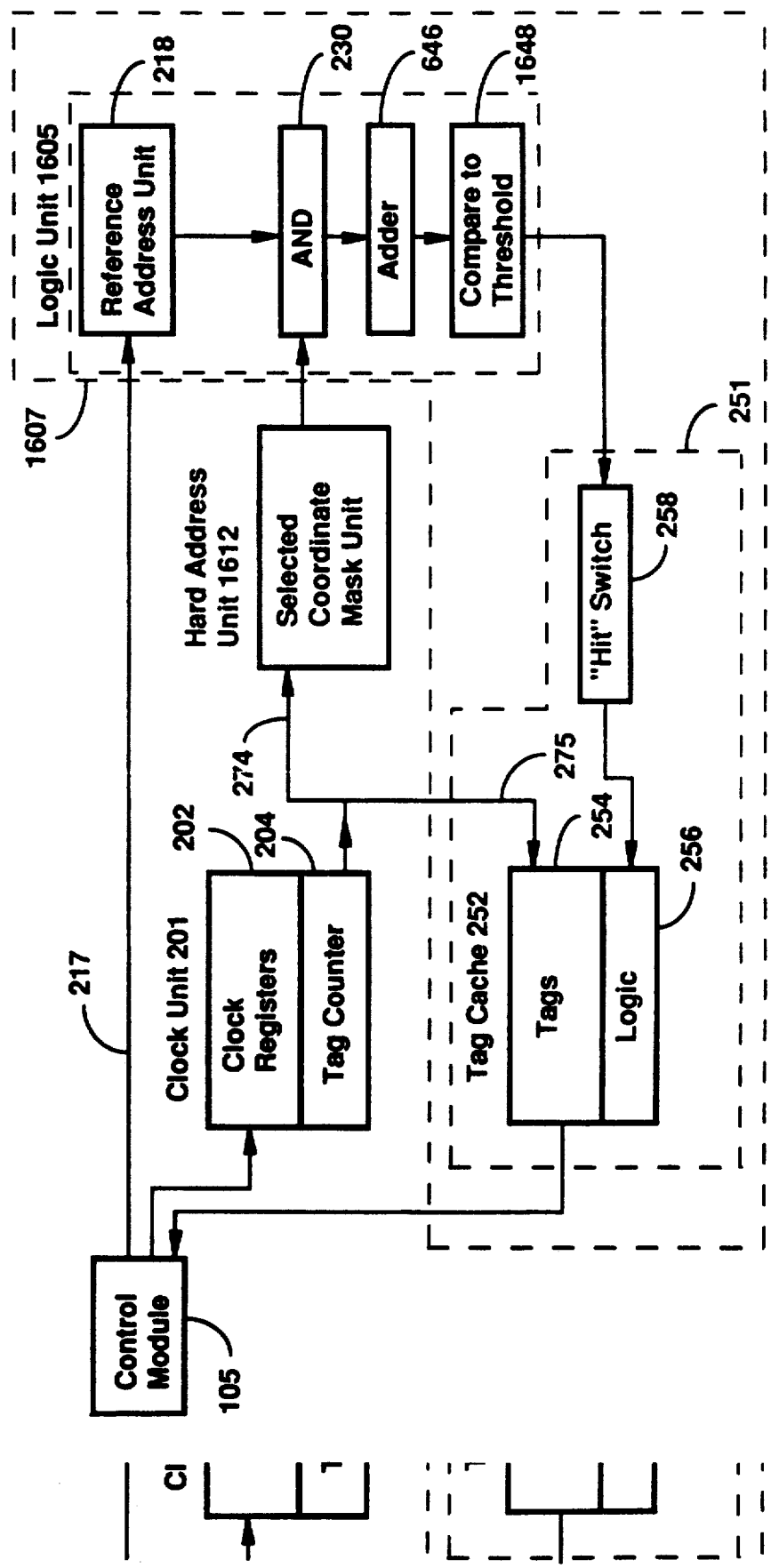
FIG. 16 shows an address module for an intermediate hyperplane design based upon the first alternative embodiment of FIG. 3.

FIG. 16 shows one embodiment of the address module for this concept of an intermediate hyperplane design, which is based on the embodiment of the intermediate design illustrated in FIG. 6, together with some features of FIG. 12. In the embodiment shown in FIG. 16, the hard address unit 1612 stores the selected coordinate masks; the assigned values unit 210 and the XOR 220 have been eliminated as in FIG. 12. However, there is no need to complement the reference address as in FIG. 12. In this implementation, a function element 1607 includes a logic unit 1605 and hit system 251. The logic unit 1605 works like that of FIG. 6, except that here a hard memory location is activated if the sum computed by adder 646 (i.e. the number of 1's among the bits of the reference address corresponding to the selected coordinates) is greater than or equal to A. Element 1648 performs this comparison.

Figure 17:
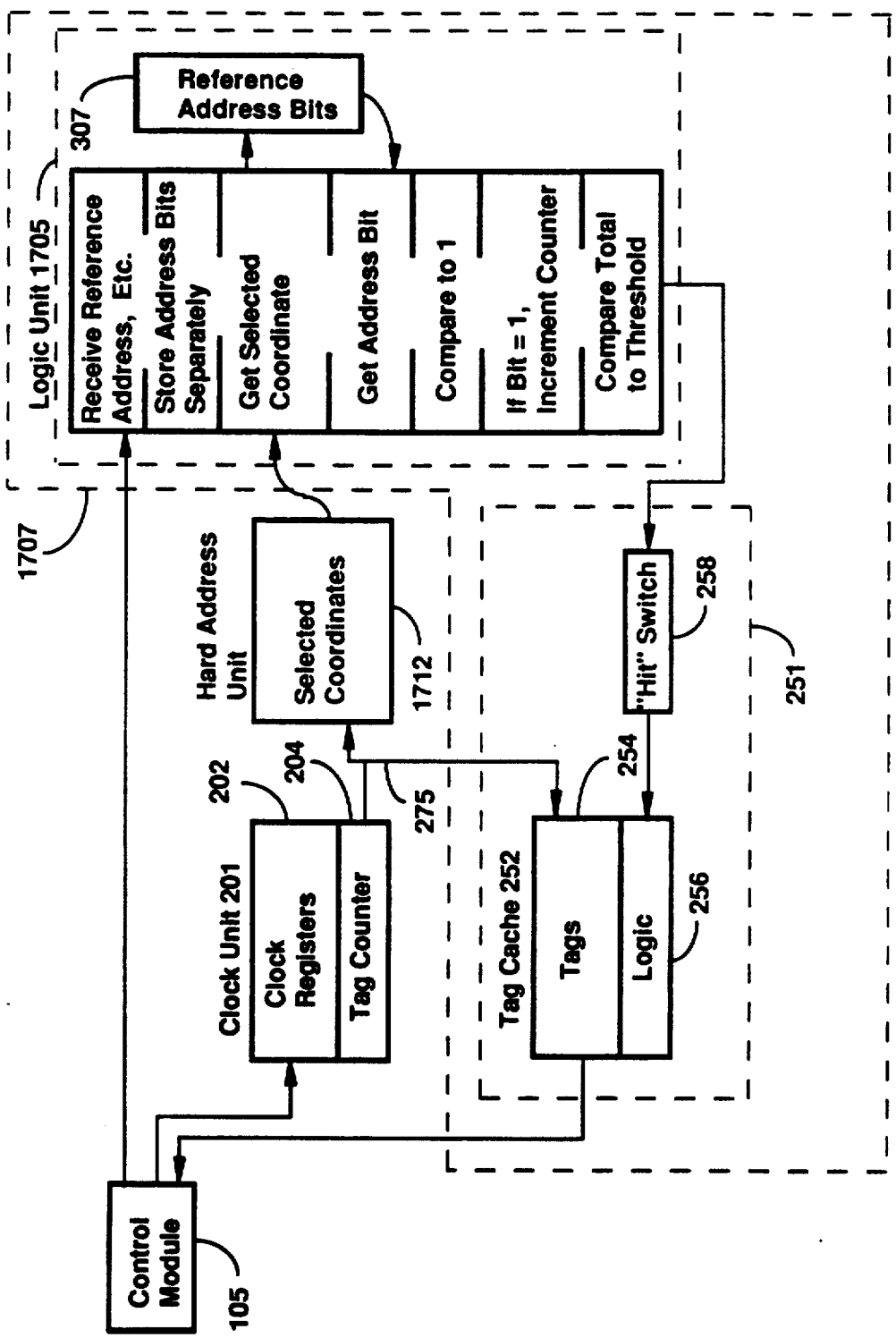
FIG. 17 shows an address module for an intermediate hyperplane design based upon the second alternative embodiment of FIG. 4.

FIG. 17 shows another implementation of the address module for the intermediate hyperplane design concept, which is based on the embodiment of the intermediate design illustrated in FIG. 7. This embodiments is substantially the same as that of FIG. 7, except the hard address unit 1712 does not need to store the assigned values. This embodiment can therefore be used with addresses consisting of as many as $2^{16}=65,536$ bits, as in FIG. 14. In this embodiment, the address module includes a function element 1707, which is made up of a logic unit 1705 and hit system 251. The logic unit 1705 operates substantially the same as logic unit 705 (see FIGS. 8A and 8B), except that since the assigned values are all 1's, the logic unit compares the reference address bit corresponding to each selected coordinate to 1. A counter counts the number of those bits that are equal to 1, and if that number is greater than or equal to A, the hard memory location is activated by hit system 251.

Figure 18:
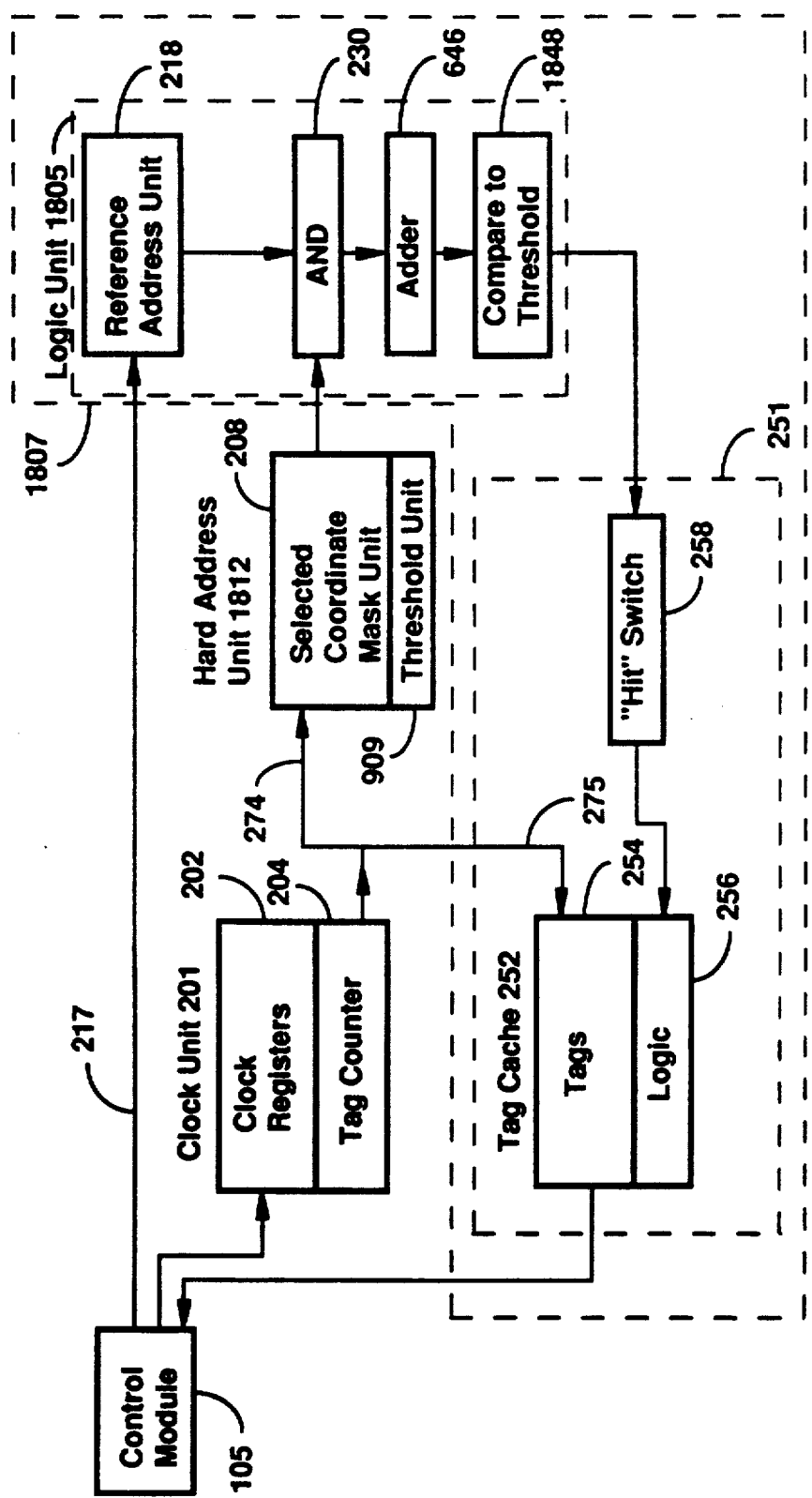
FIG. 18 shows an address module for a hybrid hyperplane design based upon the first alternative embodiment of FIG. 3.

FIG. 18 illustrates an implementation of a hybrid hyperplane design which is similar to the embodiment, shown in FIG. 9. Similar to the previous embodiment, the address module has a function element 1807, which includes a logic unit 1805 and hit system 251. The difference here is that, as in FIG. 16, an assigned values unit is no longer needed in the hard address unit 1812, and an XOR is no longer needed in the logic unit 1805. As in FIG. 16, a hard memory location is activated if the sum computed by adder 646 is greater than or equal to A, except that here the value of A for each hard memory location is obtained from threshold unit 909, as in FIG. 9. (For another approach, see the above description of FIG. 9.)

Figure 19:
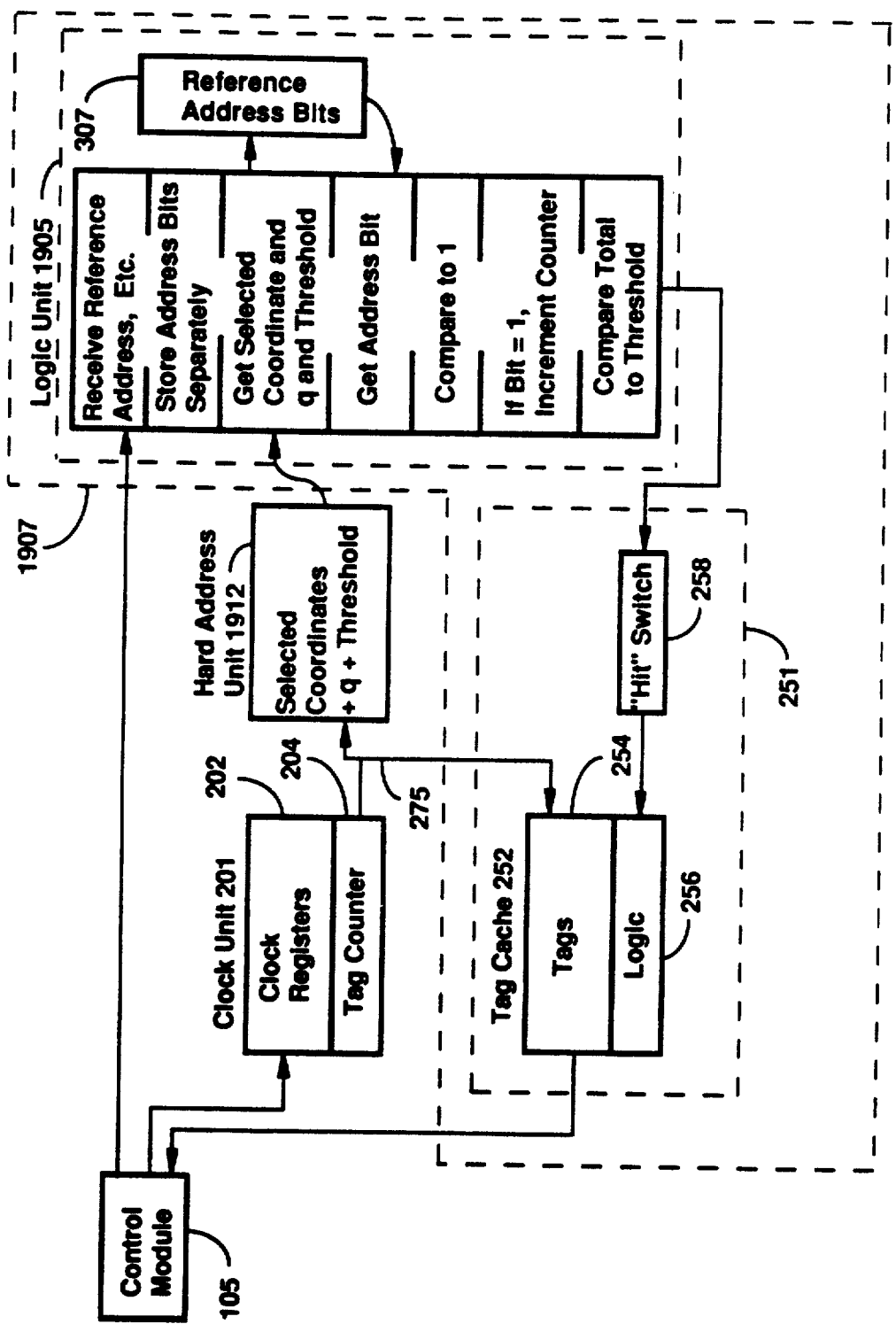
FIG. 19 shows an address module for a hybrid hyperplane design based upon the second alternative embodiment of FIG. 4.

In FIG. 19 is shown another embodiment of a hybrid hyperplane design which is based on the embodiment of the hybrid design shown in FIG. 10. As before, the hard address unit 1912 stores the number q of selected coordinates and the threshold value, A, for each hard memory location. However, since all assigned values are 1, it not longer stores the assigned values, and thus can be used with longer addresses as in FIG. 17. Similar to the previous embodiments, the address module has a function element 1907 which includes a logic unit 1905 and hit system 251. The logic unit 1905 operates substantially the same as the logic unit 1005 (see FIGS. 11A and 11B), except that since all assigned values are 1, the reference address bits are all compared to 1, as in FIG. 17. A counter counts the number of those bits that are equal to 1, and if that number is greater than or equal to the value of A for that hard memory location, the hard memory location is activated via hit system 251.

As an equivalent alternative, any of the embodiments shown in FIGS. 16-19 could be modified so that they count the number of 0's among the reference address bits corresponding to the selected coordinates instead of counting the number of 1's. If the number of 0's is less than or equal to $q-A$, the hard memory location would be activated.

CORRELATED ADDRESSES AND CHOICE OF HARD MEMORY LOCATIONS

In all of the designs considered so far, the hard memory locations have been chosen at random from a set of potential memory locations. This choice is based on the assumption that the read and write addresses will be distributed randomly throughout S (or, in the previous section, C). However, in some applications, the address that will actually be encountered will lie in a subset of S, or will have some non-uniform frequency distribution over S. In other words, one could say that the addresses are "correlated". An example is the case considered above, where the addresses lie on or near a hyperplane. In that situation it may be inefficient to have the hard memory locations scattered at random, without regard to the nature of the addresses to be encountered. Some hard memory locations might be activated very often, while others are rarely activated. The data stored in them might be redundant or uninformative. Moreover, if the addresses encountered tend to be bunched in certain regions in S, such as the hyperplane C, then the average distance between two such addresses may be much less than N/2, the average distance if the addresses are random. Consequently, the memory capacity and signal-to-noise ratio estimates computed above, which are based in part on the assumption that the addresses are random, and that most of the write addresses are therefore far away from a given read address, would not apply.

A modification of Kanerva's design to fit this situation has been suggested by Keeler (1988), pp. 321-324. He suggests that if the read and write addresses are expected to follow a known non-uniform frequency distribution, then the addresses of the hard memory locations should be chosen at random based on the same frequency distribution. If the frequency distribution is not known, it may be possible to estimate it. The hard memory locations would then have a higher density in the regions of S where more of the read and write addresses will lie. The activation radius would have to be adjusted so that a desired proportion of the hard memory locations would be activated by an address. Because of the higher density of hard memory locations near the read and write addresses, the radius can be reduced without resulting in too few locations being activated by an address. And with a smaller activation radius, the memory can discriminate between addresses that are closer to each other, which is important in this situation.

An example of these ideas if the adapted Kanerva design described above.

A similar modification can be made in the selected-coordinate design and in the related intermediate and hybrid designs, if the frequency distribution of the addresses to be encountered is know or can be estimated. One possibility is to choose the selected coordinates for a hard memory location at random as before, and then to choose the assigned value bits for the selected coordinates based on the joint frequency distribution of the components of the address vectors corresponding to those selected coordinates. This may be derived from the distribution of the addresses. A possible alternative is to choose the assigned value bits to be sets of values that are less likely to occur in the addresses, but that will occur sometimes. Hard memory locations activated by such relatively unlikely patterns may be more useful in that they may make certain regions of the address space "stand out", so that the memory can make finer distinctions between similar patterns. The hyperplane design above is an example of this; although most of the bits in the addresses are 0's, the assigned values are all 1's.

Instead of choosing the selected coordinates for a hard memory location at random, it may be better to choose non-random sets of selected coordinates, together with appropriate assigned values, that are more useful for discriminating among the addresses to be encountered. For example, if the values of the bits for two of the coordinates in the address vectors are highly correlated, and if one uses both of those coordinates as selected coordinates for the same hard memory location, one should probably give them a combination of assigned values that is relatively unlikely to occur. Otherwise, using both as selected coordinates for the same hard memory location would be somewhat redundant.

In all of the hardware embodiments described herein, the user can choose any desired combination of selected coordinates and (except for the hyperplane embodiments) assigned values for any of the hard memory locations, and enter that information into the address decoders or the hard address units. Since each of those elements contains a means for storing any possible set of selected coordinates and assigned values, no changes in the hardware are required. That is, although it has been assumed up to now that the addressing information is to be chosen at random, the embodiments themselves do not require that. Thus, if the selected coordinates and assigned values are chosen properly, the various designs and embodiments of the present invention may be used in applications where the addresses to be encountered are distributed in a non-uniform way.

Those skilled in the art will understand that there are many ways of implementing the concept of the invention which have different hardware systems. For example, as indicated earlier, although a hit system has been used in each of the preferred embodiments, such a buffer system could be eliminated completely. Also, some functions can be combined so as to be performed by a single hardware element, or they can be broken apart into more independent elements. Those skilled in the art appreciate that these equivalent changes are within the purview of the invention and that the invention should not be limited only to the embodiments described, but should be interpreted in light of the appended claims.

UTILITY OF THE INVENTION

The Sparse Distributed Memory system has many potential applications in fields such as signal detection, computer vision, speech transcription, and robotics, and in other such fields involving adaptive learning and control. For example, the memory system can be used as a key component in an adaptive system which deals with complex, noisy real-world information. Data from the environment would enter through sensors which would encode the data as binary words to be transmitted to the memory. The system would learn, that is, adaptively adjust itself based on a set of "training data", by storing the training data in its memory.

The system would perform the tasks required of it by receiving data words from its sensors and then reading from the memory, using the incoming word as the read address. The result of the read operation would be a binary word which in some applications would represent a pattern which the system has been trained to recognize. The patterns to be recognized could be visual images or symbols, written text, spoken words, or other such patterns or sequences of data. Since the system can response to patterns similar to those with which it has been trained, it could recognize patterns from input data which is noisy or incomplete.

In other applications, such as robotics or control systems, the result of a read operation would be a word representing command or control information for driving a motor system such as a robot arm. After the memory system has been trained by storing in it the appropriate responses to a set of given situations, the system can quickly respond to a new situation by producing a response similar to the responses it has been taught for similar situations.

What is claimed is:

1. A computer memory system comprising:
a plurality of hard memory locations in number equal to K, where K is an integer greater than one, each hard memory location comprising M counters, C1 through CM, where M is an integer greater than zero;
reference address means for storing a reference address received from a source external to said memory system, said reference address being a sequence of N bits, where N is an integer greater than zero;
data register means for storing data as a sequence of M integers;
processor means coupled to said reference address means, to said hard memory locations, and to said data register means, for determining for each reference address a subset of hard memory locations to be made available during read operations and during write operations, each such hard memory location that is made available hereinafter called an activated hard memory location, and for reading from and writing to said activated hard memory locations, said processor means coupled to said reference address means such that for each hard memory location said processor means receives a subset of said reference address bits equal in number to q, where q is an integer related to the proportion of the number of hard memory locations in said memory system that are to be accessed relative to the total number of hard memory locations in the memory system; said subset of reference address bits chosen by selecting for each hard memory location, q integers between 1 and N as selected coordinates, each selected coordinate corresponding to a bit position within said reference address, and for each selected coordinate for each hard memory location, assigning a zero or one, as an assigned value for that selected coordinate;
said processor means for receiving said selected coordinates and said assigned values and in response to receiving said subset of reference address bits, for each of said selected coordinates for each of said hard memory locations, comparing the assigned value for the selected coordinate with the value of the corresponding bit in the subset of the reference address bits;
said activated hard memory locations comprising those hard memory locations for which the assigned values for all selected coordinates are identical with the corresponding bits in the subset of the reference address bits; and
said processor means during a write operation for combining data in said data register means with any data already located in said M counters in each of said activated hard memory locations, said M counters in each of said activated hard memory locations for storing said combined data; and
accumulator means comprising a set of M accumulators, A1 through AM, with the $i^{th}$ accumulator, Ai, coupled to receive data from the $i^{th}$ counter, Ci, for each activated hard memory location, where i=1 through M, so that during a read operation each of said accumulators accumulates integers from said counters, the $i^{th}$ accumulator, Ai, receiving one integer from the $i^{th}$ counter for each activated hard memory location, thereby obtaining a value Vi in the $i^{th}$ accumulator, Ai.

2. A computer memory system comprising:
reference address means for storing a reference address received from a source external to said memory system, said reference address being a sequence of N bits, where N is an integer greater than zero;
a plurality of hard memory locations in number equal to K, where K is an integer greater than one, each hard memory location comprising M counters, C1 through CM, where M is an integer greater than zero, and each hard memory location having associated therewith an integer q and a threshold T, said q and T which may be difference for each hard memory location, and said integers $q \leq N$, except that if all q=N, not all T have the same value;
data register means for storing data as a sequence of M integers;
processor means coupled to said reference address means, to said hard memory locations, and to said data register means, for determining a subset of hard memory locations, hereinafter called activated hard memory locations, to access for each reference address and for accessing said activated hard memory locations during read operations and during write operations, said processor means coupled to said reference address means such that for each hard memory location said processor means receives a subset of said reference address bits equal in number to q for that hard memory location; said subset of reference address bits chosen by selecting for each hard memory location a set of integers equal in number to q for that hard memory location as selected coordinates, each selected coordinate corresponding to a bit position within said reference address, and for each selected coordinate for each hard memory location, assigning a zero or one as an assigned value for that selected coordinate;

said processor means for receiving said selected coordinates and said assigned values and in response to receiving said subset of reference address bits, for each of said selected coordinates for each of said hard memory locations, comparing the assigned value for the selected coordinate with the value of the corresponding bit in the subset of the reference address bits; and said processor means for computing for each hard memory location the value of a function based on the comparison by the processor means of the assigned values for all selected coordinates for the particular hard memory location with the values of the corresponding bits in the subset of the reference address bits, said process means for providing an activation signal for each hard memory location based on a comparison of the value of said function to the threshold T for that hard memory location;

said processor means during a write operation for combining data in said data register means with any data already located in said M counters in each of said activated hard memory locations, said M counters in each of said activated hard memory locations for storing said combined data; and accumulator means comprising a set of M accumulators, A1 through AM, with the $i^{th}$ accumulator, Ai, coupled to receive data from the $i^{th}$ counter, Ci, for each activated hard memory location, where $i=1$ through M, so that during a read operation each of said accumulators accumulates integers from said counters, the $i^{th}$ accumulator, Ai, receiving one integer from the $i^{th}$ counter for each activated hard memory location, thereby obtaining a value Vi in the $i^{th}$ accumulator, Ai.

3. A computer memory system as in claim 1 or claim 2 further comprising thresholding means coupled to said accumulator means for converting said data in said M accumulators to bits and providing a set of output values {Qi}, such that if {Xi} is a set of M thresholding numbers, than $Qi=0$ if $Vi<Xi$ and $Qi=1$ if $Vi\geq Xi$, or $Qi=1$ if $Vi<Xi$ and $Qi=0$ if $Vi\geq Xi$.

4. A computer memory system as in claim 1 or claim 2 further comprising thresholding means coupled to said accumulator means for converting said data in said M accumulators to bits and providing a set of output values {Qi}, such that if {Xi} is a set of M thresholding numbers, then $Qi=0$ if $Vi\leq Xi$ and $Qi=1$ if $Vi>Xi$, or $Qi=1$ if $Vi\leq Xi$ and $Qi=0$ if $Vi>Xi$.

5. A computer memory system as in claim 1 or claim 2 wherein said processor means when combining said data in said data register means with data in each of said counters of each of said activated hard memory locations, adds the value of the data in the $i^{th}$ position in said data register means to the value in the $i^{th}$ counter, Ci, and stores the result in counter Ci.

6. A computer memory system as in claim 1 or claim 2 wherein said data are in the form of bits in said data register means, and wherein said processor means when combining said data in said data register means with data in each of said counters of each of said activated hard memory locations, increments the value of the data in the $i^{th}$ counter, Ci, if the value of the $i^{th}$ bit in the data register means is 1, and decrements the value of the data in the $i^{th}$ counter, Ci, if the value of the $i^{th}$ bit in the data register means is 0.

7. A computer memory system as in claim 1 or claim 2 wherein said processor means comprises a plurality of address decoder means, each of said address decoder means coupled to at least one of said hard memory locations and to said reference address means, said address decoder means for designating which hard memory locations are to become activated hard memory locations in response to said reference address.

8. A computer memory system as in claim 7 wherein said plurality of address decoder means comprises K address decoders, with each of said address decoders being coupled to one of said hard memory locations and to said reference address means, such that each of said hard memory locations is coupled to only one of said address decoders.

9. A computer memory system as in claim 9 wherein each of said address decoders comprises bit comparator means with q inputers and q outputs, said inputs coupled to said reference address means for comparing said bits in said reference address with said assigned values for said selected coordinate, and wherein each of said address decoders further comprises an AND-Gate with q inputs, with each of said q outputs from said bit comparator means being coupled to one of the q inputs to said AND-Gate, the output signal from said AND-gate for determining said activated hard memory locations.

10. A computer memory system as in claim 7 wherein said processor means comprises K individual processors, with each of said K individual processors being coupled to one of said hard memory locations and to said data register means, such that each of said hard memory locations is coupled to only one of said K individual processors, said K individual processors for combining said data from said data register means with data in said M counters in each of said activated hard memory locations.

11. A computer memory system as in claim 2 wherein said function based on the comparison by the processor means comprises the number of all selected coordinates for which the assigned values do not equal the corresponding bits in the subset of reference address bits.

12. A computer memory system that can retrieve stored vectors of data, based on only approximate addressing information, comprising:

control module means;

data module means having a plurality of data storage means equal in number to K, where K is a positive integer, each data storage means having Mm counters, where M is a positive integer, said data module means having a processor means for combining the contents of said counters with incoming vectors of data from said control module means, each counter for storing a linear combination of corresponding components of vectors of data transmitted from said control module means; and address module means for providing address information to said control module means, comprising:

reference address means for storing a reference address as a vector of bits received from said control module means;

selected coordinate means for storing a set of bit positions for each data storage means in said data module means, said bit positions hereinafter called the selected coordinates for the corresponding data storage means;

assigned value means for storing a set of bits, hereinafter called a vector of assigned value bits, associated with the selected coordinates for each data storage means;

exclusive-OR means for performing a logical exclusive OR between vectors output from said reference address means and vectors output from said assigned value means;

AND means for performing a logical AND of the vector output from said exclusive-OR means and the vector output from said selected coordinate means;

zero test means for testing the vectors output from said AND means, and for providing an identification signal for each vector from said AND means when all bits in a vector from said AND means are zeros; and activating means for receiving said identification signals and for providing a set of signals to said control module means indicating which data storage means in said data module means are to be made accessible during a read operation or during a write operation, hereinafter called activated data storage means, based on said reference address;

said processor means of said data module means also comprising accumulator means for summing data from said counters in said data storage means to enable reading data from said memory system, such that if a set of data storage means is activated for a read operation said accumulator means sums the contents of corresponding counters of said activated data storage means to form a vector of M sums, and for transmitting a signal to said control module means corresponding to said vector of M sums; and said control module means for controlling said address module means and said data module means and for receiving read information and write information from a user interface, and for transmitting vectors of data to said data module means, and for transmitting data from said processor means to the user interface.

13. A computer memory system as in claim 12 wherein said activating means comprises hit switch means and tag cache means, said hit switch means for receiving said identification signals from said zero test means and for providing an activating signal to said tag cache means, said tag cache means for storing identifiers corresponding to which data storage means are to be made accessible in response to said activating signals, and for providing said identifiers to said control module means.

14. A method of accessing hard memory locations in a Sparse Distributed Memory for storing or retrieving data, comprising the steps of:

choosing a number N, where N is a positive integer, and where N is the number of bits in a reference address vector;

choosing a number q, where q is an integer relates to the proportion of the number of hard memory locations to be accessed in said Memory during a single read or write operation;

for each hard memory location, choosing q integers between 1 and N, as selected coordinates to represent positions within each of said reference address vectors;

for each selected coordinate of each hard memory location, assigning a zero or one, as the assigned value for that selected coordinate;

storing said selected coordinates and said assigned values;

in response to a reference address vector provided during a read or a write operation, for each selected coordinate for each hard memory location, comparing the value of the corresponding coordinate of the reference address vector with the assigned value for that selected coordinate; and accessing those hard memory locations for which the assigned values for all selected coordinates are identical with the corresponding bits of the reference address vector.

15. A method of storing data in a Sparse Distributed Memory having a plurality of hard memory locations, said data having a reference address vector, comprising the steps of:

choosing a number N, where N is a positive integer, and where N is the number of bits in said reference address vector;

choosing a number q, where q is an integer that is related to the proportion of the number of hard memory locations to be written to in said Memory during a single write operation;

for each hard memory location, choosing q integers between 1 and N, as selected coordinates to represent positions within said reference address vector;

for each selected coordinate of each hard memory location, assigning a zero or one, as the assigned value for that selected coordinate;

storing in said Sparse Distributed Memory said selected coordinates and said assigned values;

in response to said reference address vector provided during a a write operation, or each selected coordinate for each hard memory location, comparing the value of the corresponding coordinate of said reference address vector with the assigned value for that selected coordinate; and combining said data to be stored during said write operation with any data already located in each of those hard memory locations for which the assigned values for all selected coordinates are identical with the corresponding bits of said reference address vector.

16. A computer memory system that can retrieve stored vectors of data, based on only approximate addressing information, comprising:

control module means for providing a reference address during read and write operations and a data vector corresponding to said reference address during write operations;

data module means having a plurality of data storage means equal in number to K, where K is a positive integer, each data storage means having associated therewith M counters, where M is a positive integer, said data module means having a processor means for summing the contents of said counters with incoming vectors of data from said control module means, each counter for storing a linear combination of corresponding components of vectors of data transmitted from said control module means; and address module means coupled to said control module means comprising:

tag counter means for providing a sequence of output signals corresponding to each data storage means in said data module means in response to signals from said control module means;

hard address means coupled to receive said output signals from said tag counter means for storing a set of bit positions for each data storage means in said data module means, said bit positions hereinafter called the selected coordinates for the corresponding data storage means, said hard address means also for storing a set of bits, hereinafter called assigned value bits, associated with said selected coordinates for each data storage means;

logic means for receiving said reference address from said control module means, for storing said reference address as a sequence of bits, for comparing said assigned value bits with corresponding bits from said reference address for said selected coordinates for each data storage means, and for providing an output logic signal when all of said compared bits for a data storage means match, thereby identifying which data storage means are to be accessed for storing or retrieving information in response to said reference address; and activating means for receiving said output logic signals from said logic means and for providing a set of signals to said control module means indicating which data storage means in said data module means are to be accessed based on said reference address;

said processor means of said data module means also comprising accumulator means for summing data from said counters in said data storage means for reading data from said memory system, such that when a set of data storage means is accessed, said accumulator means sums the contents of corresponding counters of said accessed data storage means to form a vector of M sums, and for transmitting a signal to said control module means corresponding to said vector of M sums; and said control module means for controlling said address module means and said data module means and for receiving read information and write information from a user interface, and for transmitting vectors of data to said data module means, and for transmitting data from said processor means to the user interface.

17. A computer memory system as in claim 16 wherein said activating means comprises hit switch means and tag cache means, said hit switch means for receiving said output logic signals and for providing an activating signal to said tag cache means, said tag cache means for storing identifiers corresponding to which data storage means are to be accessed in response to said activating signals, and for providing said identifiers to said control module means indicating which data storage means in said data module means are to be accessed.

18. A computer memory system that can retrieve stored vectors of data, based on only approximate addressing information, comprising:

control module means for controlling said computer memory system;

data module means having a plurality of data storage means equal in number to K, where K is a positive integer, each data storage means having M counters, where M is a positive integer, said data module means having a processor means for combining the contents of said counters with incoming vectors of data from said control module means, each counter for storing a linear combination of corresponding components of vectors of data transmitted from said control module means; and address module means for receiving a reference address from said control module means, said reference address being a sequence of numerical values, said address module means comprising:

selected coordinate means for storing information identifying a set of positions in said sequence for each data storage means in said data module means, said positions hereinafter called the selected coordinates for the corresponding data storage means; and function means for comparing a value of a function of the values of the reference address corresponding to the selected coordinates for each data storage means with a set of numerical values, hereinafter called assigned values, for the selected coordinates for that data storage means, said function means for providing in response to said comparison a set of identification signals indicating which data storage means in said data module means are to be accessed based on said reference address;

said processor means of said data module means also for summing data from said counters in said data storage means to enable reading data from said memory system, such that if a set of data storage means is accessed for a read operation said processor means sums the contents of corresponding counters of said accessed data storage means to form a vector of M sums, and for transmitting a signal to said control module means corresponding to said vector of M sums; and said control module means for controlling said address module means and said data module means and for receiving read information and write information from a user interface, and for transmitting vectors of data to said data module means, and for transmitting data from said processor means to a user interface.

19. A memory as in claim 18 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's, and wherein said function means comprises:

OR means coupled to receive said reference address and coupled to receive said information identifying said selected coordinates from said selected coordinate means, said OR means for performing a logical OR of the sequence of numerical values from the reference address with the sequence of bits from the selected coordinate means for each data storage means; and test means for testing said result for all 1's for each data storage means.

20. A memory system as in claim 18 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's, and wherein said function means comprises:

AND means for performing a logical AND of the sequence of reference address bits with the sequence of bits for each data storage means from the selected coordinate means and outputting the results thereof;

adder means for adding said results for each data storage means to obtain a sum for each data storage means; and comparison means for comparing the sum for each data storage means with a numerical value, hereinafter called a threshold value, for that data storage means.

21. A memory system as in claim 20 further comprising threshold means for providing said threshold value for each data storage means to said comparison means.

22. A memory system as in claim 18 wherein said reference address is a vector of bits, said memory system further comprising:

assigned value means for storing said assigned values as a vector of assigned value bits associated with the selected coordinates for each data storage means; and wherein said function means comprises Exclusive-OR means for performing a logical exclusive OR between said reference address vectors and vectors output from said assigned value means;

AND means for performing a logical AND of the vectors output from said Exclusive-OR means and the vectors output from said selected coordinate means and outputting said results;

adder means for adding said results for each data storage means to obtain a sum for each data storage means; and comparison means for comparing the sum for each data storage means with a numerical value, hereinafter called a threshold value, for that data storage means.

23. A memory system as in claim 22 further comprising threshold means for providing said threshold value for each data storage means to said comparison means.

24. A memory system as in claim 18 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's and wherein said function means comprises:

AND means for performing a logical AND of the complement of said first sequence of reference address bits with said second sequence of bits from said selected coordinate means for each data storage means, and outputting results as an output vector; and zero test means for testing the output vector from said AND means for all 0's for each data storage means.

25. A computer memory system that can retrieve stored vectors of data, based on only approximate addressing information, comprising:

control module means for providing a reference address which is a sequence of numerical values during read and write operations and a data vector corresponding to said reference address during write operations;

data module means having a plurality of data storage means equal in number to K, where K is a positive integer, each data storage means having associated therewith M counters, where M is a positive integer, said data module means having a processor means for summing the contents of said counters with incoming vectors of data from said control module means, each counter for storing a linear combination of corresponding components of vectors of data transmitted from said control module means; and address module means coupled to said control module means comprising:

hard address means for storing information identifying a set of positions in said sequence for each data storage means in said data module means, said positions hereinafter called selected coordinates for the corresponding data storage means; and logic means for receiving said reference address from said control module means, for comparing an evaluation of a function of the values of the reference address corresponding to the selected coordinates for each data storage means with a set of numerical values, hereinafter called assigned values for the selected coordinates for that data storage means, and for providing in response to said comparisons a set of output logic signals identifying which data storage means are to be accessed for storing or retrieving information in response to said reference address;

said processor means of said data module means also for summing data from said counters in said data storage means to enable reading data from said memory system, such that when a set of data storage means is accessed said processor means sums the contents of corresponding counters of said accessed data storage means to form a vector of M sums, and for transmitting a signal to said control module means corresponding to said vector of M sums; and said control module means for controlling said address module means and said data module means and for receiving read information and write information from a user interface, and for transmitting vectors of data to said data module means, and for transmitting data from said processor means to the user interface.

26. A computer memory system as in claim 25 wherein said logic means further comprises bit switch means and tag cache means, said bit switch means for providing activating signals to said tag cache means in response to said comparisons, said tag cache means for storing identifiers corresponding to those data storage means that are to be accessed in response to said activating signals, and for providing said set of output logic signals indicating which data storage means in said data module means are to be accessed.

27. A computer memory system as in claim 25 wherein said reference address is a vector of bits, wherein said assigned values for said selected coordinates are all 0's or all 1's, wherein said output logic signals identify those data storage means for accessing for which the bits of the reference address vector corresponding to the selected coordinates for that data storage means match the assigned values for all of the selected coordinates.

28. A computer memory system as in claim 25 wherein said reference address is a vector of bits, wherein said assigned values for said selected coordinates are all 0's or all 1's, wherein said output logic signals identify those data storage means to be accessed for which the number of selected coordinates for which the bits in the reference address corresponding to the selected coordinates match the assigned values is greater than or equal to a numerical value, hereinafter called a threshold value, for that data storage means.

29. A computer memory system as in claim 28 wherein said hard address means is also for storing said threshold value for each data storage means.

30. A computer memory system as in claim 25 wherein said reference address is a vector of bits, wherein said assigned values for said selected coordinates are all 0's or all 1's, wherein said output logic signals identify those data storage means for accessing for which the number of selected coordinates for which the bits in the reference address corresponding to the selected coordinates do not match the assigned values is less than or equal to a numerical value, hereinafter called a threshold value, for that data storage means.

31. A computer memory system as in claim 25 wherein each of said reference addresses is a vector of bits, wherein said hard address means is also for storing a set of bits as assigned values, hereinafter called assigned value bits, associated with the selected coordinates for each data storage means and for providing said set of assigned value bits to said logic means, and wherein said output logic signals identify those data storage means to be accessed for which the number of selected coordinates for which the bits in the reference address corresponding to the selected coordinates do not match the assigned values is less than or equal to a numerical value, hereinafter called a threshold value, for that data storage means.

32. A computer memory system as in claim 25 wherein each of said reference addresses is a vector of bits, wherein said hard address means is also for storing a set of bits as assigned values, hereinafter called assigned value bits, associated with the selected coordinates for each data storage means and for providing said set of assigned value bits to said logic means, and wherein said output logic signals identify those data storage means to be accessed for which the number of selected coordinates for which the bits in the reference address corresponding to the selected coordinates match the assigned values is greater than or equal to a numerical value, hereinafter called a threshold value, for that data storage means.

33. A computer memory system as in claims 25, 28, 30, 31, or 32 wherein each data storage means has the same number of selected coordinates.

34. A computer memory system as in claims 28, 30, 31 or 32 wherein said hard address means is also for storing the number of selected coordinates and the threshold value for each data storage means, and for providing said numbers and said threshold values to said logic means.

35. A computer memory system as in claim 25 wherein said hard address means is also for storing the number of selected coordinates and a numerical value, hereinafter called a threshold value, for each data storage means, and for providing said numbers and said threshold values to said logic means.

36. An address module for a computer memory system having a set of data storage means, said address module for receiving a reference address, said reference address being a sequence of numerical values, said address module comprising:

selected coordinate means for storing information identifying a set of positions in said sequence for each data storage means in said computer memory system, said positions hereinafter called the selected coordinates for the corresponding data storage means; and function means for comparing a value of a function of the values of the reference address corresponding to the selected coordinates for each data storage means with a set of numerical values, hereinafter called assigned values, for the selected coordinates for that data storage means, said function means for providing in response to said comparison a set of identification signals indicating which data storage means in said memory system are to be accessed for storing or retrieving data in response to said reference address.

37. An address module as in claim 36 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's, and wherein said function means comprises:

OR means coupled to receive said reference address and coupled to receive said information identifying said selected coordinates from said selected coordinate means, said OR means for performing a logical OR of the sequence of numerical values from the reference address with the sequence of bits from the selected coordinate means for each data storage means and outputting the result thereof; and test means for testing said result for all 1's for each data storage means.

38. An address module as in claim 36 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's, and wherein said function means comprises:

AND means for performing a logical AND of the sequence of reference address bits with the sequence of bits from the selected coordinate means for each data storage means and outputting the results thereof;

adder means for adding said results for each data storage means to obtain a sum for each data storage means; and comparison means for comparing the sum for each data storage means with a numerical value, hereinafter called a threshold value, for that data storage means.

39. An address module as in claim 38 further comprising threshold means for providing said threshold value for each data storage means to said comparison means.

40. An address module as in claim 36 wherein said reference address is a vector of bits, said address module further comprising:

assigned value means for storing said assigned values as a vector of assigned value bits associated with the selected coordinates for each data storage means; and wherein said function means comprises Exclusive-OR means for performing a logical exclusive OR between said reference address vectors and vectors output from said assigned value means;

AND means for performing a logical AND of the vectors output from said Exclusive-OR means and the vectors output from said selected coordinate means and outputting said results;

adder means for adding said results for each data storage means to obtain a sum for each data storage means; and comparison means for comparing the sum for each data storage means with a numerical value, hereinafter called a threshold value, for that data storage means.

41. An address module as in claim 40 further comprising threshold means for providing said threshold value for each data storage means to said comparison means.

42. An address module as in claim 36 wherein said numerical values in the reference address comprise a first sequence of bits, wherein said information identifying said set of positions comprises a second sequence of bits for each data storage means, one bit for each position in the first sequence of bits, wherein the assigned values for all selected coordinates are 1's, and wherein said function means comprises:

AND means for performing a logical AND of the complement of said first sequence of reference address bits with said second sequence of bits from said selected coordinate means for each data storage means, and outputting results as an output vector; and zero test means for testing the output vector from said AND means for all 0's for each data storage means.

43. An address module for a computer memory system having a set of data storage means, said address module for receiving a reference address, said reference address being a sequence of numerical values, said address module comprising:

hard address means for storing information identifying a set of positions in said sequence for each data storage means, said positions hereinafter called selected coordinates for the corresponding data storage means; and logic means for receiving said reference address, for comparing an evaluation of a function of the values of the reference address corresponding to the selected coordinates for each data storage means with a set of numerical values, hereinafter called assigned values, for the selected coordinates for that data storage means, and for providing in response to said comparisons a set of output logic signals identifying which data storage means are to be accessed for storing or retrieving data in response to said reference address.

44. An address module as in claim 43 wherein said logic means further comprises hit switch means and tag cache means, said hit switch means for providing activating signals to said tag cache means in response to said comparisons, said tag cache means for storing identifiers corresponding to those data storage means that are to be accessed in response to said activating signals, and for providing said set of output logic signals indicating which data storage means are to be accessed.

45. An address module as in claim 43 wherein said reference address is a vector of bits, wherein said assigned values for said selected coordinates are all 0's or all 1's, wherein said output logic signals identify those data storage means for accessing for which the bits of the reference address vector corresponding to the selected coordinates for that data storage means match the assigned values for all of the selected coordinates.

46. An address module as in claim 43 wherein said reference address is a vector of bits, wherein said assigned values for said selected coordinates are all 0's or all 1's, wherein said output logic signals identify those data storage means for accessing for which the number of selected coordinates for which the bits in the reference address corresponding to the selected coordinates match the assigned values is greater than or equal to a numerical value, hereinafter called a threshold value, for that data storage means.

47. An address module as in claim 46 wherein said hard address means is also for storing said threshold value for each data storage means.

48. An address module as in claim 43 wherein said reference address is a vector of bits, wherein said assigned values for said selected coordinates are all 0's or all 1's, wherein said output logic signals identify those data storage means to be accessed for which the number of selected coordinates for which the bits in the reference address corresponding to the selected coordinates do not match the assigned values is less than or equal to a numerical value, hereinafter called a threshold value for that data storage means.

49. An address module as in claim 43 wherein each of said reference addresses is a vector of bits, wherein said hard address means is also for storing a set of bits as assigned values, hereinafter called assigned value bits, associated with the selected coordinates for each data storage means and for providing said set of assigned value bits to said logic means, and wherein said output logic signals identify those data storage means to be accessed for which the number of selected coordinates for which the bits in the reference address corresponding to the selected coordinates do not match the assigned values is less than or equal to a numerical value, hereinafter called a threshold value for that data storage means.

50. An address module as in claims 46, 48, or 49, wherein said hard address means is also for storing the number of selected coordinates and the threshold value for each data storage means, and for providing said numbers and said threshold values to said logic means.

51. An address module as in claim 43 wherein each of said reference addresses is a vector of bits, wherein said hard address means is also for storing a set of bits as assigned values, hereinafter called assigned value bits, associated with the selected coordinates for each data storage means and for providing said set of assigned value bits to said logic means, and wherein said output logic signals identify those data storage means to be accessed for which the number of selected coordinates for which the bits in the reference address corresponding to the selected coordinates match the assigned values is greater than or equal to a numerical valued, hereinafter called a threshold value, for that data storage means.

52. An address module as in claim 51 wherein said hard address means is also for storing the number of selected coordinates and the threshold value for each data storage means, and for providing said numbers and said threshold values to said logic means.

53. An address module as in claim 43 wherein said hard address means is also for storing the number of selected coordinates and a numerical value, hereinafter called a threshold value, for each data storage means, and for providing said numbers and said threshold values to said logic means.

54. A method of accessing hard memory locations in a Sparse Distributed memory when storing or retrieving data, comprising the steps of:
   choosing a number N, where N is a positive integer;
   providing a reference address vector which is N bits in length;
   for each hard memory location, choosing an integer q and a threshold T, which may be different for each hard memory location, said integer $q \leq N$ except that if all $q=N$, not all T have the same value;
   for each hard memory location, choosing q distinct integers between 1 and N, as selected coordinates to represent positions within said reference address vector;
   for each selected coordinate for each hard memory location, assigning a zero or one, as an assigned value for that selected coordinate;
   in response to a reference address vector provided during a read or a write operation, for each hard memory location, evaluating a function of the values of the reference address corresponding to the selected coordinates for that hard memory location and the assigned values for the selected coordinates for that hard memory location; and
   accessing those hard memory locations for which said function is greater than or equal to said threshold T.

55. A method of storing data in a Sparse Distributed Memory having a plurality of hard memory locations comprising the steps of:
   choosing a number N, where N is a positive integer;
   providing a reference address vector which is N bits in length;
   for each hard memory location, choosing an integer q and a threshold T, which may be different for each hard memory location, said integer $q \leq N$ except that if all $q=N$, not all T have the same value;
   for each hard memory location, choosing q distinct integers between 1 and N, as selected coordinates to represent positions within said reference address vector;
   for each selected coordinate for each hard memory location, assigning a zero or one, as an assigned value for that selected coordinate;
   in response to a reference address vector provided during a write operation, for each hard memory location, evaluating a function of the values of the reference address corresponding to the selected coordinates for that hard memory location and the assigned values for the selected coordinates for that hard memory location; and
   combining data to be written during said write operation with any data already located in each of those hard memory locations for which the value of said function is greater than or equal to said threshold T.

56. An address module for a computer memory system having a set of data storage means, said address module for receiving a reference address, said reference address being a sequence of bits, said address module comprising:
   reference address means for storing said reference address;
   selected coordinate means for storing a set of bit positions for each data storage means, said bit positions hereinafter called the selected coordinates for the corresponding data storage means;
   assigned value means for storing a set of bits, hereinafter called a vector of assigned value bits, associated with the selected coordinates for each data storage means;
   exclusive-OR means for performing a logical exclusive OR between vectors output from said reference address means and vectors output from said assigned value means;
   AND means for performing a logical AND of the vector output from said exclusive-OR means and the vector output from said selected coordinate means; and
   zero test means for testing the vectors output from said AND means, and for providing an identification signal to said computer memory system for each vector from said AND means when all bits in a vector from said AND means are zeros, thereby identifying which data storage means are to be accessed for storing or retrieving information in response to said reference address.

57. An address module for a computer memory system having a set of data storage means, said address module for receiving a reference address, said reference address being a sequence of bits, said address module comprising:
   tag counter means for providing a sequence of output signals corresponding to each data storage means;
   hard address means coupled to receive said output signals from said tag counter means for storing a set of bit positions for each data storage means, said bit positions hereinafter called the selected coordinates for the corresponding data storage means, said hard address means also for storing a set of bits, hereinafter called assigned value bits, associated with said selected coordinates for each data storage means; and
   logic means for storing said reference address as a sequence of bits, for comparing said assigned value bits with corresponding bits from said reference address for said selected coordinates for each data storage means, and for providing an output logic signal to said computer memory system when all of said compared bits for a data storage means match.

58. A computer memory system as in claim 16 wherein said function based on the comparison by the processor means comprises the number of all selected coordinates for which the assigned values equal the corresponding bits in the subset of reference address bits.

* * * * *